United States Patent
Kim et al.

(10) Patent No.: US 8,925,103 B2
(45) Date of Patent: Dec. 30, 2014

(54) MOBILE TERMINAL SUPPORTING DUAL OPERATING SYSTEMS AND AN AUTHENTICATION METHOD THEREOF

(75) Inventors: Dongwoo Kim, Goyang-si (KR); Heejung Bae, Anyang-si (KR); Ki Seo Kim, Seoul (KR); Hyehyun Kim, Seoul (KR); Jooyong Lee, Gwangmyeong-si (KR); Hyunah Cho, Goyang-si (KR)

(73) Assignee: LG Electronics Inc., Seoul (KR)

( * ) Notice: Subject to any disclaimer, the term of this patent is extended or adjusted under 35 U.S.C. 154(b) by 255 days.

(21) Appl. No.: 13/161,582

(22) Filed: Jun. 16, 2011

(65) Prior Publication Data

US 2012/0154413 A1 Jun. 21, 2012

Related U.S. Application Data

(60) Provisional application No. 61/425,751, filed on Dec. 21, 2010.

(30) Foreign Application Priority Data

Jan. 31, 2011 (KR) .................. 10-2011-0009752

(51) Int. Cl.
*H04W 88/02* (2009.01)
*G06F 21/71* (2013.01)
*G06F 21/62* (2013.01)
*H04M 1/725* (2006.01)

(52) U.S. Cl.
CPC ...... *H04M 1/72563* (2013.01); *H04M 1/72577* (2013.01); *G06F 2221/2105* (2013.01); *G06F 21/71* (2013.01); *H04M 2250/22* (2013.01); *G06F 21/6218* (2013.01)

USPC .................. 726/27; 726/2; 726/30; 719/319; 713/1; 713/2; 713/100

(58) Field of Classification Search
CPC ................ G06F 21/71; G06F 21/6218; G06F 2221/2105; H04M 1/72563; H04M 1/72522; H04M 1/72577
USPC ............ 726/2, 26, 27; 713/1, 2, 100; 719/319
See application file for complete search history.

(56) References Cited

U.S. PATENT DOCUMENTS

| 5,446,904 A | * | 8/1995 | Belt et al. .................. 713/323 |
| 6,763,458 B1 | * | 7/2004 | Watanabe et al. ............. 713/100 |
| 2003/0013483 A1 | * | 1/2003 | Ausems et al. ............... 455/556 |
| 2006/0010314 A1 | * | 1/2006 | Xu .................................. 713/2 |
| 2008/0162914 A1 | * | 7/2008 | Adrangi et al. ................ 713/2 |

(Continued)

FOREIGN PATENT DOCUMENTS

| CN | 101470628 A | 7/2009 | |
| EP | 1686774 A1 | * 8/2006 | ............. H04M 1/57 |

Primary Examiner — Kaveh Abrishamkar
Assistant Examiner — Theodore Parsons
(74) Attorney, Agent, or Firm — Birch, Stewart, Kolasch & Birch, LLP

(57) ABSTRACT

A mobile terminal supporting dual operating systems and an authentication method thereof. The mobile terminal includes a memory configured to store at least two different operating systems configured to act in at least two different modes, respectively, and a controller configured to perform an authentication procedure for authenticating that one mode can be switched to the other mode, and to display a type identifier only in one group identifier corresponding to a currently activated mode among the at least two different operating systems.

16 Claims, 73 Drawing Sheets

(56) References Cited

U.S. PATENT DOCUMENTS

| | | |
|---|---|---|
| 2008/0184274 A1* | 7/2008 | Ohta et al. .................... 719/319 |
| 2008/0318616 A1 | 12/2008 | Chipalkatti et al. |
| 2009/0083630 A1* | 3/2009 | Peterson ....................... 715/719 |
| 2009/0119773 A1* | 5/2009 | D'Amore et al. ............... 726/21 |
| 2009/0170532 A1 | 7/2009 | Lee et al. |
| 2009/0183178 A1* | 7/2009 | Imai et al. .................... 719/318 |
| 2009/0204964 A1* | 8/2009 | Foley et al. ...................... 718/1 |
| 2009/0247215 A1* | 10/2009 | Katsumata ................. 455/550.1 |
| 2010/0082679 A1* | 4/2010 | Ekberg et al. ................. 707/783 |
| 2011/0145833 A1* | 6/2011 | De Los Reyes et al. ...... 718/106 |
| 2011/0252375 A1* | 10/2011 | Chaudhri ..................... 715/835 |
| 2011/0265188 A1* | 10/2011 | Ramaswamy et al. .......... 726/28 |
| 2012/0231764 A1* | 9/2012 | Lindteigen et al. ........... 455/410 |

* cited by examiner (a)

| A | B | C | D |
|---|---|---|---|
| E | .. | .. | .. |
| .. | .. | .. | .. |
| .. | .. | .. | Z |

P mode (a)

| Q | W | E | .. | .. | P |
|---|---|---|---|---|---|
| A | S | .. | .. | .. | L |
| Z | X | .. | .. | .. | M |
| 1 | 2 | .. | .. | .. | O |

B mode (b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

Lock screen state

Lock screen state (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

MOBILE TERMINAL SUPPORTING DUAL OPERATING SYSTEMS AND AN AUTHENTICATION METHOD THEREOF

This application claims the benefit of U.S. Provisional Application Ser. No. 61/425,751 filed on Dec. 21, 2010, which is hereby incorporated by references as if fully set forth herein. This application also claims the benefit of the Korean Patent Application No. 10-2011-0009752 filed on Jan. 31, 2011, which is hereby incorporated by reference as if fully set forth herein.

BACKGROUND OF THE INVENTION

1. Field of the Invention

The present invention relates to a mobile terminal, and more particularly, to a mobile terminal and method of controlling a mode switching therein. Although the present invention is suitable for a wide scope of applications, it is particularly suitable for the mobile terminal to implement a plurality of modes of the mobile terminal.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Recently, a mobile terminal tends to be used for a business need as well as a personal need. In addition, it is necessary to implement the mobile terminal suitable for both of the personal need and the business need. Moreover, the demand for using the mobile terminal for the purpose of the personal need or the business need separately keeps rising.

However, a mobile terminal according to a related art fails in providing an environment in which the mobile terminal can be separately used for the purpose of the personal need or the business need.

SUMMARY OF THE INVENTION

Accordingly, the present invention is directed to a mobile terminal and method of controlling a mode switching therein that substantially obviate one or more problems due to limitations and disadvantages of the related art.

An object of the present invention is to provide a mobile terminal and method of controlling a mode switching therein, by which a plurality of modes can be individually implemented and activated for user's convenience and data security in a manner of being discriminated from each other.

Another object of the present invention is to provide a mobile terminal and method of controlling a mode switching therein, by which a mode switching can be effectively performed among a plurality of modes (e.g., a personal mode, a business mode, etc.) through a mode management solution loaded in the mobile terminal.

Another object of the present invention is to provide a mobile terminal and method of controlling a mode switching therein, by which a security of a second mode can be fortified by requesting an authentication procedure when attempting to switch a first mode to the second mode.

A further object of the present invention is to provide a mobile terminal and method of controlling a mode switching therein, by which information corresponding to each of a plurality of modes can be safely managed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes at least one operating system capable of implementing a plurality of modes including a first mode and a second mode, at least one application executable in at least one of a plurality of the modes, a controller detecting a signal for a mode switching in an activated state of the first mode, the controller performing an authentication procedure for the second mode if detecting the signal, the controller switching the first mode to the second mode if the authentication procedure is validly performed, and a display unit displaying a user interface required for executing at least one of a voice based communication and a text based communication in an activated state of a prescribed one of a plurality of the modes under the control of the controller. Moreover, the controller controls the display unit to display a plurality of group identifiers respectively indicating a plurality of the application groups including at least one application executable in the at least one of a plurality of the modes.

In another aspect of the present invention, a method of controlling a mode switching in a mobile terminal, which is capable of implementing a plurality of modes including a first mode and a second mode, includes the steps of activating the first mode, detecting a signal for the mode switching in an activated state of the first mode, performing an authentication procedure for the second mode if detecting the signal for the mode switching, and switching to the second mode if the performed authentication procedure is valid.

In still another aspect, the present invention provides A mobile terminal including a communication unit configured to communicate with at least one external terminal; a memory configured to store at least a first and second operating system including at least first and second modes, respectively; and a controller configured to execute the first operating system and to activate the first mode corresponding to the first operating system, to display a first information screen on a display unit corresponding to the activated first mode, to receive a switching signal indicating the first mode is to be switched to the second mode, to perform an authentication procedure for authenticating that the first mode can be switched to the second mode, to activate the second mode and deactivate the first mode when the authentication procedure is validly performed, and to display a second information screen on the display unit corresponding to the second mode and that is different than the first information screen. The present invention also provides a corresponding method of controlling a mobile terminal.

Accordingly, the present invention provides the following effects and/or advantages.

First of all, the present invention can effectively perform a mode switching to enable a mode suitable for a current terminal status (e.g., location, time, access network, etc.) to be activated among a plurality of modes.

Secondly, the present invention performs data storage and management of each of a plurality of modes separately, thereby reinforcing inter-mode data security.

Thirdly, the present invention fortifies a security of a second mode in a manner of requesting an authentication procedure when attempting to switch a first mode to the second mode.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
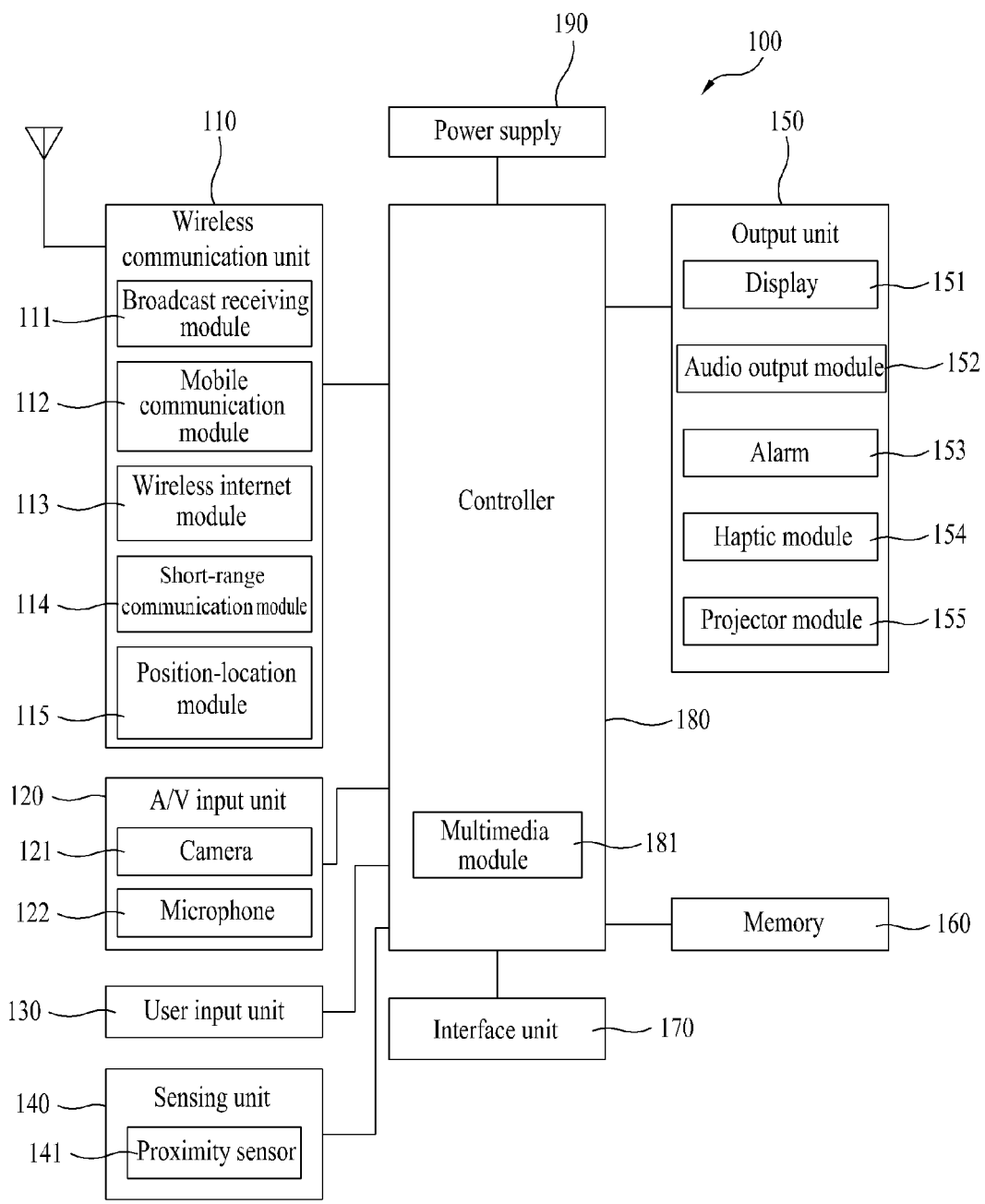
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it can use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing mechanism for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
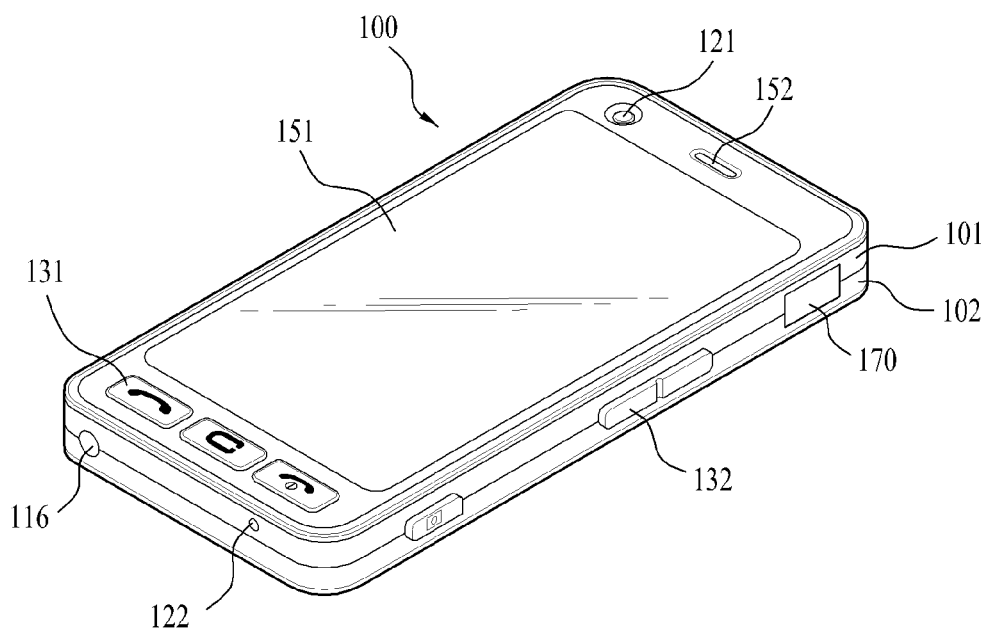
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132.

Figure 2B:
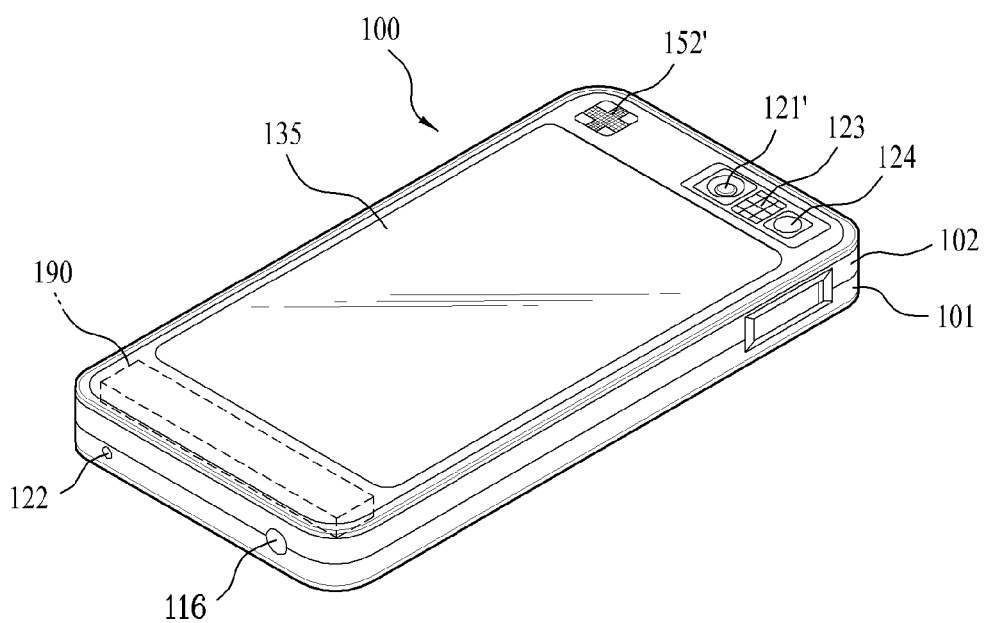
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this instance, if the display unit 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First of all, a mobile terminal mentioned in the following description can include at least one of the components shown in FIG. 1. In addition, in order to perform an operation using the components (e.g., touchscreen, wireless communication unit, memory, etc.), the controller 180 can control an individual operation of each of the components or interconnected operations among a plurality of the components.

Applications mentioned in this disclosure are software programs drivable in a mobile terminal. If the application is driven, it can execute a corresponding function or operation. The application is basically stored in the mobile terminal (particularly, memory 160) or can be downloaded from an external server of an external terminal.

For example, the applications can include a compass, an augmented reality, a camera, a video player, a music player, a game, a news, a web browser, a message, a phonebook, a memo, a schedule management, and the like. Of course, the allocations are non-limited by this example and can be implemented in more various ways.

There can exist contents or data associated with the applications as well. In this instance, the associated content or data is stored in the memory 160 or can be stored in an external server having a storage space.

For instance, the contents can include an audio file (associated with the music player), a video file (associated with the video player), a document file (associated with an e-book), and the like. In addition, the data can include a message content (associated with the message), a memo content (associated with the memo), a counterpart information (associated with the phonebook), a schedule content (associated with the schedule management), and the like.

According to the present invention, a mobile terminal can configure a plurality of modes differing from each other in application configuration for data security for one mode against another mode or data security between different modes. In addition, the mobile terminal according to the present invention can implement a plurality of the modes selectively or simultaneously (or sequentially).

When a specific application is executed in a prescribed mode, at least one application interoperable with the specific application can be executed in the prescribed mode. For instance, if a specific application is a voice call, an application interoperable with the voice call can include a phonebook, a message and the like.

Regarding mode discrimination in application configuration, an application executable in each of a plurality of modes can include at least one application (hereinafter named a dedicated application) executable by being dedicated to each of a plurality of the modes or at least one application (hereinafter named a common application) executable in any one of a plurality of the modes. In particular, the common application can change at least one feature in each of a plurality of the modes in which the corresponding application is executable. For instance, at least one of configuration, representation, security and the like of the common application is changeable. This shall be described in detail later.

Of course, the common application may not change its feature in each of a plurality of the modes in which the corresponding application is executable. For instance, if the common application includes such a basic terminal application as a voice call, a message and the like, it may not change its feature.

For example, if first to third applications are executed in a first mode and if the third application, a fourth application and a fifth application are executed in a second mode, the first and second applications, the third application and the fourth and fifth application can be called the dedicated applications of the first mode, the common application of the first and second modes and the dedicated applications of the second mode, respectively.

A plurality of modes can include a first mode (i.e., a private mode) facilitating user's personal life, a second mode (i.e., a business mode) facilitating a user's work life, and the like. This enables a mobile terminal to be discriminatively used in consideration of a user's personal life (e.g., privacy) and a user's public life (e.g., work life). In particular, in aspect of security reinforcement, when either a private mode or a business mode is implemented, restriction can be put on an access to information corresponding to the other mode.

The above-described private mode and the business mode are just the examples for describing a plurality of the modes. If the above-described private mode and the business mode are suitable for the mode discrimination reference mentioned in this disclosure, they are non-limited by their names Although the mode discrimination of a plurality of the modes is explained in the above description based on the application configuration, it shall be described in detail with reference to the accompanying drawings later.

Implementation and activation of a plurality of modes mentioned in the description of the present invention shall be defined as follows.

First of all, according to the present invention, a mobile terminal can implement a plurality of modes all and is also able to activate one of a plurality of the currently implemented modes. For instance, if a plurality of the modes include a first mode and a second mode, the mobile terminal boots an operating system capable of implementing both of the first and second modes to implement and can then activate the implemented first or second mode selectively.

In particular, if both of the first and second modes are already implemented, the mode for displaying an executed screen on a current screen, the mode for designating the currently executed application, the mode having a high priority or the like can be called an activated mode. In this instance, a non-activated mode (or a deactivated mode) can be regarded as operating as a background despite being implemented in the mobile terminal. In more particular, if an executed screen of the first mode and an executed screen of the second mode are being displayed on a first region and a second region of the screen through screen partition, respectively, the mode selected by a user, the mode for activating the corresponding region currently, the mode for designating a currently executed application, the mode having a high priority or the like can be regarded as activated.

Occasionally, after the mobile terminal has implemented and activated one mode, if the mobile terminal attempts to switch the current mode to the other mode, the mobile terminal can implement and activate the other mode (i.e., selective implementation and activation of mode).

In the following description, implementation of a plurality of modes and operations of components required for inter-mode switching for a plurality of the modes are explained in detail with reference o FIGS. 3A to 4C.

Figure 3A:
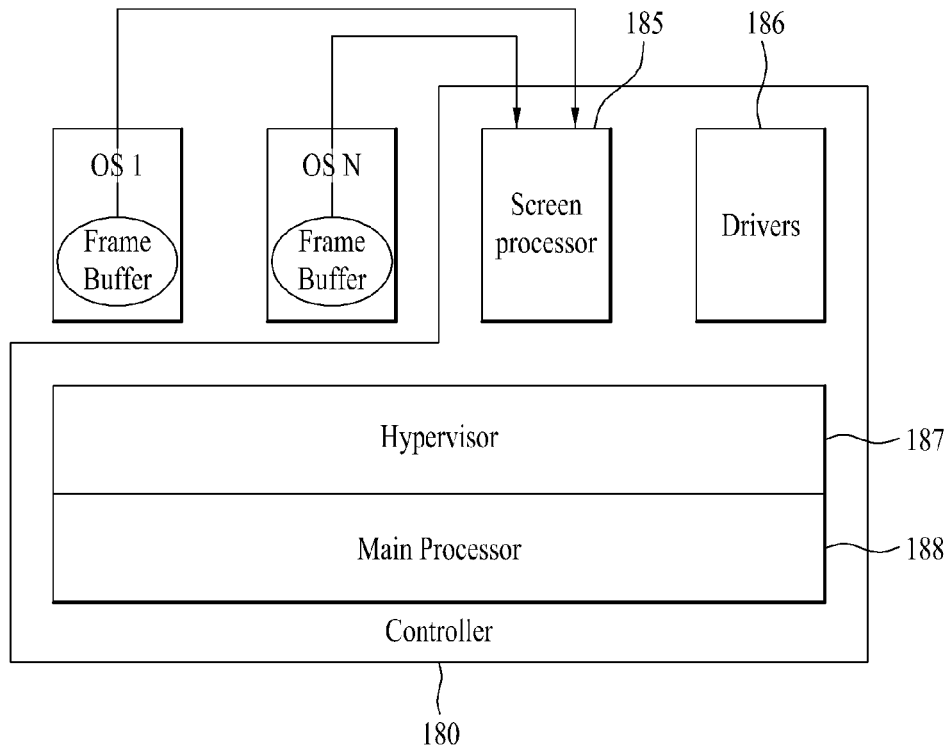
FIGS. 3A to 3C are block diagrams of components required for implementation of a plurality of modes and a mode switching among a plurality of the modes according to the present invention.
Figure 3B:
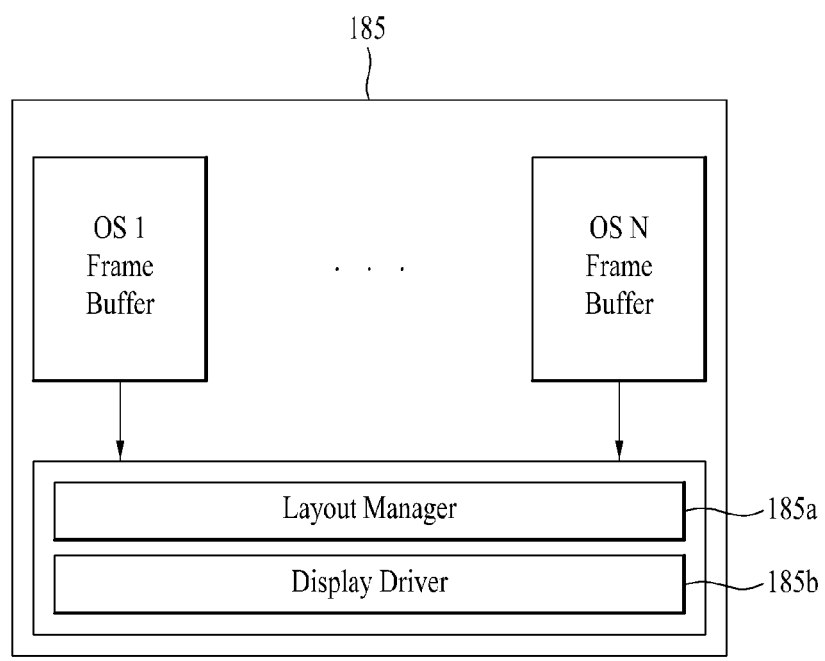
Figure 3C:
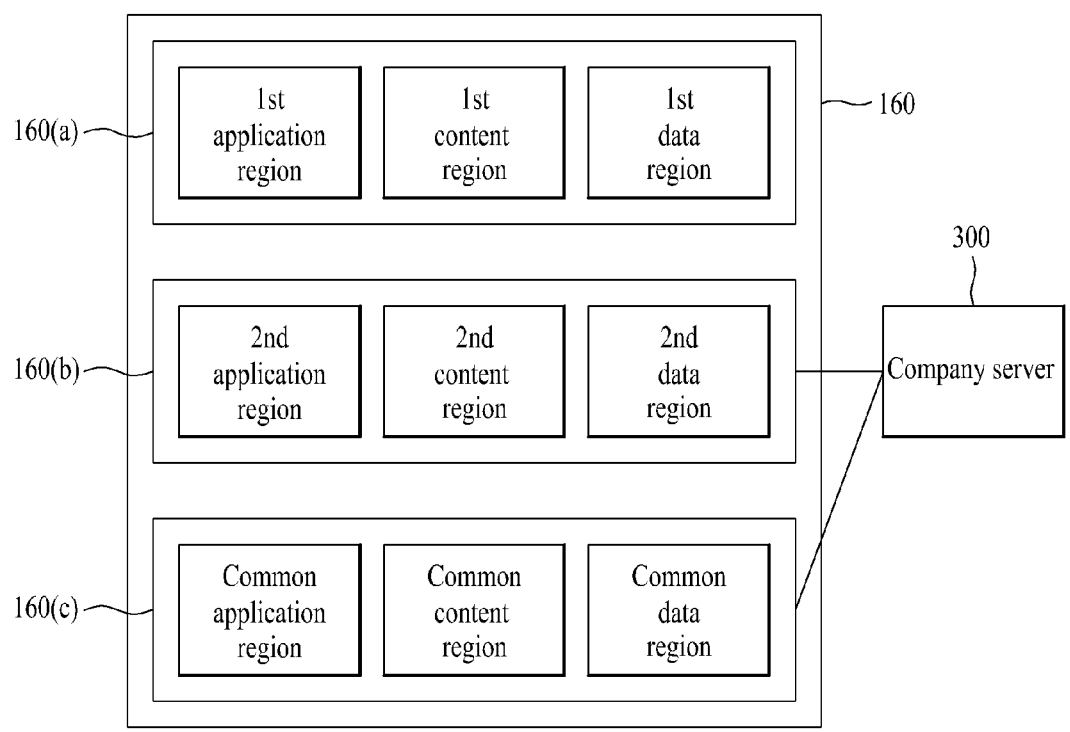

FIGS. 3A to 3C are block diagrams of components required for implementation of a plurality of modes and a mode switching among a plurality of the modes according to the present invention.

FIG. 3A is a block diagram of a controller 180 for driving a plurality of operating systems (OSs) and configuring a dedicated screen of a plurality of operating systems. In addition, FIG. 3B is a block diagram of a screen processor 185 shown in FIG. 3A. In particular, FIG. 3A and FIG. 3B show when a plurality of the operating systems are provided in parallel with each other (cf. FIG. 4A(a), FIG. 4B).

According to the present invention, a plurality of the modes can be implemented by a plurality of the operating systems, respectively. In particular, the operating system for supporting implementation can differ per mode.

Referring to FIG. 3A, a controller 180 can include a screen processor 185, a driver 186, a hypervisor 187 and a main processor 188. In this instance, the hypervisor 187 can be called such a terminology as a virtual engine (virtual machine), a virtualizing module (virtualization), a virtual engine monitor (virtual machine monitor), a virtualization module monitor (virtualization monitor) and the like. This terminology is just exemplary. In addition, a component capable of performing the same function of the hypervisor 187 is non-limited by the corresponding terminology.

A frame buffer is provided to each of a plurality of the operating systems stored in the memory 160. If a plurality of the operating systems are driven, the screen processor 185 receives a frame corresponding to a dedicated screen of the corresponding operating system from each of the frame buffers and then determines whether to display the dedicated screen of a prescribed one of the operating systems on a screen of the display unit 151 under the control of the main processor 188.

Under the control of the main processor 188, the screen processor 185 displays the dedicated screen of the specific operating system on the whole screen of the display unit 151 (e.g., when implementing one mode only). Alternatively, the screen processor 185 generates one integrated frame by combining and/or editing the frames received from the frame buffers and can then display an integrated dedicated screen including all the dedicated screens of a plurality of the operating systems (e.g., when implementing a plurality of the modes).

Referring to FIG. 3A, a plurality of the operating systems OS1, . . . OS N are prepared in parallel with each other, which can be described in detail with reference to FIG. 4A(a) and FIG. 4B as follows.

Figure 4A:
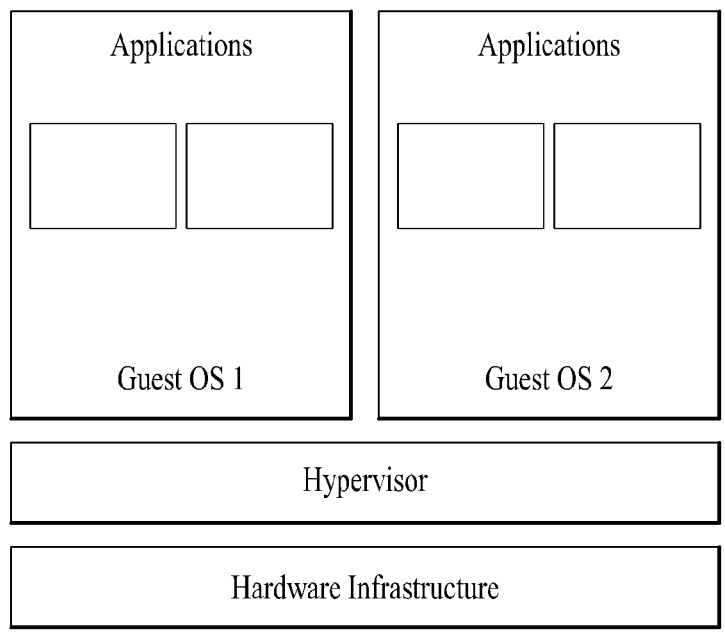
FIGS. 4A to 4C are block diagrams of components required for operating a plurality of operating system for implementing a plurality of modes according to the present invention.
Figure 4A:
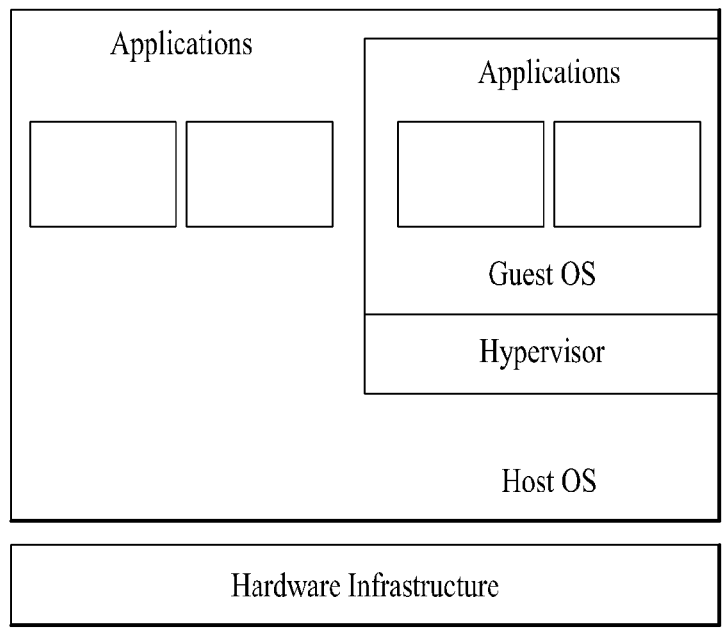
Figure 4B:
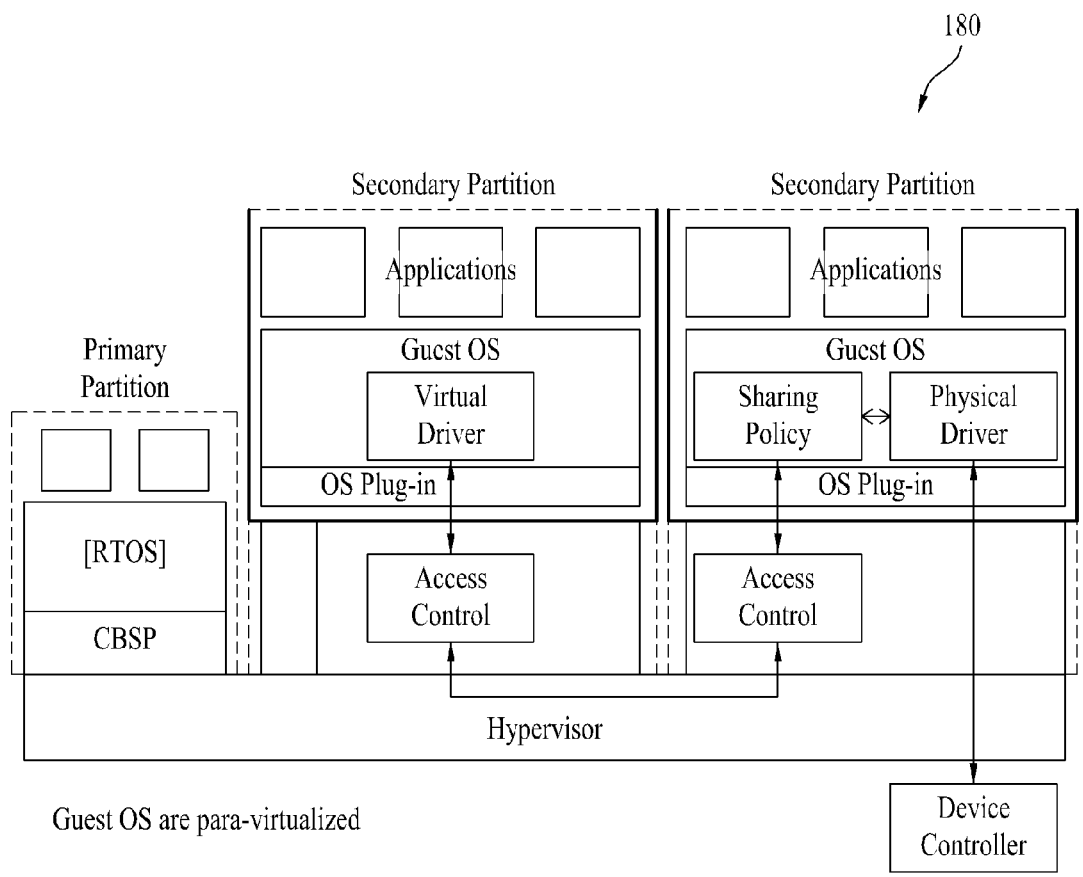

FIG. 4A(a) and FIG. 4B show a scheme of booting a plurality of operating systems Guest OS 1 and Guest OS 2 respectively supporting different modes in parallel by loading a hypervisor (hereinafter named a first scheme).

Referring to FIG. 4A(a) and FIG. 4B, the mobile terminal 100 can implement Guest OS 1 and Guest OS 2 selectively, sequentially or simultaneously. In addition, a different mode can be designated to each of the Guest OS 1 and the Guest OS 2. In this instance, the operation of the Guest OS 1 and the Guest OS 2 and the corresponding mode activation can be performed by the hypervisor. The components shown in FIG. 4B can perform general operations related to the virtualization engine technology.

Multi-OS booting and mode activation corresponding to the multi-OS booting are described in detail as follows. First of all, in case (1) of activating a mode corresponding to the currently booted Guest OS 1 or Guest Os 2 or in case (2) of booting the Guest OS 1 corresponding to first mode and the Guest OS 2 corresponding to a second mode sequentially or simultaneously, the controller 180 (particularly, the hypervisor) implements and activates either the first mode or the second mode (2-1) or can activate either the first or second mode despite implementing both of the first and second modes (2-2).

Referring now to FIG. 3, the screen processor 185, includes a layout manager 185a and a display driver 185b (FIG. 3B). Under the control of the main processor 188, the layout manager 185a generates one integrated frame by combing or editing the frames received from the frame buffers and the display driver 185*b* then controls the frame generated by the layout manager 185*a* to be displayed on the display unit 151.

The driver 186 controls the entire operating systems to be driven. The hypervisor 187 is a middleware between the main processor 188 and each of the operating systems and includes a virtualization engine configured to a plurality of the operating systems to be usable in the mobile terminal 100 according to the present invention. In addition, the main processor 188 controls all operations related to the driving of a plurality of the operating systems according to the present invention.

As mentioned in the above description, the screen processor 185, the driver 186, the hypervisor 187 and the main processor 188 can be included in the controller 180 or can be stored as software in the memory 160.

FIG. 3C is a block diagram of the memory 160 having a database storage region corresponding to each of a plurality of the modes.

According to the present invention, the mobile terminal can manage the database storage regions of a plurality of the modes discriminatively. In particular, when a plurality of the modes are implemented by the different operating systems, respectively, the mobile terminal can manage the database storage regions of a plurality of the modes discriminatively.

Generally, when at least one operating system capable of implementing a first mode and a second mode is provided, the memory 160 is ale to store an application corresponding to each of the at least one operating system. Therefore, the provided at least one or more operating systems can be booted selectively or simultaneously under the control of the controller 180.

For instance, the operating system can include such a commercial OS as Android OS, Linux based OS, Windows Mobile OS, Apple OS and the like. In addition, a dedicated application can be differently set for each of the operating systems. In addition, a multi-OS can include different kinds of operating systems (e.g., Android OS, Apple OS, etc.) and the same kinds of operating systems (e.g., 2.1 version of Android OS, 2.2 version of Android OS, etc.) differing from each other in version.

According to the present invention, assuming that both of the first mode and the second mode can be implemented, the memory 160 can include a first database storage region 160(*a*) corresponding to the first mode, a second database storage region 160(*b*) corresponding to the second mode, and a common database storage region 160(*c*) in common with the first mode and the second mode. Occasionally, the common database storage region 160(*c*) can be omitted. In this instance, a commonly-designated application and content or data associated with the corresponding application can be stored in the database storage region of the corresponding mode.

In particular, in configuring the first, second and common database storage regions, the mobile terminal 100 uses memories different from each other in hardware as the storage regions, puts restriction on accessing the storage regions per mode despite providing the storage regions within a same memory, or can discriminate the storage regions from each other using a storage partition per mode.

In this instance, the same operating system implements the first mode and the second mode or different operating systems can implement the first mode and the second mode, respectively. Moreover, at least two or modes can be implemented by the mobile terminal 100. If so, the database storage regions can be further subdivided.

In particular, the first database storage region 160(*a*) can include a region (i.e., a first application region) for storing at least one first application executable in the first mode, a region (i.e., a first content region) for storing a content associated with the first application and a region (i.e., a first data region) for storing data associated with the first application.

In addition, the second database storage region 160(*b*) can include a region (i.e., a second application region) for storing at least one second application executable in the second mode, a region (i.e., a second content region) for storing a content associated with the second application and a region (i.e., a second data region) for storing data associated with the second application.

Moreover, the common database storage region 160(*c*) can include a region (i.e., a common application region) for storing at least one common application executable in both of the first mode and the second mode, a region (i.e., a common content region) for storing a content associated with the common application and a region (i.e., a common data region) for storing data associated with the common application.

When the second mode is a business mode that facilitates a user's public life, information stored in the second database storage region 160(*b*) and information corresponding to the second mode in the common database storage region 160(*c*) can be utilized only if the corresponding information is stored in a manner of being shared with a company server 300, the corresponding information is stored in the company server 300 (i.e., the second database storage region 160(*b*) is unnecessary) or the company server 300 is accessed. In this instance, the company server 300 can include a server of a company, for which a user works, a server of a specific company designated by a user (or a company where the user works), or the like.

While the first mode is activated, the mobile terminal 100 can utilize the information stored in the first database storage region 160(*a*) and the information corresponding to the first mode in the common database storage region 160(*c*). While the second mode is activated, the mobile terminal 100 can utilize all the information stored in the first, second and common database storage regions 160(*a*), 160(*b*) and 160(*c*).

Alternatively, while the second mode is activated, the mobile terminal 100 can utilize the information stored in the first database storage region 160(*a*) and the information corresponding to the second mode in the common database storage region 160(*c*). While the first mode is activated, the mobile terminal 100 can utilize all the information stored in the first, second and common database storage regions 160(*a*), 160(*b*) and 160(*c*).

Optionally, it can control the mobile terminal 100 not to utilize the information on the first mode in the course of the activated second mode.

Besides, although the drawing shows that the application region, the content region and the data region are situated in the database storage region, the application region, the content region and the data region can be integrated together if necessary.

Figure 4C:
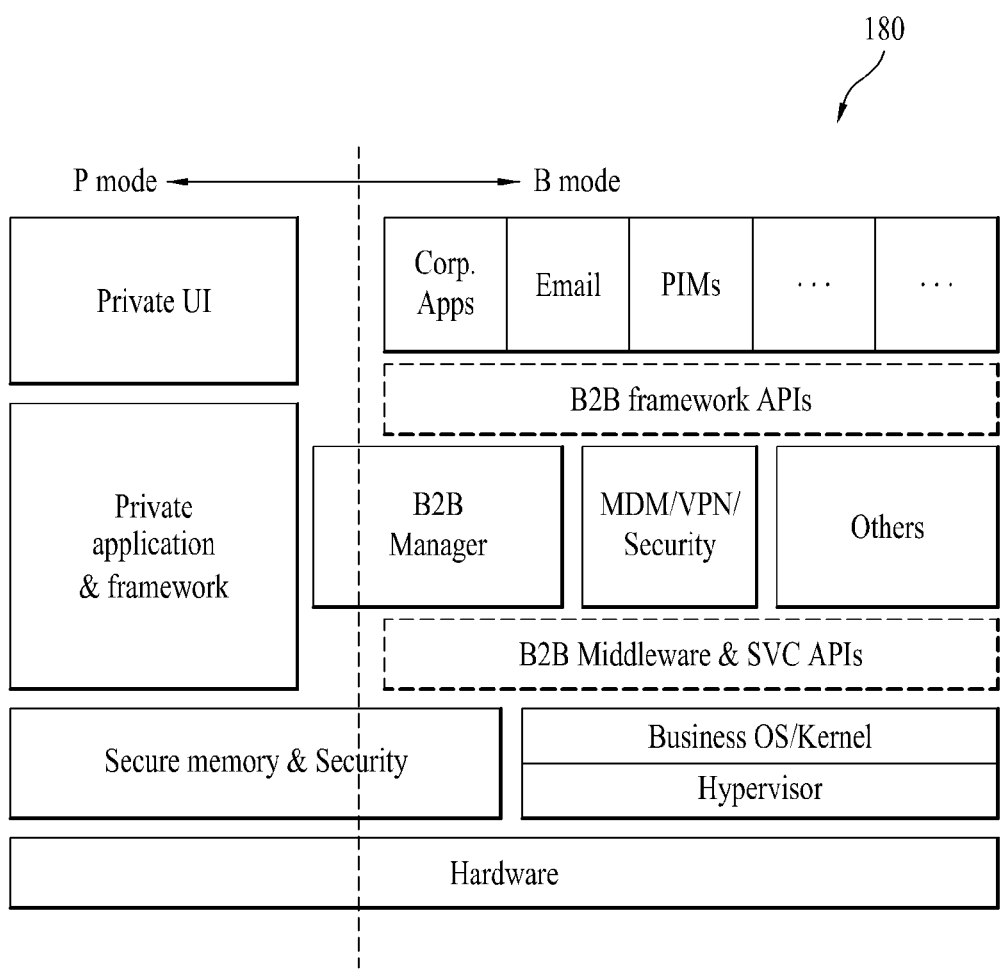

FIG. 4A(b) and FIG. 4C show a scheme of driving a hypervisor on a Host OS for supporting one mode to boot a Guest OS for supporting another mode (hereinafter named a second scheme). In particular, a mode supported by the Host OS can include a private mode. In addition, a mode supported by the Guest OS can include a business mode.

In more particular, referring to FIG. 4C, a B2B manager can perform a switching operation between a private mode (hereinafter abbreviated a P mode) and a business mode (hereinafter abbreviated a B mode). Components shown in a P mode region of the two regions partitioned by a dotted line can operate when the private mode implementation, components shown in the B mode region can operate when the business mode implementation, and components included in both of the modes can operate in both of the modes.

According to the present invention, the mobile terminal 100 can implement a plurality of modes on an operating system selectively, simultaneously or sequentially. A different operating system (hereinafter named an individual operating system) is designated to each of a plurality of the modes or a common operating system can be designated to a plurality of the modes. Specifically, implementation of a plurality of the modes can be controlled by the hypervisor 187.

In particular, a currently implemented or activated mode in accordance with an individual or common operating system is defined as follows. For clarity and convenience of the following description, assume that a plurality of modes include a first mode and a second mode. Of course, at least two or more modes can exist if necessary.

First of all, when a common operating system is booted, the controller 180 implements and activates either the first mode or the second mode (1) or can activate either the first mode or the second mode despite implementing both of the first and second modes.

When an individual operating system is booted, the controller implements and activates a mode corresponding to a currently booted individual operating system (1), implements and activates a mode corresponding to one of he first mode and the second mode when booting a first operating system corresponding to the first mode and a second operating system corresponding to the second mode sequentially or simultaneously (2-1), or activates either the first mode or the second mode despite implementing both of the first mode and the second mode (2-2).

In the following description, how to discriminate a plurality of modes from each other is explained in detail.

First of all, according to the present invention, each of a plurality of modes can be discriminated by at least one of a mode indicator, a database storage region, an operating system, a user access authority, an application configuration, a content configuration, a data configuration, an application feature, an application group, a group identifier and the like.

A case of discriminating a plurality of modes using a mode indictor according to a first embodiment is explained as follows.

First of all, each of a plurality of modes can have an indicator different to indicate a corresponding mode. An indicator per mode is basically stored in the mobile terminal 100 or can be downloaded from an external server or an external terminal. The indicator per mode is set or selected by a user or can be randomly set by the controller 180.

For instance, each of a plurality of the modes can have a different one of a mode icon, a mode image, a background image, a background color/brightness, a letter font/color/size, a home screen picture (number of pages and page indicator included), an application arrangement structure (e.g., the number of applications included in one home screen, etc.), an application identifier, an LED color, an alarm sound such as a bell sound and the like, a keypad type (backlight color of keypad included), a mode switching key zone, a group identifier (described later) and the like. Of course, those examples of the mode indicator are just exemplary and can include all display elements for discriminating a mode.

This is explained in detail with reference to FIGS. 5A to 5D. For clarity and convenience of the following description, assume that a first mode and a second mode include a private mode and a business mode, respectively. In addition, assume that either the private mode or the business mode is in an active state.

FIGS. 5A to 10C are diagrams for discriminating a plurality of modes according to the present invention.

Figure 5A:
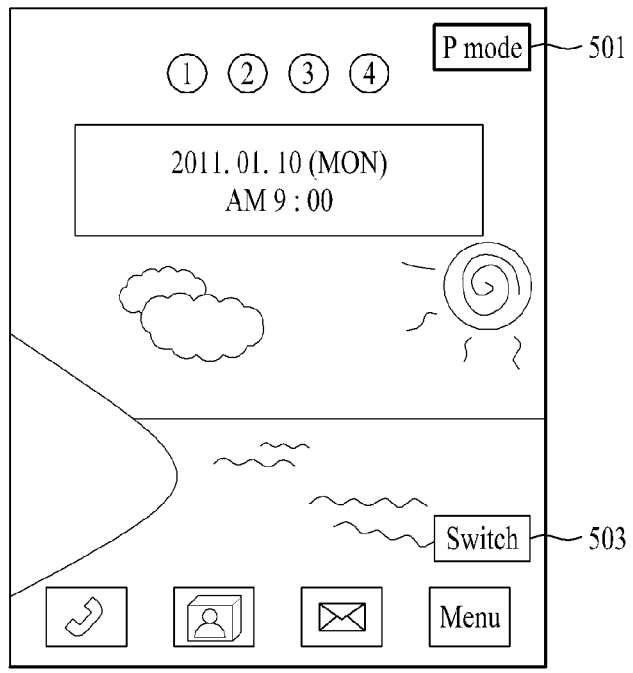
FIGS. 5A to 10C are diagrams for discriminating a plurality of modes according to the present invention.
Figure 5A:
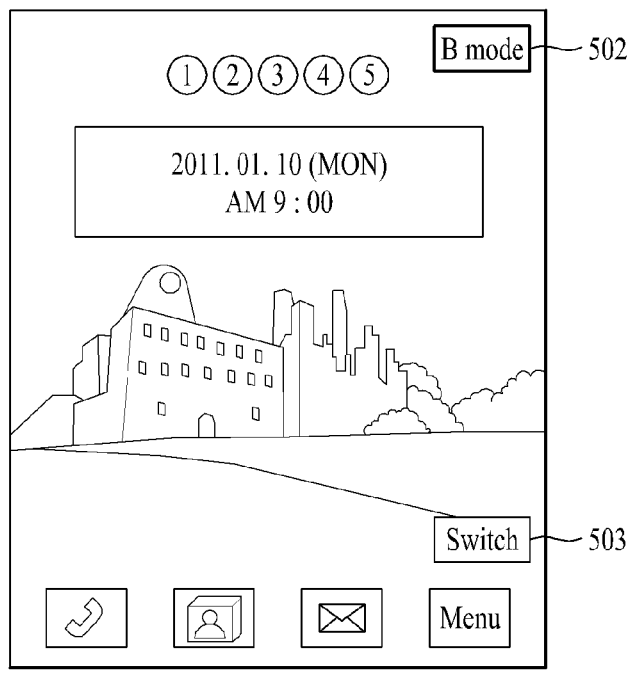

Referring to FIG. 5A, if a personal mode is currently activated, the mobile terminal 100 can display an icon (P mode) 501 corresponding to the private mode on a prescribed region of a screen (FIG. 5A(a)). If a business mode is currently activated, the mobile terminal 100 can display an icon (B mode) 502 corresponding to the business mode on a prescribed region of a screen (FIG. 5A(b)).

Figure 5B:
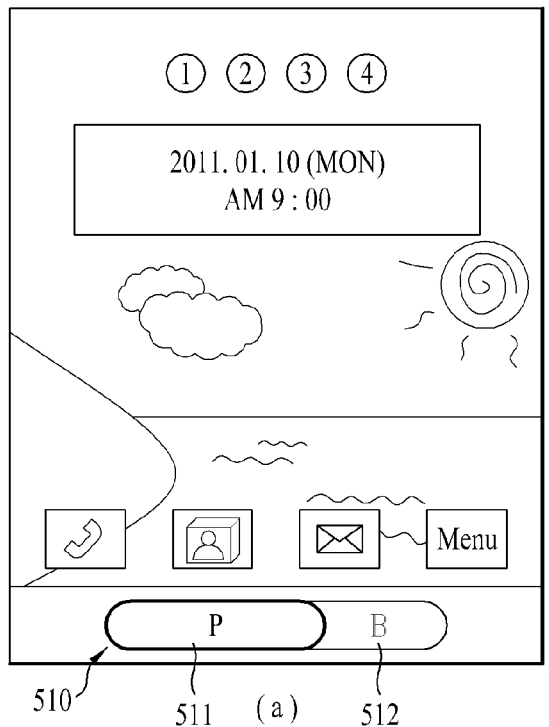
Figure 5B:
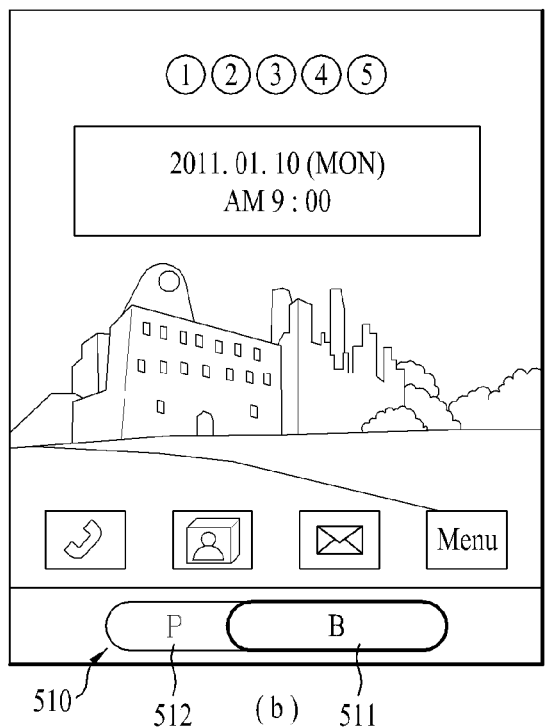

Referring to FIG. 5B, the mobile terminal 100 includes a mode switching key region 510 provided to a prescribed region of the screen. If the private mode is currently activated, the mobile terminal 100 can discriminatively display a zone (P) 511 corresponding to the private mode in the mode switching key region 510 (FIG. 5B(a)). If the business mode is currently activated, the mobile terminal 100 can discriminatively display a zone (B) 512 corresponding to the business mode in the mode switching key region 510 (FIG. 5B(b)).

Figure 5C:
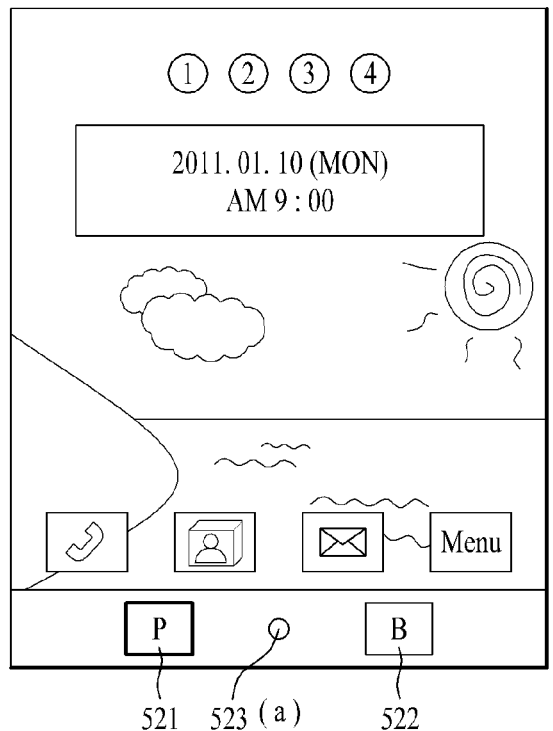
Figure 5C:
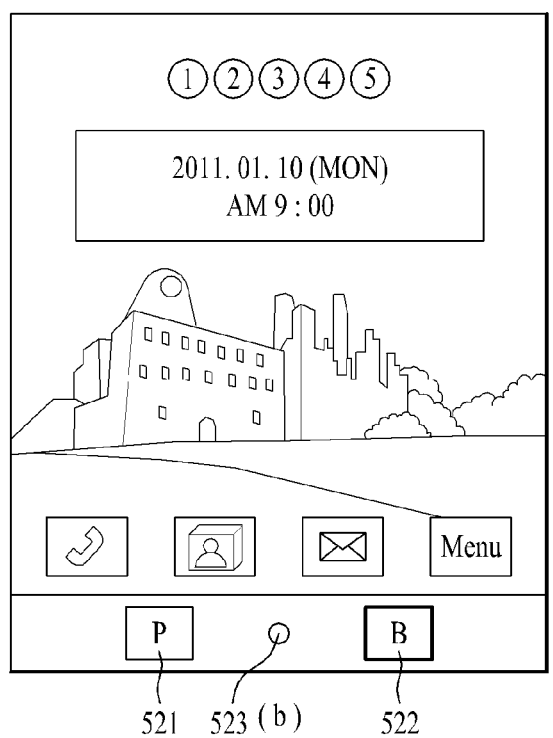

Referring to FIG. 5C, a private mode zone 521, a business mode zone 522 and a switching command zone 523 are provided to the screen of the mobile terminal 100. If the private mode is currently activated, the mobile terminal 100 can discriminatively display the private mode zone (P) 521 (FIG. 5C(a)). If the business mode is currently activated, the mobile terminal 100 can discriminatively display the business mode zone (B) 522 (FIG. 5C(b)).

Figure 5D:
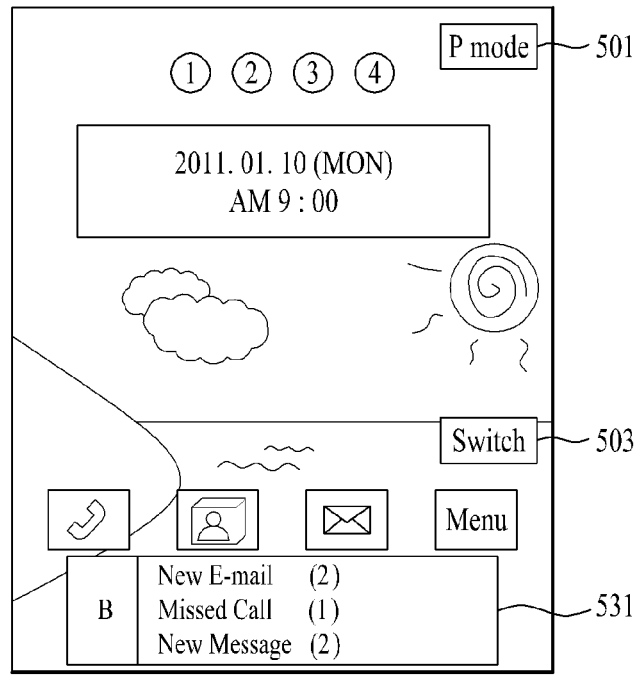
Figure 5D:
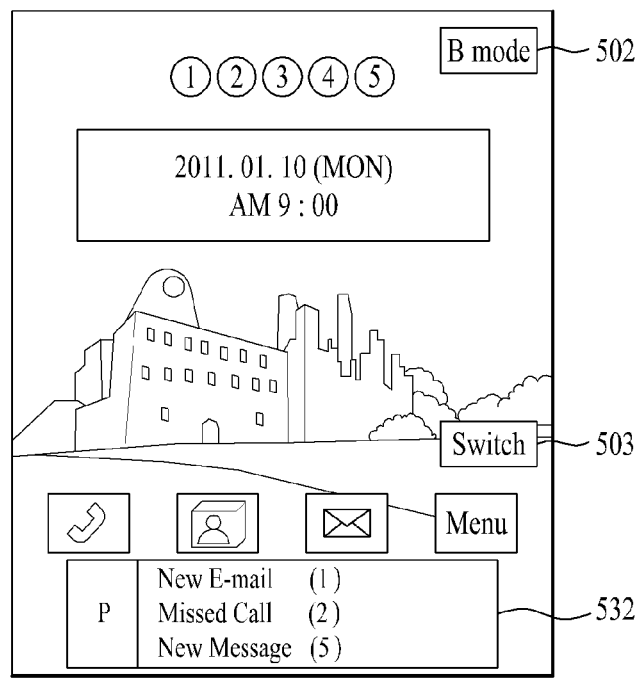

Referring to FIG. 5D, if the private mode is currently activated, the mobile terminal 100 can display an announcement window 531 for announcing events (e.g., email, message, call, etc.) occurring in association with the business mode or the number of the events (or, occurrence time, counterpart information, etc.) on a prescribed region of the screen (FIG. 5D (a)). If the business mode is currently activated, the mobile terminal 100 can display an announcement window 532 for announcing events (e.g., email, message, call, etc.) occurring in association with the private mode or the number of the events (or, occurrence time, counterpart information, etc.) on a prescribed region of the screen (FIG. 5D(b)).

In the following description, a case of discriminating a plurality of modes using a database storage region according to a second embodiment is explained.

First of all, a plurality of the modes can discriminatively have database storage regions within the memory 160, respectively (cf. FIG. 3C).

Each of a plurality of the modes can utilize the information stored in the corresponding database storage region or the corresponding information stored in the common database storage region only. Moreover, it can set the information on one mode not to be utilized in other modes. Besides, one (e.g., business mode) of a plurality of the modes can utilize information on another mode (e.g., private mode), whereas the latter mode can be set not to use the information on the former mode.

If the information on the first mode can be utilized in the second mode (yet, the first mode is unable to utilize the information on the second mode), it can be said that an access restriction is put on the second mode or that a higher security level is set on the second mode (described later).

This is explained in detail with reference to FIGS. A to 7B as follows. For clarity and convenience of the following description, assume that a first mode and a second mode include a private mode and a business mode, respectively. Assume that either the private mode or the business mode is in an active state. In addition, assume that a common application of the first and second modes is currently executed.

Figure 6A:
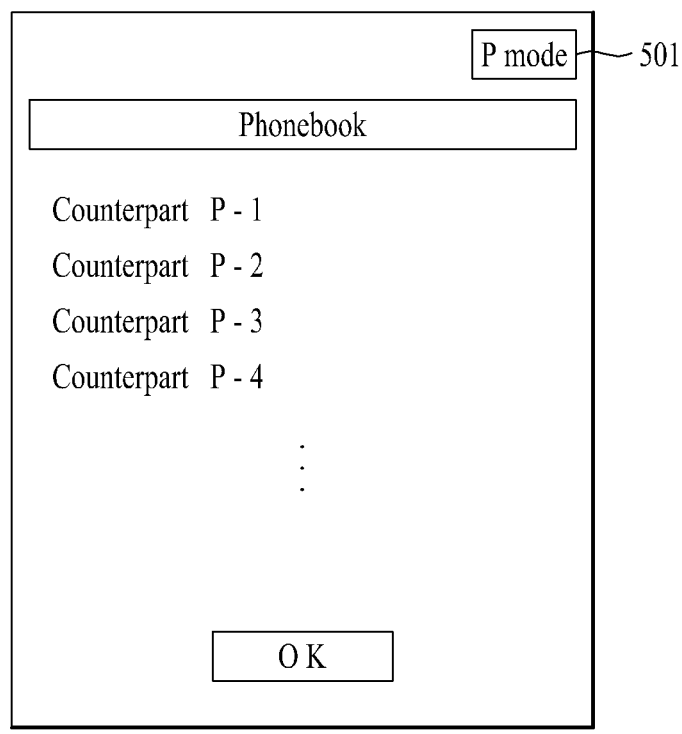

Referring to FIG. 6A, when a phonebook (example of a common application) is being executed in the private mode, the mobile terminal 100 extracts counterpart information corresponding to the private mode from counterpart information associated with the phonebook only and can then display the extracted counterpart information.

Figure 6B:
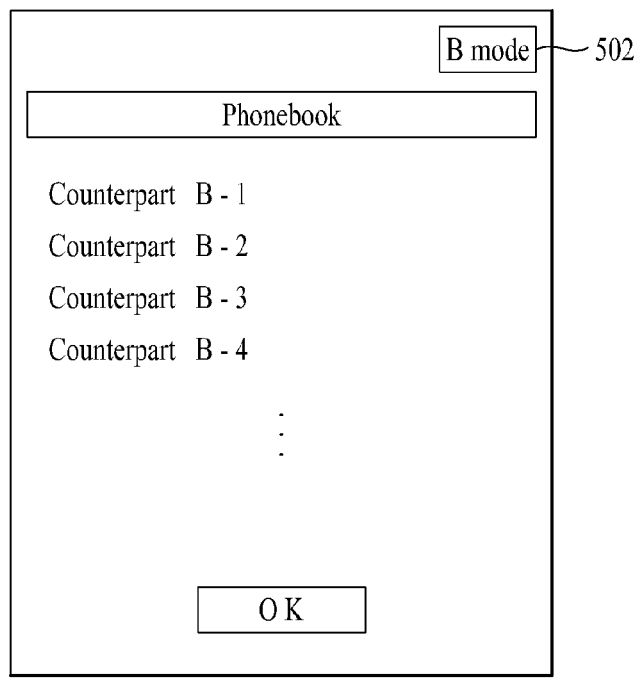
Figure 6B:
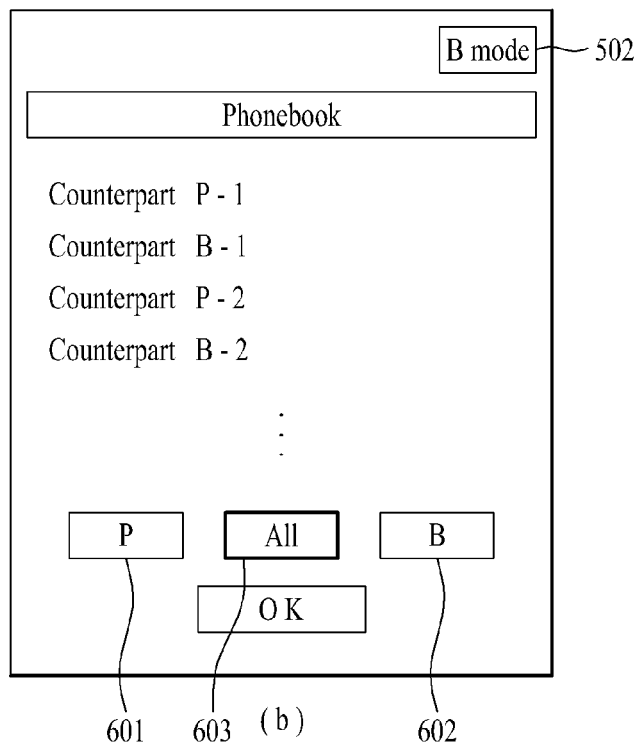

Referring to FIG. 6B, when executing a phonebook in the private mode, the mobile terminal 100 extracts counterpart information corresponding to the business mode from counterpart information associated with the phonebook and then displays the extracted counterpart information (FIG. 6B(a)). Alternatively, the mobile terminal 100 extracts counterpart information corresponding to either the private mode or the business mode and can then display the extracted counterpart information (FIG. 6B(b)).

In particular, FIG. 6B(b) shows when a zone (All) 603 is activated. If a privacy zone (P) 601 is activated, the mobile terminal 100 can selectively display the counterpart information corresponding to the private mode only. If a business zone (B) 602 is activated, the mobile terminal 100 can selectively display the counterpart information corresponding to the business mode only.

Figure 7A:
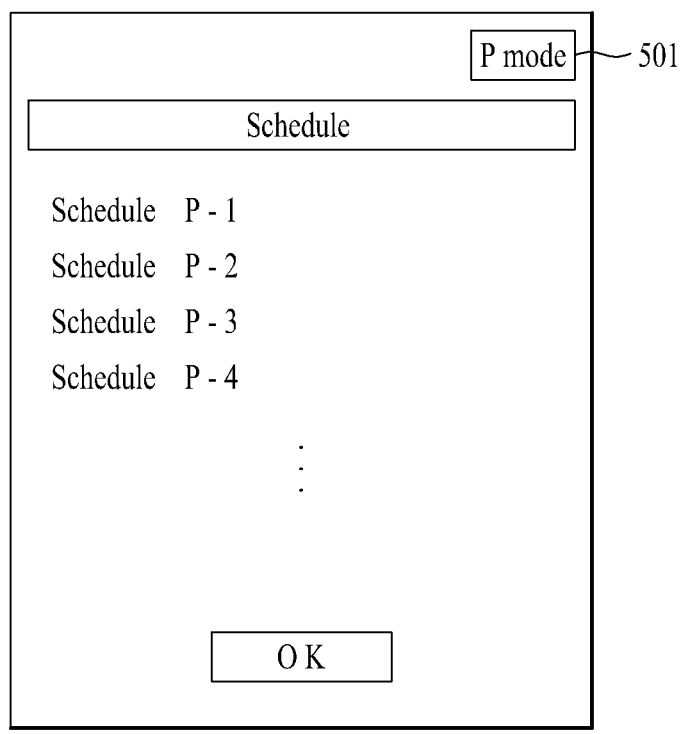

Referring to FIG. 7A, when a schedule management (example of a common application) is being executed in the private mode, the mobile terminal 100 extracts schedules corresponding to the private mode from schedules associated with the schedule management only and can then display the extracted schedules.

Figure 7B:
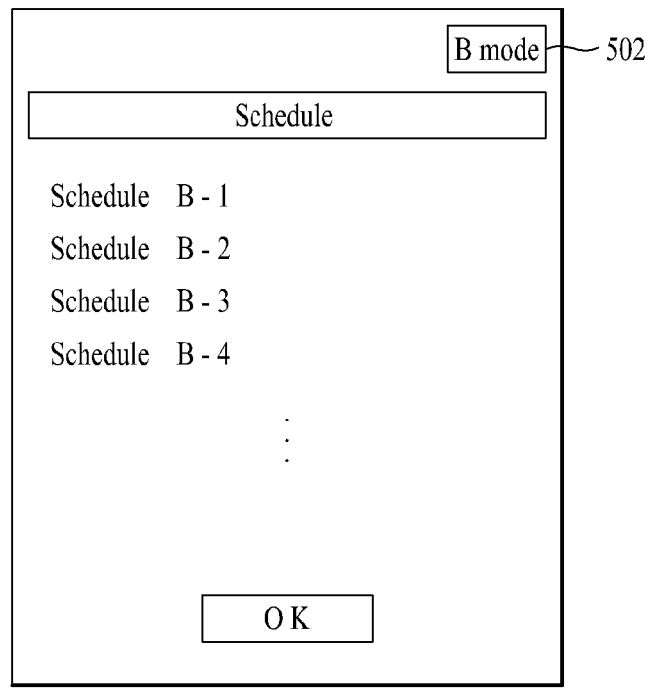
Figure 7B:
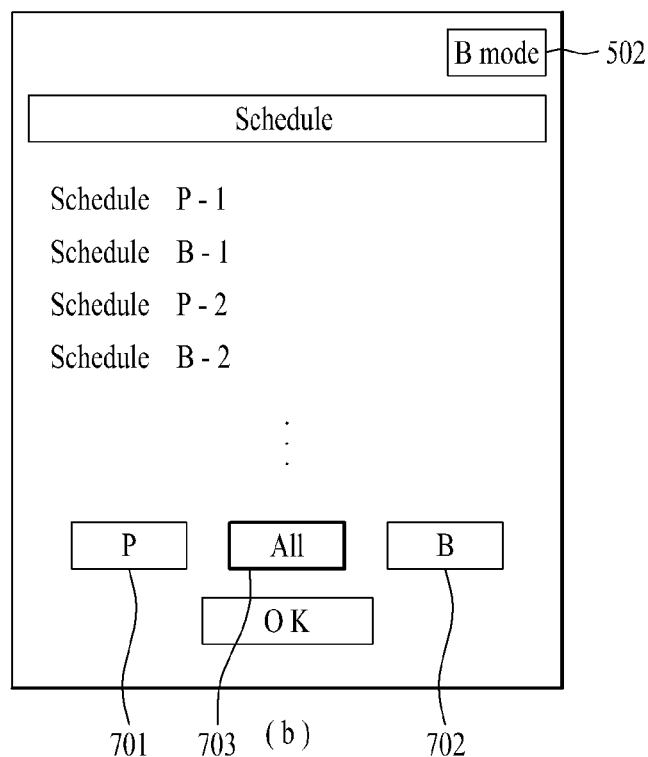

Referring to FIG. 7B, when executing a schedule management in the private mode, the mobile terminal 100 extracts schedules corresponding to the business mode from schedules associated with the schedule management and then displays the extracted schedules (FIG. 7B(a)). Alternatively, the mobile terminal 100 extracts schedules corresponding to either the private mode or the business mode and can then display the extracted schedules (FIG. 7B(b)).

In particular, FIG. 7B(b) shows when a zone (All) 703 is activated. If a privacy zone (P) 701 is activated, the mobile terminal 100 can selectively display the schedules corresponding to the private mode only. If a business zone (B) 702 is activated, the mobile terminal 100 can selectively display the schedules corresponding to the business mode only.

Specifically, referring to FIGS. 6A to 7B, although the private mode is unable to access the information on the business mode or the database storage region storing the information on the business mode, the business mode can freely access the information on the private mode or the database storage region storing the information on the private mode.

According to a third embodiment, each of a plurality of modes can be discriminated by a corresponding user access authority. For clarity and convenience of the following description, assume that a plurality of the modes include a first mode and a second mode.

Regarding each of a plurality of the modes, as a different security level is set, a user access authority can be changed (1). Regarding each of a plurality of the modes, if an access restriction is put on one mode but an access restriction is not put on the other mode, a user access authority can be changed (2).

For this, in order to enter a specific one of a plurality of the modes, an authentication procedure can be requested. Hence, the specific mode can be entered only if a valid authentication procedure is performed to enter the specific mode. In particular, if an access restriction or a security level over a predetermined reference is put on the specific mode, an authentication procedure can be requested.

For instance, in a mode having a high user access authority, information corresponding to a mode having a low user access authority or a database storage region of the corresponding information is freely accessed and can be freely utilized. On the contrary, in a mode having a low user access authority, it is unable to access information corresponding to a mode having a high user access authority or a database storage region of the corresponding information.

When entering or switching to a mode having a high user access authority, an input of a user authentication information is requested. If a valid user authentication information is input, the mobile terminal 100 can enter or switch to the mode having the high user access authority (example of an authentication procedure). When a mode having a low security level, the mobile terminal 100 is requested to input a user authentication information (e.g., name, social security number, etc.) of a low level. When a mode having a high security level, the mobile terminal 100 is requested to input a user authentication information (e.g., name, social security number, specific touch pattern, specific password, etc.) of a high level.

Regarding management (e.g., input, inquiry, editing, etc.) of information (e.g., content, data, etc.) on an application in accordance with a user access authority, three kinds of cases are described in detail as follows. For clarity and convenience of the following description, assume that a plurality of modes include a first mode and a second mode.

First of all, according to a first case, there can exist applications to which contents or data can be input regardless of a mode. For instance, the content or data inputtable application can include such an application for performing a basic function in using a terminal as a schedule management, a scheduler, an email, a message, a messenger, a conference call, a video call, an internet, a phonebook and the like.

According to a second case, like the first case, information input is possible without mode discrimination. Yet, it can discriminate a database storage region per mode (cf. FIG. 3C).

In particular, inter-mode information exchange is impossible but unilateral information exchange is possible. For instance, information transfer from a private mode to a business mode is possible but information transfer from a business mode to a private mode is impossible. For another instance, by setting a plurality of modes to different security levels, respectively, information transfer from a low level to a high level is possible but information transfer from a high level to a low level is impossible.

When a specific situation, an external terminal having a predetermined authority in a remote place deletes information (e.g., application, content, data, etc.) on a specific mode only or can shut down the specific mode itself. For instance, the specific situation can include one of when an employee takes out a terminal without authorization, when a terminal is stolen, when a unregistered storage medium is loaded in a terminal, when a terminal accesses an unsubscribed network, and the like.

Furthermore, regarding a user access authority, it can differentiate an authority for accessing an application, a content, a data or the like, which is available for a business mode, in accordance with a user level (e.g., the user level is determined in consideration of rank in company, duty attribute in company, department in company, etc.) of the mobile terminal 100. In addition, it is also able to differentiate a function for a specific application. For instance, when a user level (e.g., a group head) is equal to or higher than a predetermined reference, an approval grant function is usable. Yet, when a user level (e.g., a company employee) is lower than a predetermined reference, an approval grant function is deactivated. Moreover, the same application can have a usable content/data that differs in accordance with a user level or the same content/data can have a different range of the provided information in accordance with a user level (e.g., a different data field can be configured in accordance with a user level).

Besides, in accordance with a user's authority, an icon associated with a job failing to belong to the corresponding authority is not displayed on a terminal itself. Even if the icon is displayed on the terminal, it can be set not to be executed.

According to a third case, there can exist application (e.g., dedicated applications) accessible to corresponding information as well as operable in either a first mode or a second mode.

For instance, for security matters in a business mode, a photographing function is restricted, a conditional access to a network is granted, or a print function is blocked. When the business mode, a business related application is provided. When a private mode, the business related application may not be provided. Of course, when the private mode, a privacy related application is provided. When the business mode, the privacy related application may not be provided.

Meanwhile, there can exist a content or application specialized in a unilateral mode only. For instance, the application specialized for the business mode can include a company business related application. In addition, the company business related application can perform a function of an upload to a company server, a function of a download to the company server and the like.

In addition, it can put an access restriction (or entry) per mode in accordance with a place or time. For instance, it can set a business mode not to be entered at home. For another instance, it can set a private mode not to be entered on a specific time zone. Occasionally, a separately authorized person can enter the business mode at home or the private mode at office on a specific time zone.

Moreover, since an interface is provided to be shared with users in the business mode, information can be shared with the users. If the business mode is switched to the private mode, the interface provided for the information sharing can be shut down.

Furthermore, there can exist one hardware module (e.g., a common module) usable for a plurality of modes in common or another hardware module (e.g., a dedicated module) usable for a specific one of a plurality of the modes. Hence, if a first mode is currently activated, a common module and a dedicated mode of the first mode are activated, while a dedicated module of a second module is not activated. In this instance, the common module and the dedicated module are designated in accordance with a user selection or can be designated by a decision made by the controller 180 or the company server 300.

For instance, assuming that a first mode and a second mode are a private mode and a business mode, respectively, a common module can include one of a mobile communication module 112 for call and message transmission and reception, a power supply unit 190, a display unit 151, a memory 160 and the like. A dedicated module of the private mode can include one of a camera 121, a position location module 115 and the like. In addition, a dedicated module of the business mode can include a projector module 155 or the like. The above examples of the communication module and the dedicated module are just exemplary, by which the communication module and the dedicated module are non-limited. In addition, the communication module and the dedicated module can be configured in more various ways.

In the following description, a user access authority is explained in detail with reference to FIG. 8A and FIG. 8B. For clarity and convenience of the following description, assume when the same content is accessed.

Figure 8A:
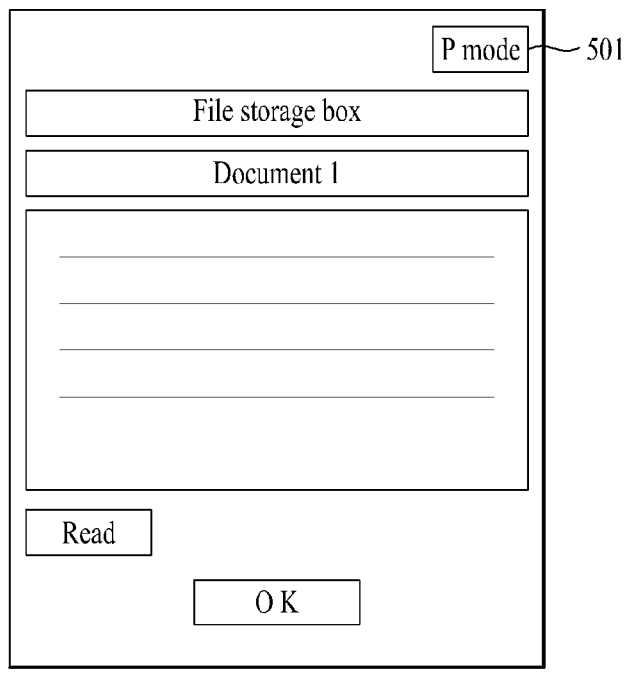
Figure 8A:
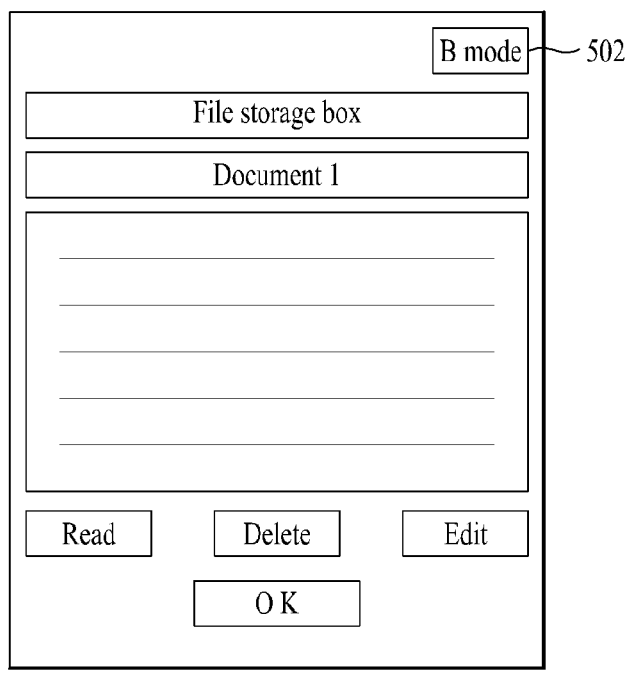

Referring to FIG. 8A, when a document 1 (example of content) is accessed in a private mode, the mobile terminal 100 can grant 'read authority' for the document 1 (FIG. 8A(*a*)). When a document 1 is accessed in a business, the mobile terminal 100 can grant 'read authority, delete authority, edit authority' for the document 1 (FIG. 8A(*b*)). Moreover, if a user is authorized over a predetermined level in a company, an approval authority can be granted to the user for the document 1 that requires approval or authorization.

Figure 8B:
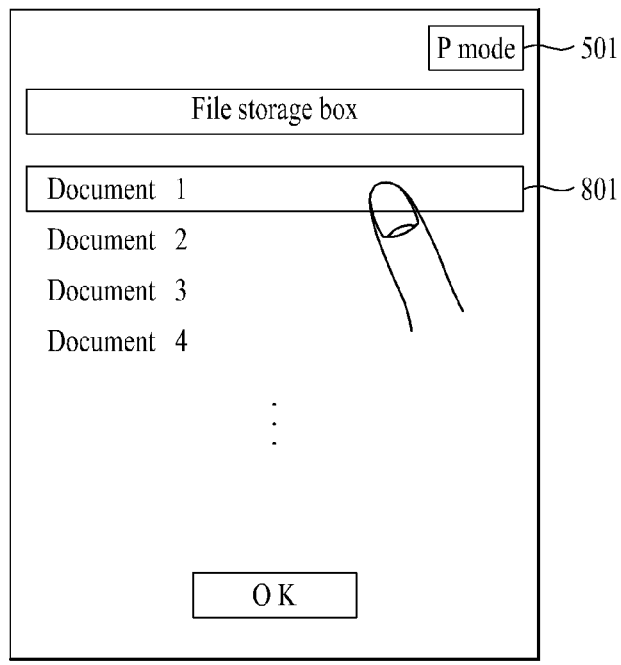
Figure 8B:
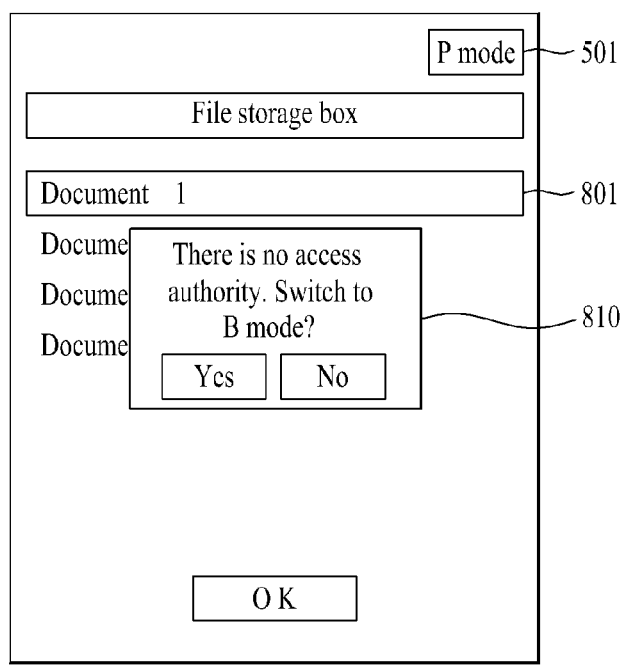

Referring to FIG. 8B, when a file 1 (example of content) corresponding to a business mode is selected from a file list in a private mode (FIG. 8B(a)), the mobile terminal 100 informs a user that there is no access authority on the file 1 and enables the user to select whether to switch the private mode to the business mode to check the file 1 (FIG. 8B(*b*)).

Of course, when the private mode in FIG. 8B, a file corresponding to the business mode may not be included in the file list. In addition, it can display an indictor, which indicates that the file corresponds to the privacy/business mode, on the file list.

Although the user access authority is set per mode in the above description, it can be set per application, content or data if necessary. Therefore, a user authorized with the user access authority can check the same content, whereas an unauthorized user is unable to check the same content.

According to a fourth embodiment, each of a plurality of modes can be discriminated in accordance with at least one of an application configuration, a content configuration and a data configuration.

Each of a plurality of the modes can configure an application different per mode. Even if an application is a common application, each of a plurality of the modes can configure a content or data corresponding to the application differently.

In this instance, if the configuration of the application is different, it means that at least one application (hereinafter named a first dedicated application) dedicated to a first mode and at least one application (hereinafter named a common application) in common with the first mode and a second mode are executed in the first mode or it can mean that at least one application (hereinafter named a second dedicated application) dedicated to the second mode and at least one application (hereinafter named a common application) in common with the first mode and the second mode are executed in the second mode (cf. FIG. 10C).

If the configuration of the content/data is different, it can include both when a substance of the content/data is different and when a substance of the content/data is different in part. Specifically, the latter case can mean that a substance of a specific content corresponding to each of the first mode and the second mode is different even if the specific content is designated to both of the first mode and the second mode. This is enabled in a manner of configuring a data field different per mode for the same content or data.

This is explained in detail with reference to FIG. 9A and FIG. 9B as follows.

Figure 9A:
Figure 9A:

Referring to FIG. 9A, in storing the same counterpart information, the mobile terminal 100 designates different contacts 911 and 921 and different emails 912 and 922 to a private mode and a business mode, respectively, further designates a blog address 913 and a birthday information 914 to the private mode, and further designates an approval authority 923, a rank 924 and a department 925 to the private mode.

Figure 9B:
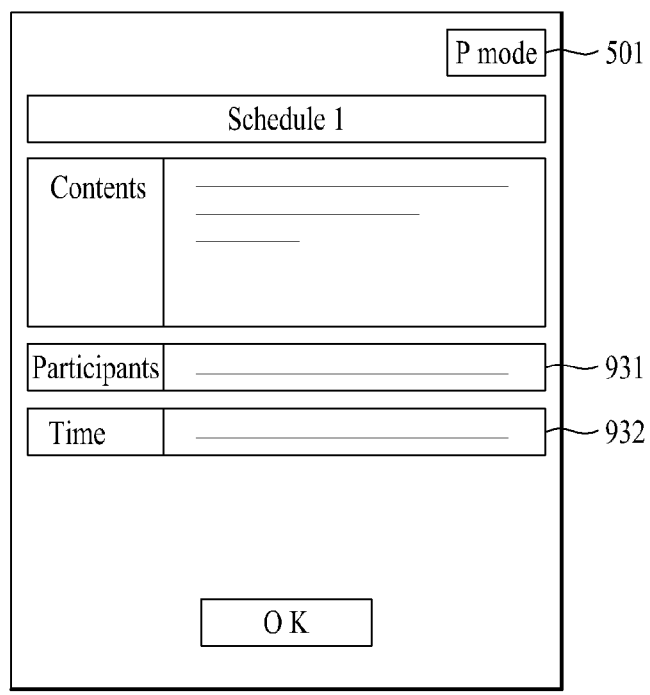
Figure 9B:
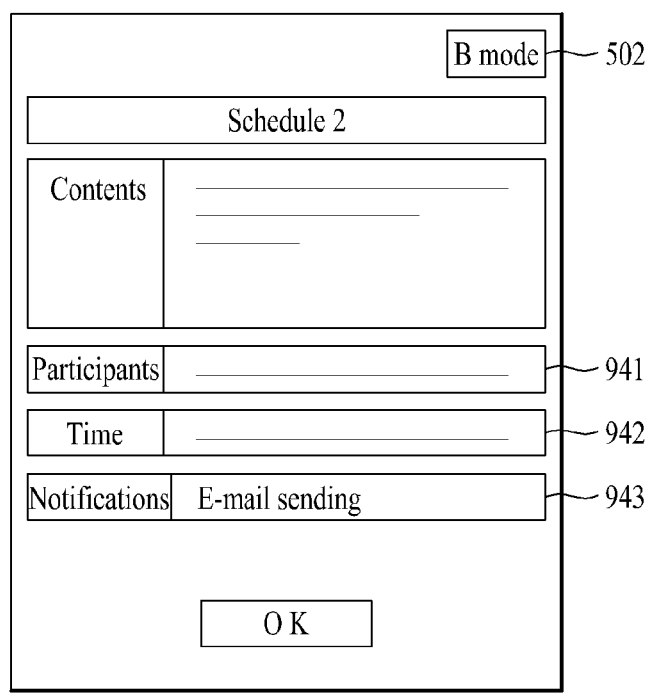

Referring to FIG. 9B, in storing the same schedule, even if a content and participant information 931 and a content and participant information 941 are identically designated to a private mode and a business mode, respectively, the mobile terminal 100 can further designate a time information 932 to the private mode and is also able to further designate a conference room information 942 and a notification 943 to the business mode.

Figure 10A:
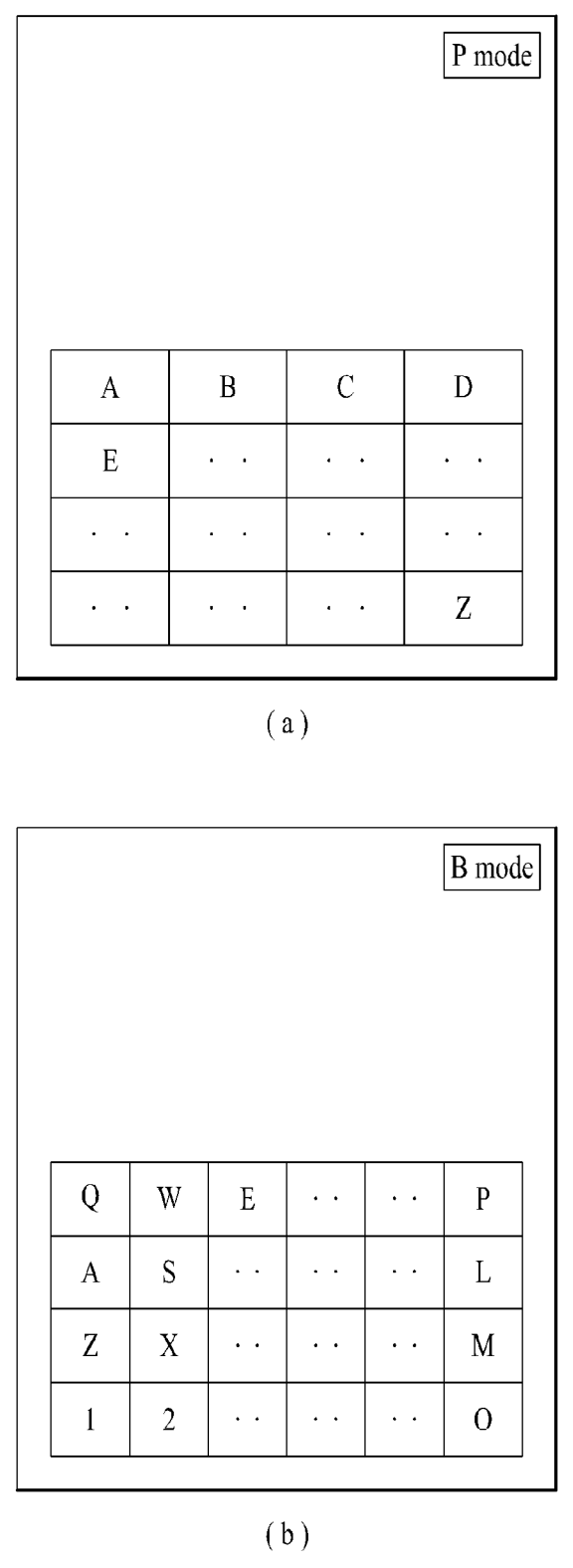
Figure 10B:
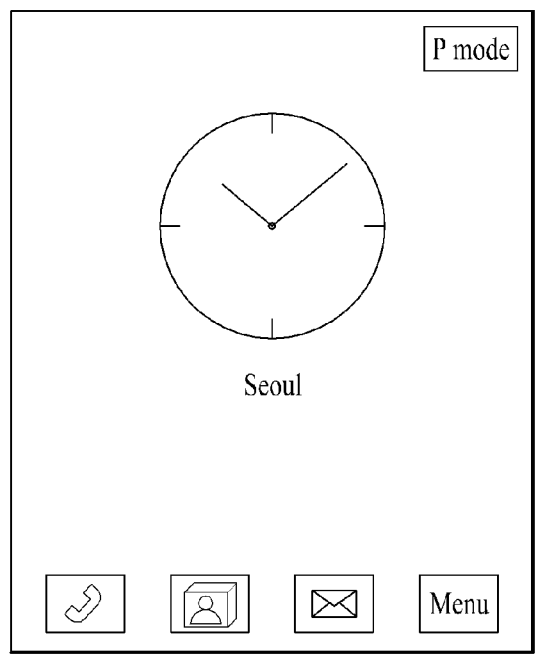
Figure 10B:
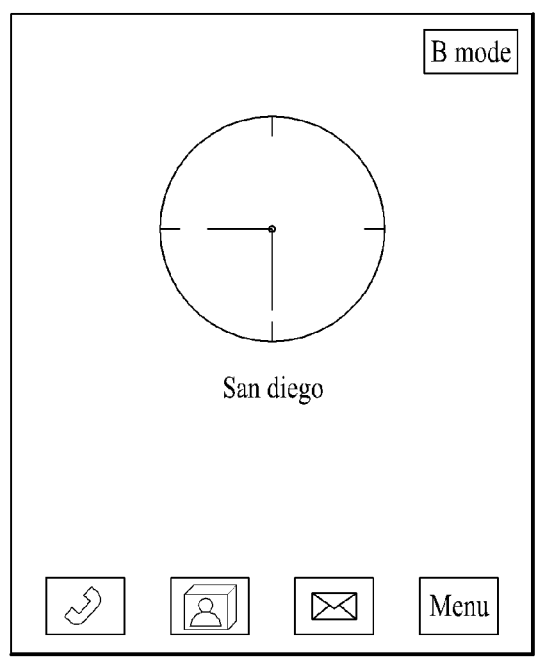

The mobile terminal 100 can set a keypad type different per mode (FIG. 10A) or can set a time zone different per mode (FIG. 10B). The mobile terminal 100 can set a different application and a different backup level of information associated with the application per mode. For instance, the mobile terminal 100 backs up information of a recent week in the private mode and is also able to back up information of a recent month or real-time information in the business mode. Of course, the backup level per mode is set by a user or can be randomly set by the controller 180.

In particular, in the business mode, if a counterpart terminal is not in the business mode or a working hour (or a holiday) currently in consideration of a status (e.g., a currently activated mode, a current location, a time zone, etc.) of the counterpart terminal, with which the mobile terminal 100 currently attempts to contact, the mobile terminal 100 informs a user of the unavailability of the counterpart terminal to enable the user to select whether to make a contact. In doing so, the mobile terminal 100 can receive information indicating the status of the counterpart terminal from the counterpart terminal or a company server and can then obtain the status of the counterpart terminal using the received information.

In the business mode, it can modify all previously-stored schedules to be fitted to a currently belonging time zone by reflecting a current time zone (for when a time zone is changed).

When there is no user input action made for a predetermined period of time in the business mode, it can lock or shut down the business mode automatically or in accordance with a user selection. In this instance, in order to unlock the locked state or cancel the shutdown, a user authentication information corresponding to the business mode is input or an authentication should be granted by the company server. Moreover, in the business mode, when an overseas roaming function is loaded on a user terminal, if a current location of a user is domestic, the overseas roaming function is automatically deactivated. If a current location of a user is overseas, the overseas roaming function can be automatically activated.

According to a fifth embodiment, when at least one common application is executed, each of a plurality of modes can vary its feature to correspond to a currently activated mode. In other words, when a specific application is a common application of a first mode and a second mode, the feature of the specific application can vary in accordance with whether the currently activated mode is the first mode or the second mode.

In this instance, if a feature varies per mode, it can mean that a configuration (e.g., a corresponding content/data configuration included), display or security of an application is varied.

For instance, if a feature varies per mode, it ca mean that a structure (e.g., configuration of a corresponding menu item) of an application, an executed screen (e.g., background image, letter type, letter size, provided information, etc.) of an application, a configuration of content/data associated with an application (cf. FIG. 9A, FIG. 9B), an application function, a security of an application (or, content, data, etc.) or the like is different per mode. Of course, as the examples of the application features are just exemplary, any case of configuring a common application to be different per mode is applicable to the present embodiment.

For instance, when the application function is different, a photographing function is allowed to a camera in a private mode but may not be allowed in a business mode. For another instance, when an authority of access to an application is different, a phonebook provides a counterpart name, a phone number and a personal email address in a private mode and can further provide a company email address, a rank, a department and an approval authority information in a business mode.

This is explained in detail with reference to FIG. 10C as follows. For clarity and convenience of the following description, assume that a plurality of modes include a private mode and a business mode.

Figure 10C:
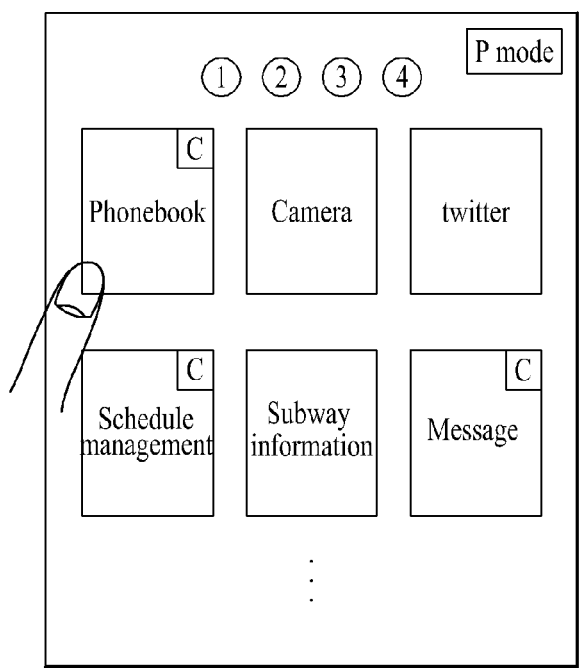
Figure 10C:
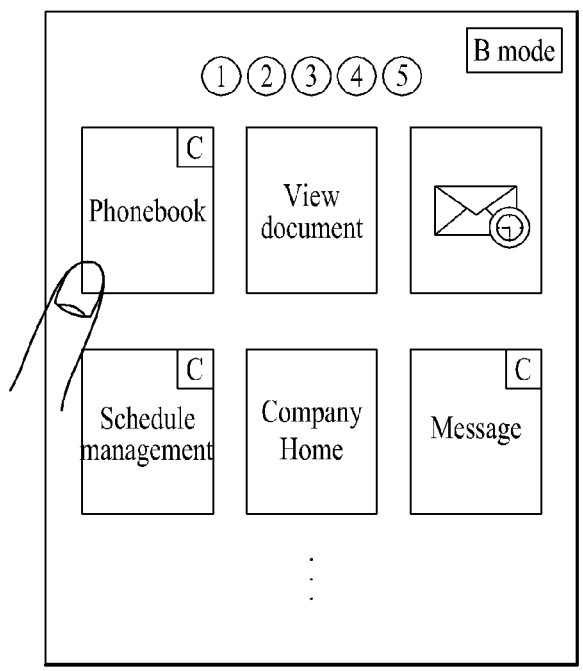

Referring to FIG. 10C, the mobile terminal 100 can receive an input of an execution command signal for executing a phonebook (i.e., an example of a common application) from a user.

The mobile terminal 100 determines a mode activated at the input timing point of the execution command signal. If a private mode is currently activated, the mobile terminal 100 executes the phonebook in accordance with a feature corresponding to the private mode and then displays an executed screen of the phonebook (cf. FIG. 6A or FIG. 9A(*a*)). On the contrary, if a business mode is activated, the mobile terminal 100 executes the phonebook in accordance with a feature corresponding to the business mode and then displays an executed screen of the phonebook (cf. FIG. 6B or FIG. 9A(*b*)).

For instance, when a security of an application is different is explained as follows. First of all, when attempting to execute a common application in a first mode, an authentication procedure is not requested or a low-level security set authentication information needs to be input. Yet, when attempting to execute a common application in a second mode, an authentication procedure is requested or a high-level security set authentication information should be input. In doing so, the application execution can include an output of content or data associated with the application as well as an executed screen display of the application.

According to a sixth embodiment, a plurality of modes can be discriminated from each other using user information corresponding to the modes, respectively. In this instance, the user information can include a user name (or title), a user image, a user phone number, a user email address, a user blog address and the like.

For instance, first and second user information different from each other can be set for first and second modes, respectively. In particular, when a first phone number and a second phone number (e.g., dual SIM) are assigned to the mobile terminal 100, the first phone number and the second phone number can be set for the first mode and the second mode, respectively.

In the above description, the definitions of the modes mentioned in the disclosure are explained. In addition, when a plurality of modes exist, the method of discriminating a plurality of the modes is explained as well.

According to a seventh embodiment, a plurality of modes can be identified by an application group including at least one application executable in at least one mode. Thus, an application group can be configured different per mode.

For instance, assuming that a plurality of modes includes a first mode and a second mode, the controller 180 can configure a first application group corresponding to the first mode and a second application group corresponding to the second mode. In addition, at least one application executable in the first mode and at least one application executable in the second mode can be included in each of the configured first and second application groups.

Moreover, an application operable by linking to a corresponding application can be further included in the first application group (or the second application group) as well as the at least one application executable in the first mode (or the second mode). In particular, this application is included in accordance with a user selection or can be automatically included by the controller 180.

For instance, when a voice call is included in the first application group, a phonebook operable by linking to the voice call, a message and the like can be included in the first application group together. Moreover, at least one application executable in at least two modes can be included in one application group. In other words, at least two modes can correspond to one application group.

Moreover, the application group can be configured in accordance with an application type.

For instance, when application types include a call, a camera, a message, a traffic, an internet and the like, call related application(s), camera related application(s), message related application(s), traffic related application(s), internet related application(s) and the like can be included in each of the application groups per application type.

Moreover, the configuration of the application group is performed by the controller 180 or can be performed in accordance with a user selection.

For instance, when a plurality of modes designated to a specific mode exist, all applications executable in the specific mode can be included in an application group corresponding to the specific mode. In addition, a specific application selected from the application executable in the specific mode can be included in the application group only. Moreover, an application having a specific application type by a type determination per application by the controller 180 or an application selected by a user can be included in the application group corresponding to the specific application type. Of course, at least one application group can be configured for one mode or one application type.

The mobile terminal 100 can also display at least one group identifier indicating the above-configured at least one application group on the screen using the display unit 151, under the control of the controller 180. In this instance, using the group identifier, the mobile terminal 100 provides information on applications included in the corresponding application group, receives a display command signal for indicators of the applications included in the corresponding application group, or can receive an input of a switching command signal for a switching to a mode having the corresponding application designated thereto.

For instance, it can display the group identifier using such a scheme as an icon type, an image type, an animation type, a text type and the like, by which a display type is non-limited. Moreover, the group identifier can be displayed in the same form of the application indicator (this shall be described in the following).

This is explained in detail with reference to FIGS. 11A to 11E. For clarity and convenience of the following description, assume that a plurality of modes include a private mode and a business mode. Moreover, an application indicator mentioned in the following description can be displayed using such a scheme as an icon type, an image type, an animation type, a text type and the like, by which a display type is non-limited.

Figure 11A:
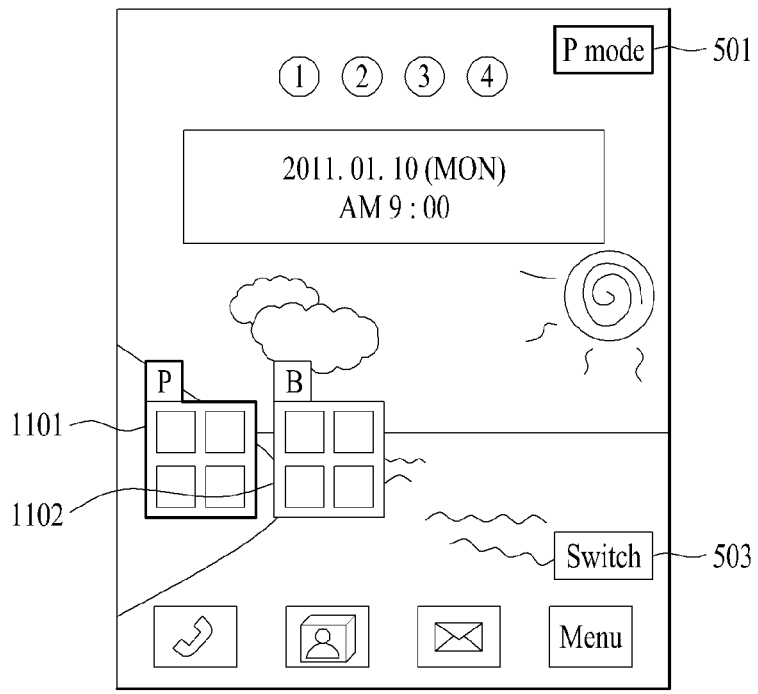
FIGS. 11A to 11E are diagrams for displaying a group identifier corresponding to each of a plurality of modes according to the present invention.
Figure 11A:
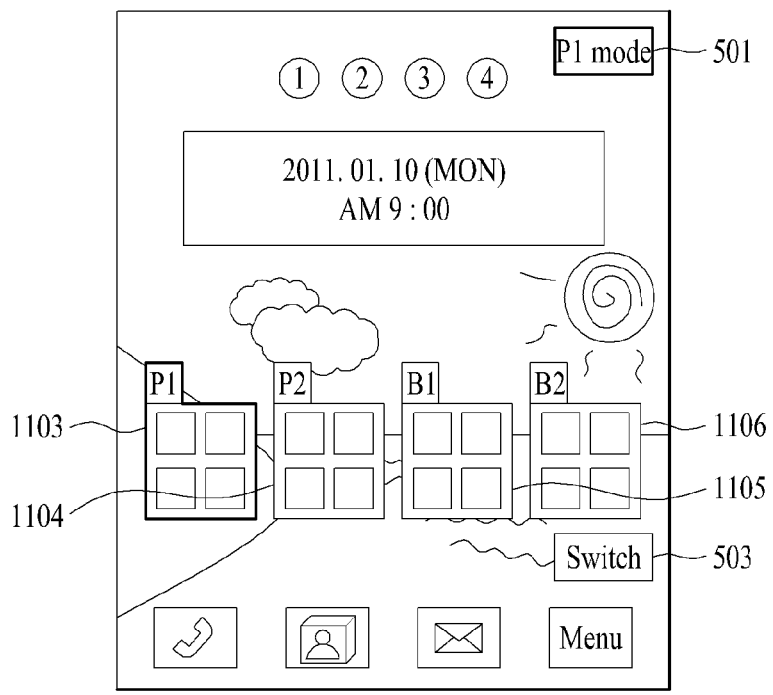

Referring to FIG. 11A, while a private mode is activated, the mobile terminal 100 can display a group identifier 1101 indicating an application group of the private mode and a group identifier 1102 indicating an application group of a business mode on a prescribed region of the screen (FIG. 11A(a)).

In particular, while a first private mode is activated among a plurality of private modes (e.g., a first private mode, a second private mode, etc.) and a plurality of business modes (e.g., a first business mode, a second business mode, etc.), the mobile terminal 100 can display a group identifier 1103 corresponding to the first private mode, a group identifier 1104 corresponding to the second private mode, a group identifier 1105 corresponding to the first business mode and a group identifier 1106 corresponding to the second business mode on a prescribed region of the screen (FIG. 11A(b)).

Moreover, the mobile terminal 100 can identifiably display the group identifier 1101 or 1103 corresponding to a currently activated mode. For instance, in order to identifiably display the group identifiers, at least one of a color, a size, a thickness and the like can be used.

Figure 11B:
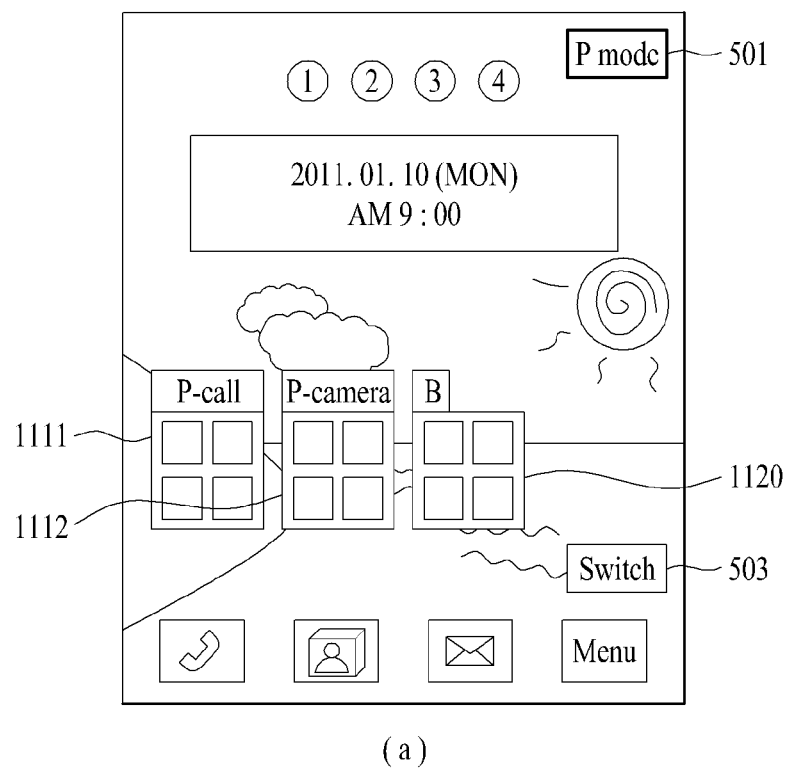
Figure 11B:
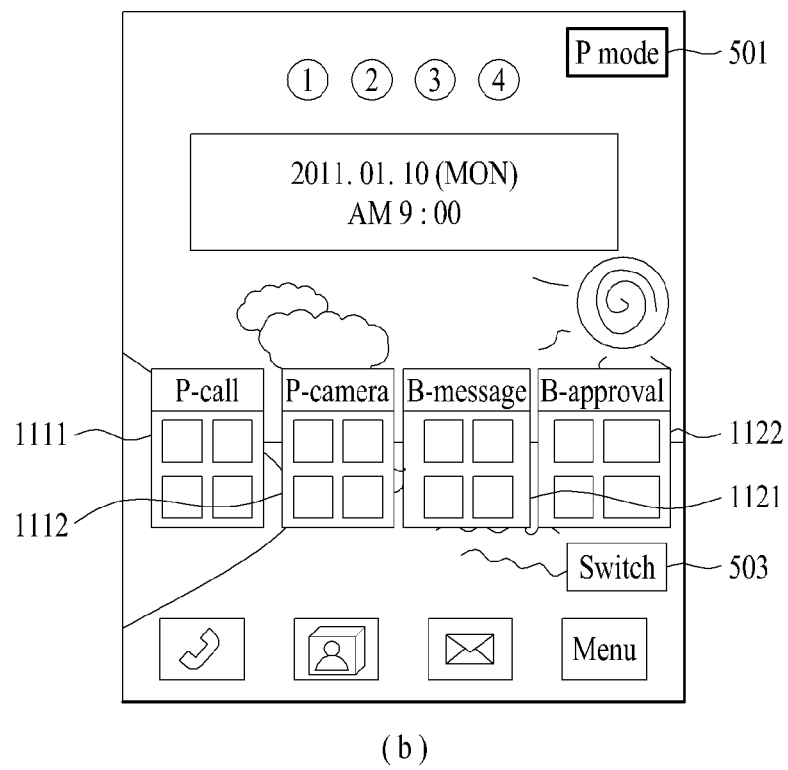

Referring to FIG. 11B, while a private mode is activated, the mobile terminal 100 displays a call group identifier 1111 including an application having a type that is a call, and a camera group identifier 1112 including an application having a type that is a camera among a plurality of applications running in the private mode and can also display a group identifier 1120 only for a currently deactivated business mode irrespective of a corresponding application type (FIG. 11B(a)).

Of course, the mobile terminal 100 can display a group identifier per type 1121 or 1122 for a currently deactivated business mode in consideration of a corresponding application type (FIG. 11B(b)).

Figure 11C:
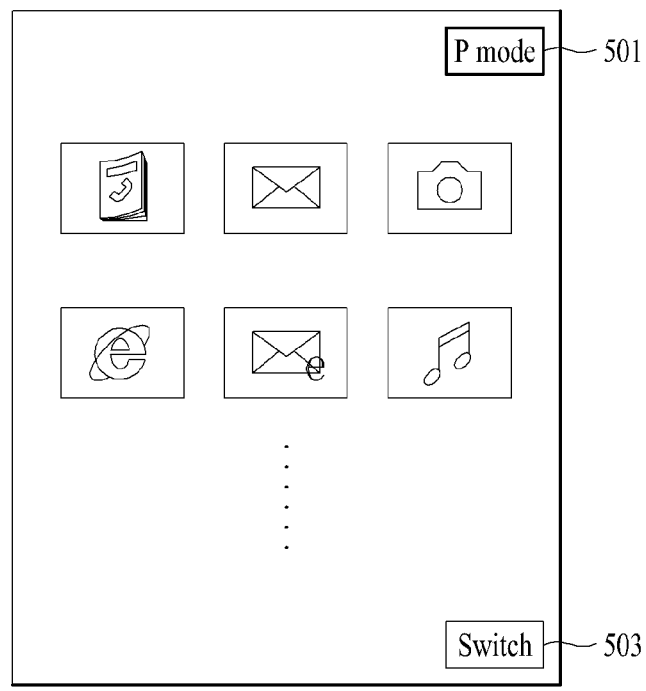
Figure 11C:
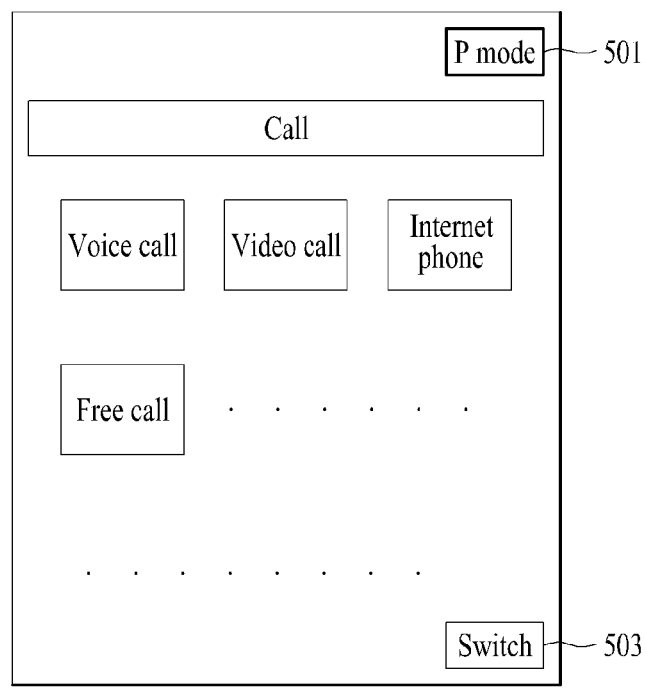

Referring to FIG. 11C, when receiving an input of a selection signal for the group identifier 1101 from a user in FIG. 11A(a), the mobile terminal 100 can display application indicators indicating applications (i.e., applications executable in the private mode) included in the application group indicated by the group identifier 1101, respectively, on the screen (FIG. 11C(a)).

Moreover, when receiving a selection signal for the call group identifier 1111 from a user in FIG. 11B(a), the mobile terminal 100 can display application indicators, which indicate call related applications included in the call group indicated by the call group identifier 1111, respectively, on the screen (FIG. 11C(b)).

Figure 11D:
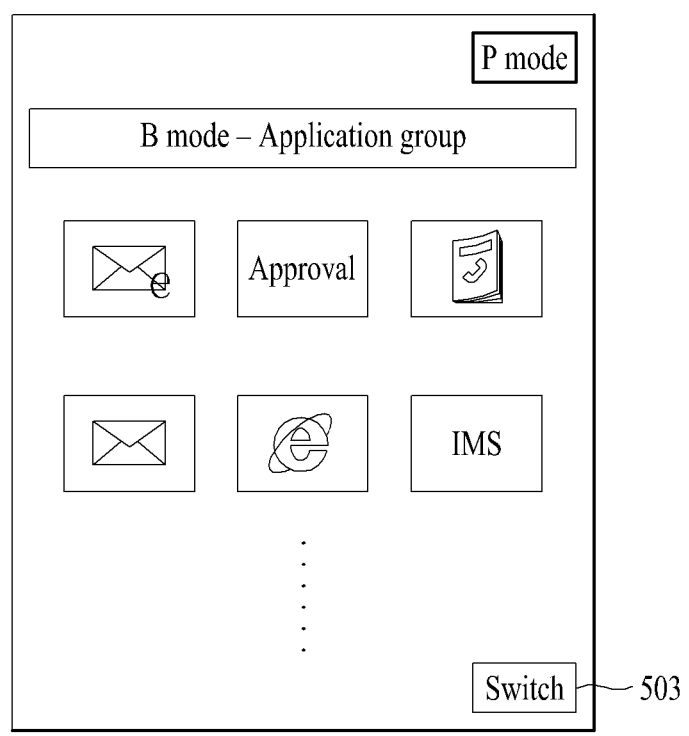

Referring to FIG. 11D, when receiving a selection signal for the group identifier 1120 from a user in FIG. 11A(a), the mobile terminal 100 can display application indicators, which indicate applications (i.e., applications executable in the business mode) included in the application group indicated by the group identifier 1120, respectively, on the screen (FIG. 11D).

Figure 11E:
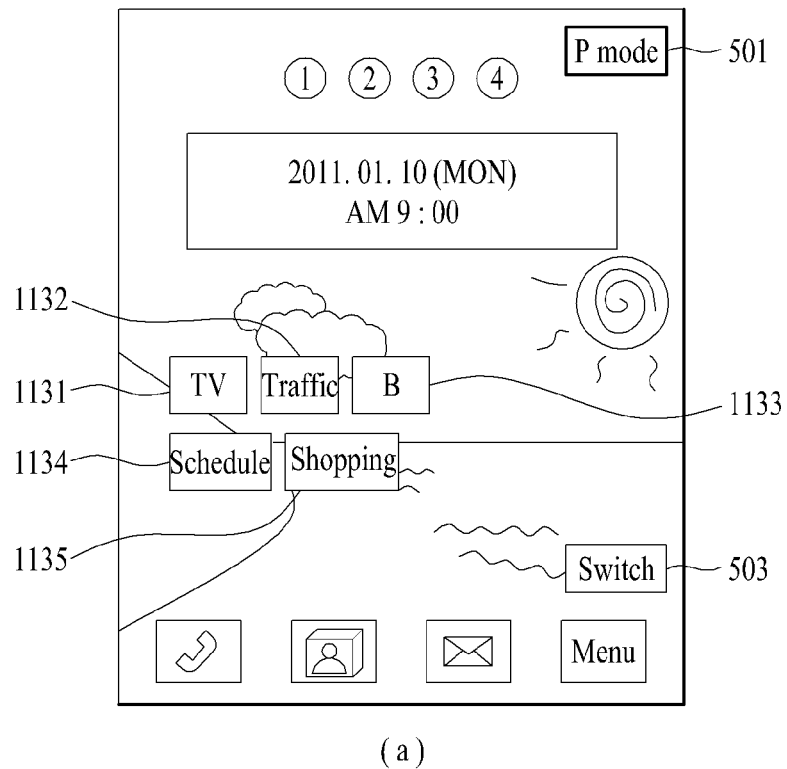
Figure 11E:
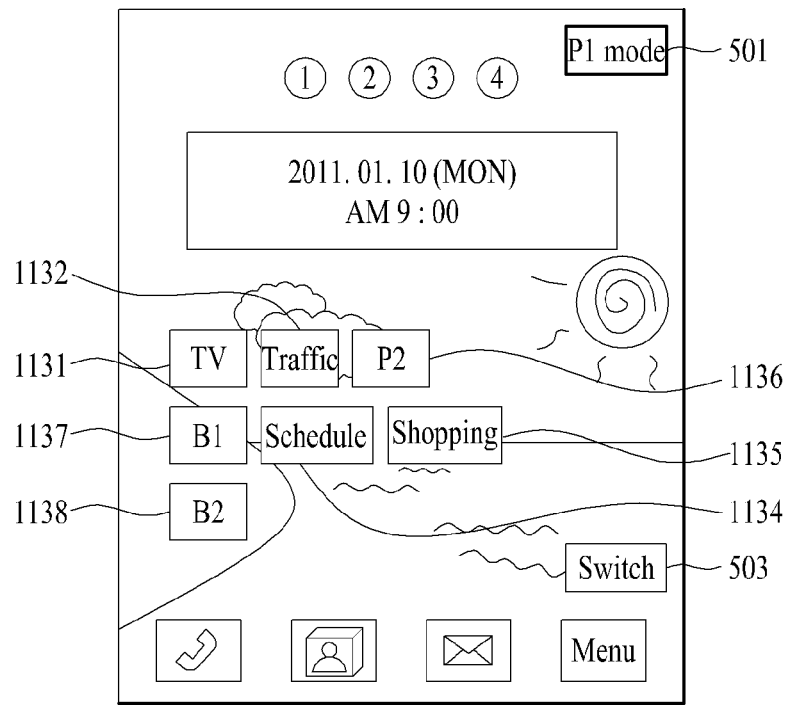

Referring to FIG. 11E(a) and (b), in an activated state of the private mode (P mode) or an activated state of the first private mode (P1 mode), the mobile terminal 100 can display a group identifier 1133 corresponding to 'business mode', which is a switching target mode, or group identifiers 1136 to 1138 respectively corresponding to one private mode (P2) and two business modes (B1, B2), which are switching target modes, in the same form (e.g., icon type display, icon size, arranged position, etc.) of the application indicator together with application indicators 1131 to 1135 executable in the private mode.

Therefore, a user can recognize a group identifier as one application indicator. Moreover, information (e.g., representative image, full/partial name, etc.) on a corresponding mode can be included in the group identifier. Moreover, the group identifier is displayed on a background screen (or a home screen) (cf. FIG. 11E) and also can be displayed while an application indicator is displayed for an application search in the same display form of the application indicator.

In the following description, when a plurality of modes exist, how to switch one mode to another mode is explained in detail with reference to the accompanying drawings.

Figure 12:
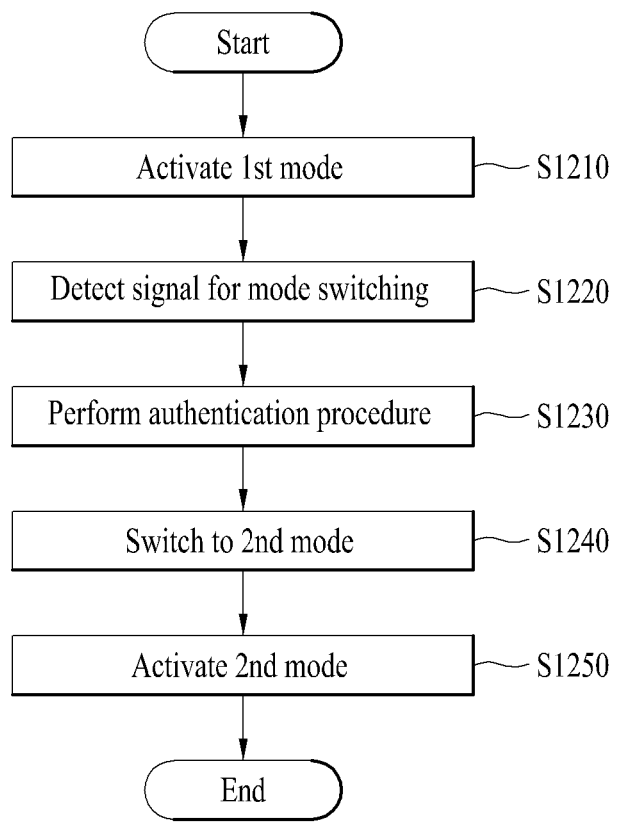
FIG. 12 is a first flowchart for a method of controlling a mode switching in a mobile terminal according to the present invention.

FIG. 12 is a first flowchart for a method of controlling a mode switching in a mobile terminal according to the present invention. For clarity and convenience of the following description, assume that a plurality of modes include a first mode and a second mode. While both of the first and second modes are implemented, assume that the first or second mode is selectively activated by a mode switching. In addition, an application executable in both of the first and second modes can be named a common application. Moreover, an application executable in either the first mode or the second mode can be named a dedicated application.

Referring to FIG. 12, while a first mode and a second mode are implemented, the mobile terminal 100 activates the first mode under the control of the controller 180 (S1210). In doing so, if an operating system is designated per mode, the controller 180 can implement the first mode and the second mode using a first individual operating system and a second individual operating system (i.e., a first OS and a second OS in multi-OS) corresponding to the first mode and the second mode, respectively. If an operating system per mode is common, the controller 180 can implement the first mode and the second mode using a common operating system (i.e., a single OS).

In the following description, a mode implemented when OS booting per multi-Os type (cf. FIGS. 4A to 4C) is explained with reference to FIG. 13A and FIG. 13B.

Figure 13A:
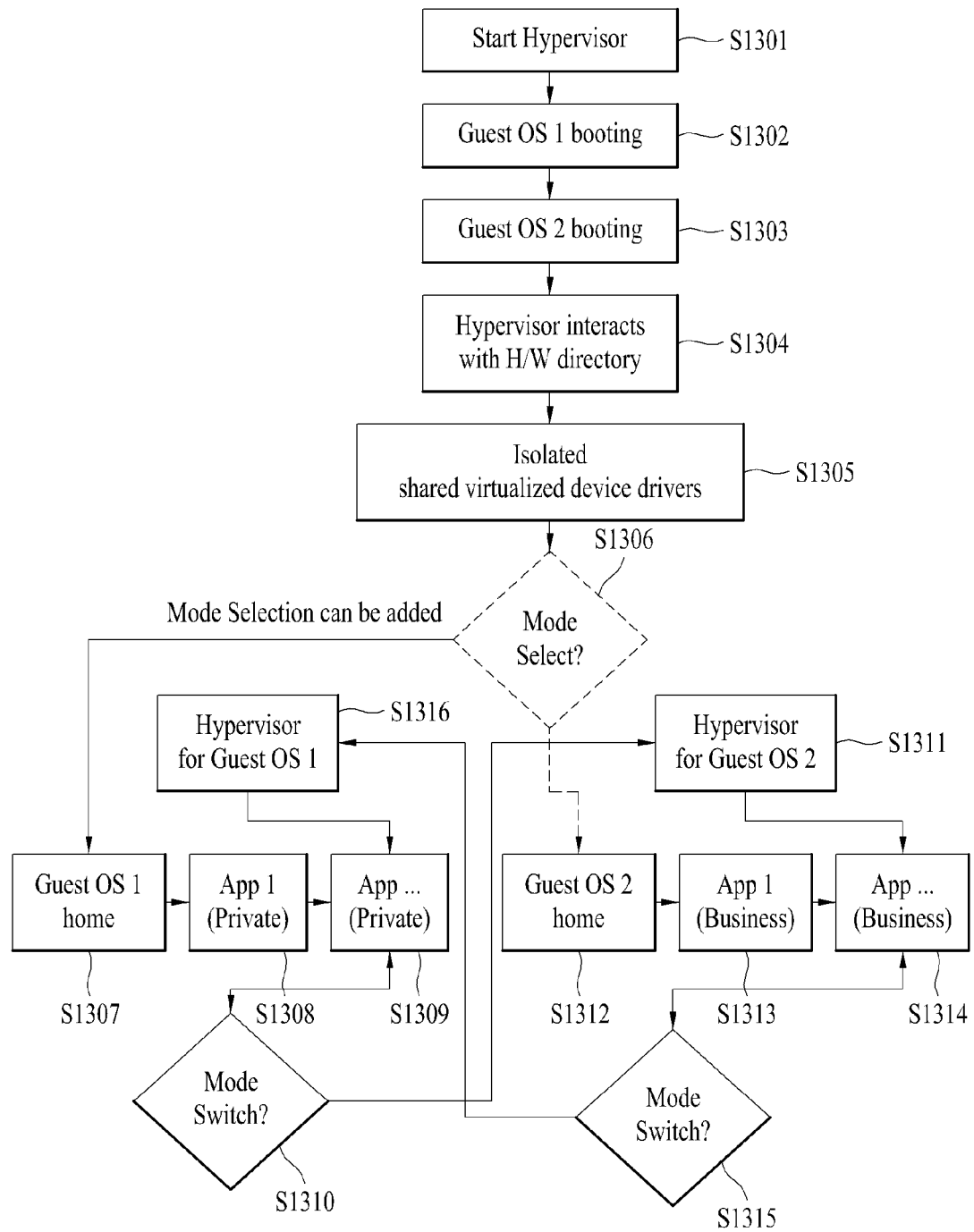
FIG. 13A and FIG. 13B are flowcharts of a process for switching a mode per type in multiple operation systems according to the present invention.
Figure 13B:
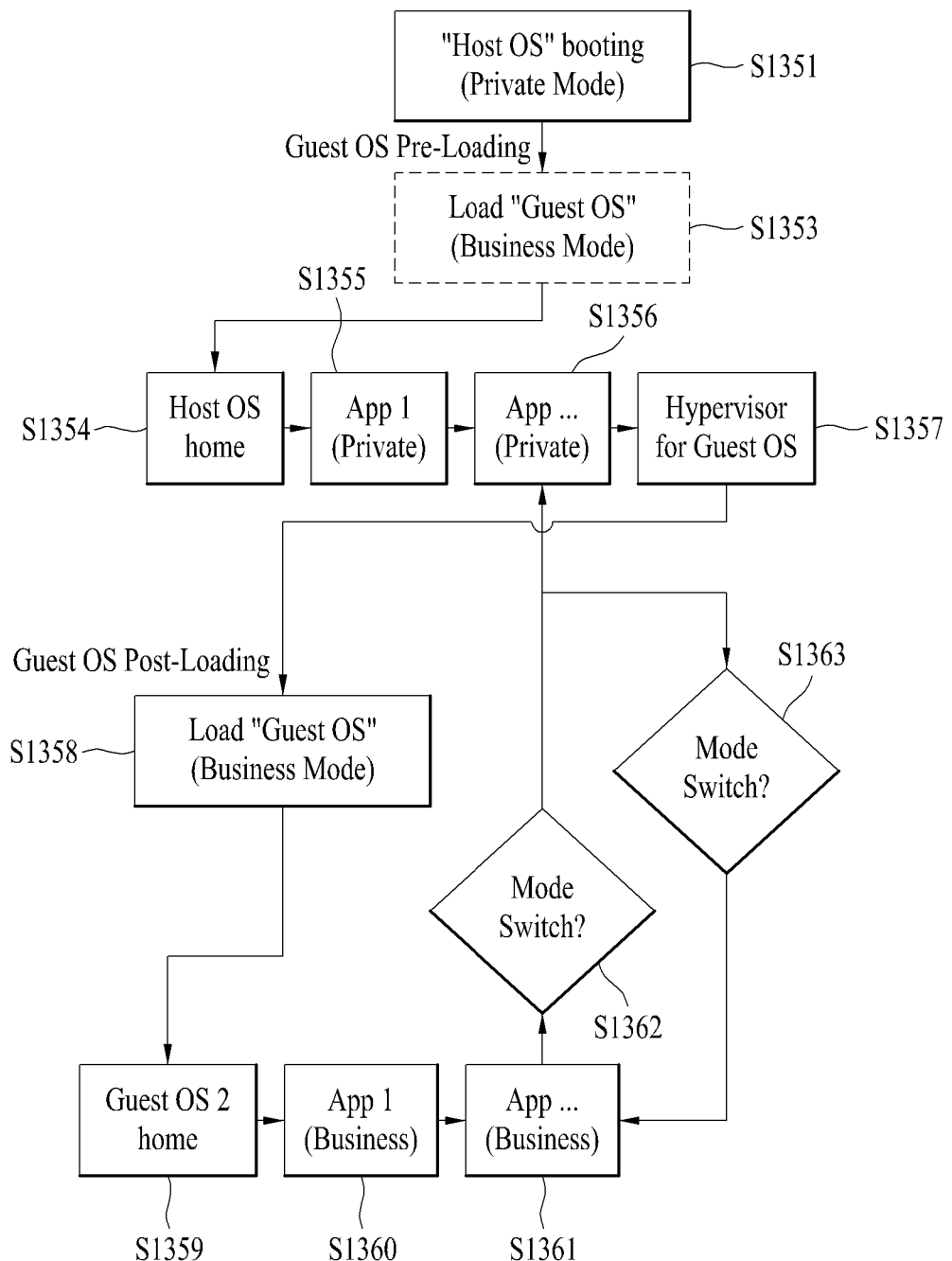

FIG. 13A and FIG. 13B are flowcharts of a process for switching a mode per type in multiple operation systems according to the present invention. In particular, FIG. 13A corresponds to a first multi-OS type (e.g., Guest OS 1 and Guest OS 2 included: This type corresponds to a first scheme). In addition, FIG. 13B can correspond to a second multi-OS type (e.g., Host OS and Guest OS: This type corresponds to a second scheme.). Assume that Guest OS 1 and Host OS correspond to a private mode. In addition, assume that Guest OS 2 and Guest OS correspond to a business mode.

Referring to FIG. 13A, if the hypervisor included in the controller 180 is driven (S1301), the mobile terminal 100 can boot Guest OS 1 and Guest OS 2 simultaneously or sequentially (S1302, S1303).

As the hypervisor is driven, the mobile terminal 100 enables the virtualized device drivers of the Guest OS 1 and the Guest OS 2 to interact with physical drivers as a preparing operation for controlling hardware (S1304) and the performs an isolating operation of the shared virtualized device drivers (S1305).

If a specific one of a private mode and a business mode is selected by a user or the controller 180 (S1306), the mobile terminal 100 activates the specific mode on the Guest OS corresponding to the selected specific mode and can then execute applications (private mode_Private, business mode-_Business) in the activated mode (sequential execution of S1307 to S1309 or sequential execution of S1312 to S1314).

Meanwhile, when the specific mode selecting step S1306 is omitted, the mobile terminal 100 can activate the private mode using the Guest OS 1 designated as default (S1307 to S1309).

Referring to FIG. 13B, the mobile terminal 100 preferentially boots the Host OS corresponding to the private mode (S1351) and can then preload the Guest OS corresponding to the business mode (S1353), under the control of the controller 180.

The mobile terminal 100 activates the private mode on the Host OS and can then execute the applications in the private mode (sequential execution of the step S1354 to S1356). When the Guest OS preloaded by the hypervisor is booted (S1357), the mobile terminal 100 activates the business mode on the Guest OS and can then execute the applications in the business mode (sequential execution of the steps S1359 to S1361).

Meanwhile, when post-loading the Guest OS, if the hypervisor is driven to load the Guest OS (S1357), the mobile terminal 100 can post-load the Guest OS (S1358).

In doing so, when preloading the Guest OS, an initial OS booting takes a considerable time. Yet, since two operating systems are already booted after completion of the booting, a mode switching can be quickly performed. When post-loading the Guest OS, an initial OS booting is quickly performed. Yet, when switching a current mode to a mode corresponding to the Guest OS, it may take a considerable time for a mode switching due to the time consumption attributed to the Guest OS booting.

The Guest Os loading process is described in detail as follows. First of all, the mobile terminal 100 downloads an application corresponding to the Guest OS from a server for managing and providing applications, executes the downloaded application, and can then load the Guest OS. Subsequently, as the loaded Guest OS is booted, the mobile terminal 100 can execute the corresponding applications using the Guest OS.

Referring now to FIG. 12, in the activating step S1210, the mobile terminal 100 can activate either the first mode or the second mode in accordance with a user selection or a prescribed reference when an operating system booting, under the control of the controller 180.

For instance, when the single OS, any one of the first and second modes can be activated in accordance with the single OS booting. For another instance, when the multi-OS, a mode selected by a user from the first mode and the second mode or a firstly booting completed one of the first mode and the second mode is activated in accordance with the simultaneous booting of the multi-OS or a mode corresponding to the preferentially booted OS in accordance with the sequential booting of the multi-OS can be activated.

In particular, when the sequential booting of the multi-OS, the mobile terminal 100 can preferentially boot the OS, which meets a prescribed condition, under the control of the controller 180. For instance, the controller 180 can preferentially boot the OS that meets one of the conditions such as an OS having a preferential booting order, an OS designated by a user to be preferentially booted and an OS supporting a mode corresponding to a current terminal status. The mode corresponding to the current terminal status shall be explained in detail in the following description.

Referring to FIG. 12, the mobile terminal 100 detects a signal for a mode switching in the activated state of the first mode under the control of the controller 180 (S1220). In particular, the controller 180 can further include a separate component configured to detect a generation of the signal for the mode switching or can include components different from each other in accordance with signal types.

For instance, the signal for the mode switching can be generated in at least one of a case of an input of a mode switching command signal, when a current terminal location belongs to a specific place corresponding to the second mode, when a current hour belongs to a specific time corresponding to the second mode, a case of transceiving data with a counterpart terminal corresponding to the second mode and a case of an access to a specific network corresponding to the second mode. Moreover, when there are a plurality of switching target modes, the signal for the mode switching can be discriminated for each of a plurality of the switching target modes. For instance, designation information on the switching target mode is included in the mode switching command signal or corresponding place, corresponding time, corresponding counterpart terminal and corresponding network can be designated per switching target mode to the mode switching command signal in a manner of being discriminated.

When detecting a signal for a mode switching, the mobile terminal 100 performs an authentication procedure for the second mode to switch to under the control of the controller 180 (S1230).

In particular, when the signal for the mode switching is detected, the controller 180 can determine whether a conditional access is set on the second mode to switch to.

Moreover, when security levels are set on both of the first mode and the second mode, if the security level set on the second mode is higher than the security level set on the first mode, the controller 180 can determine that the conditional access is set on the second mode. When the first mode and the second mode are a private mode and a business mode, respectively, the controller 180 can determine that the conditional access is set on the second mode that is the business mode.

Therefore, the authentication procedure performing step S1230 can be performed if it is determined that the conditional access is set on the second mode as a result of the above determination.

In particular, the authentication procedure can be performed in a following manner. First of all, after a user has input a user authentication information, it is determined whether the input user authentication information is valid. If the input user authentication information is valid, the switching to the second mode can be approved. In other words, the controller 180 can approve the switching to the second mode only if the performed authentication procedure is valid.

Meanwhile, the input user authentication information includes the user authentication information set to be dedicated to the second mode or the user authentication information necessary in common for the mode switching instead of being limited by the second mode.

Moreover, the user authentication information can be set different in accordance with the conditional access level (or security level) of the second mode. For instance, when the conditional access level is high, the user authentication information can become complicated. For another instance, when the conditional access level is low, the user authentication information can become simple.

When the second mode is entered multiple times, the controller 180 can request a user authentication information different for each entry and can then receive an input of a user authentication information at the timing point of the corresponding entry into the second mode. This is to fortify the security of the second mode.

When there are a plurality of switchable modes (i.e., there are a plurality of second modes), the controller 180 can perform an authentication procedure differing for each of a plurality of the switchable modes. For instance, a user authentication information, which is requested to be input in the authentication procedure, or an authentication procedure type can be differentiated. In this instance, the authentication procedure type can be classified into a password input scheme, a fingerprint input scheme, a user ID card input scheme and the like (cf. FIGS. 18A to 18G).

The controller 180 can perform a different authentication procedure for the second mode in accordance with a user level (or, authority, level, rank, etc.) of the mobile terminal 100. In particular, a user level can be set on the mobile terminal 100 in consideration of such an item of a terminal owner or user as a rank in company, a job property, a presence or non-presence of approval authority and the like. Therefore, assuming that a plurality of mobile terminals exist, different user levels can be set on a plurality of the mobile terminals, respectively.

For instance, when a user level is equal to or higher than a predetermined reference (e.g., over a head of department), the controller 180 requires a user authentication information having high security level (e.g., 10-digit password input, sequential inputs of plural types of user authentication information-_fingerprint/user face image/password) for the authentication procedure. For another instance, when a user level is lower than a predetermined reference (e.g., below a head of department), the controller 180 requires a user authentication information having low security level (e.g., a 5-digit password input, an input of one type of user authentication information) for the authentication procedure.

Once the authentication procedure for the switching or entry into the second mode is successful, when a re-switching or re-entry into the second mode is attempted, it can skip the authentication procedure if a predetermined condition is met. For instance, the authentication procedure can be skipped when the re-switching for a predetermined period of time (e.g., duty hours, a day, a week, a user specified period, etc.) or a re-switching for an interval between terminal-on and terminal-off.

Although the second mode is activated owning to the successful switching to the second mode, if a predetermined condition is met, an authentication procedure for the second mode can be requested again. For instance, an authentication procedure is requested to be performed periodically in the second mode activated state. Alternatively, an authentication procedure can be requested before the switching in a situation that the second mode activated state needs to be switched to a different mode. In this instance, the situation can include when a user input action does not exist in the second mode for a predetermined period of time.

If the authentication procedure is validly performed, the controller 180 switches the first mode to the second mode (S1240) and then activates the second mode (S1250). As the second mode is activated, the first mode can be deactivated.

In this instance, the authentication procedure being validly performed can be that a valid user authentication information is input.

Moreover, in the switching step S1240, when detecting the signal for the mode switching, the mobile terminal 100 outputs a mode switching indication information via the output unit 150 under the control of the controller 180. When receiving a mode switching command action via the user input unit 130, the mobile terminal 100 can switch the first mode to the second mode under the control of the controller 180.

For instance, the mode switching indication information can include information indicating a status that a mode switching is currently requested and information enabling a user to select a mode switching. The mode switching indication information can be output in various ways using a text, an image, a voice, a vibration, an alarm sound and the like. In addition, the mode switching command action is input by a manipulation of a zone/key/button for receiving an input o a mode switching command or can be input when a detection of a voice, a terminal motion (e.g., an inclination in a predetermined direction, a predetermined number of shakings, etc.) or the like.

Meanwhile, the mode switching indication information can stop being output if the mode switching command action is not input by a user for a predetermined period of time.

The second mode activating step S1250 can refer to the description of the first mode activating step S1210. Meanwhile, if it is determined that the conditional access is not set on the second mode, the controller 180 can directly switch a current mode to the second mode without performing the authentication procedure (S1240).

Moreover, if the authentication procedure performed in the performing sep S1230 is not valid, the mobile terminal 100 continues to maintain the activated state of the first mode (i.e., go to the step S1210) or the mobile terminal 100 switches a current mode to the second mode in a manner of executing a basic application among the applications executable in the second mode only, under the control of the controller 180.

For instance, the basic application can include one of a voice call, a message and a phonebook. The basic application is automatically set by the controller or in accordance with a user selection. Moreover, even if the basic application is run, information utilizable only in the business mode among information associated with the basic application may not be provided.

In the first mode activated state, the output unit 150 can output information, which informs a user that it should be switched to the second mode, periodically or at a random timing point.

If the authentication procedure is not successfully performed, the mobile terminal 100 obtains a valid user authentication information from an external server (or the company server 300) having the valid user authentication information stored therein and then inputs the obtained valid user authentication information to perform the authentication procedure validly. In doing so, in order to obtain the user authentication information, it may be necessary to input a separate user information (e.g., a social security number, an answer to a query registered with the external server, etc.).

In the following description, a mode switching in a multi-OS environment is explained with reference to FIG. 13A and FIG. 13B.

FIG. 13A and FIG. 13B are flowcharts of a process for switching a mode per type in multiple operation systems according to the present invention;

Referring to FIG. 13A, while the private mode or the business mode is activated, if a commend signal of a mode switching is detected (S1310 or S1315), the mobile terminal 100 activates the business mode by driving the hypervisor for the Guest OS 2 (execution of the step S1311 and the steps following the step S1311) or can activate the private mode by driving the hypervisor for the Guest OS 1 (execution of the step S1316 and the steps following the step S1316).

Referring to FIG. 13B, while the private mode or the business mode is activated, I a command signal of the mode switching is detected (S1362 or S1363), the mobile terminal 100 activates the business mode or the private mode.

In particular, referring to FIG. 13A or FIG. 13B, when the business mode is switched to the private mode, if there exists an application previously executed in the private mode, the mobile terminal 100 can enter the executed state S1309 or S1356 of the previously executed application. If an application previously executed in the private mode does not exist, the mobile terminal 100 can enter the state HOME S1307 of the Guest OS 1 or the state HOME S1354 of the Host OS. This is applicable to the switching to the business mode from the private mode.

When the second mode previously switched in the switching step S1240 is switched again to the first mode that is the mode previous to the mode switching (i.e., when returning to the previous mode), if a specific application is being executed in the first mode before the switching to the second mode, as the second mode is re-switched to the first mode, the controller 180 is ale to re-execute the specific application (in accordance with a user selection or automatically). In doing so, an executed screen of the specific application can include a general initial screen in accordance with an execution of the specific application or an executed screen at the shutdown timing point due to the switching to the second mode.

In the following description, as a specific event for generating a signal for a mode switching, a mode switching process when receiving a selection of a group identifier or an application indicator from a user is explained with reference to FIGS. 14A to 15B. For clarity and convenience of the following description, assume that a first mode and a second mode are a private mode and a business mode, respectively.

Figure 14A:
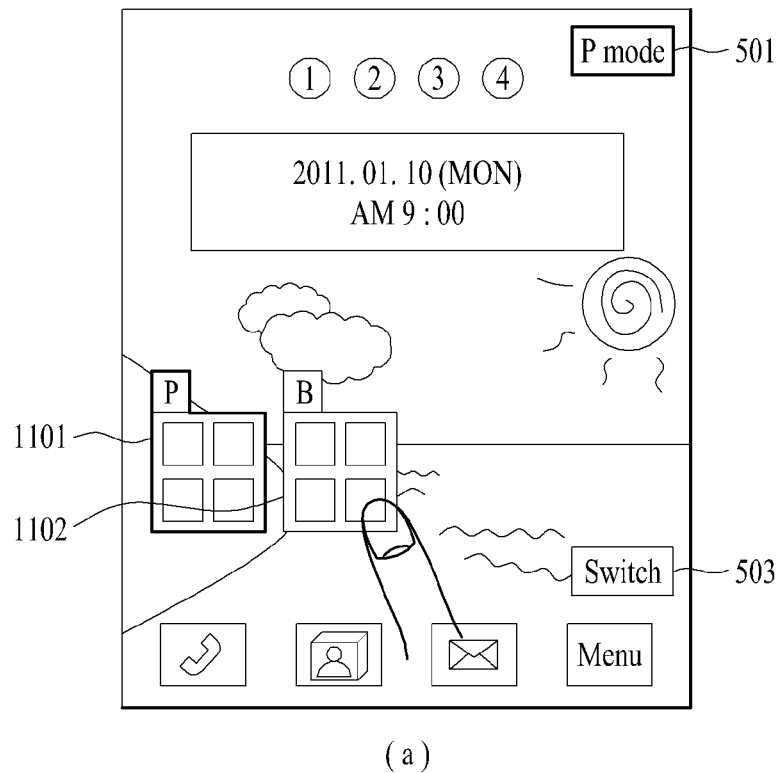
FIGS. 14A to 15B are diagrams of a mode switching process in accordance with a group identifier selection according to the present invention.
Figure 14A:
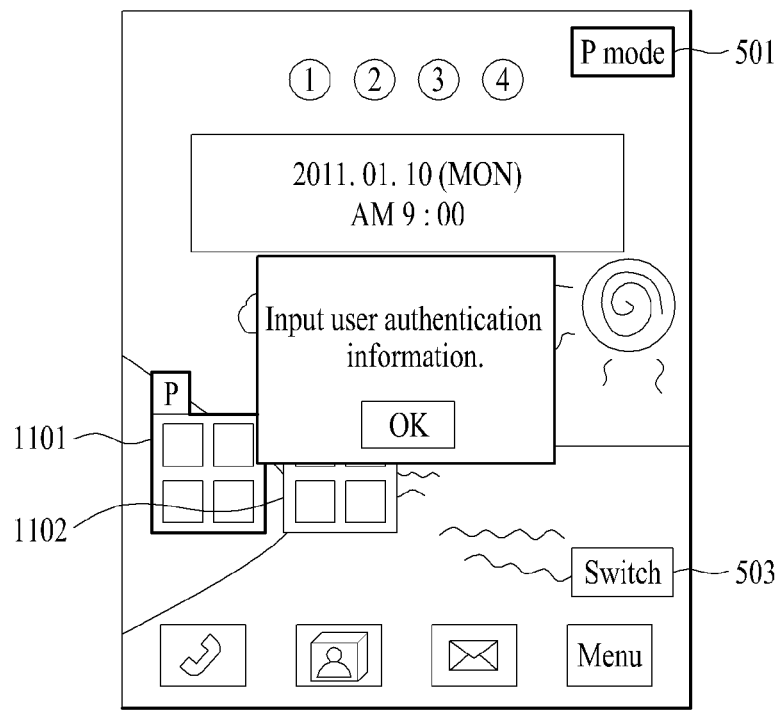

Referring to FIG. 14A, when the user selects the group identifier 1102 corresponding to the business mode (FIG. 14A(a)), the mobile terminal 100 executes an authentication procedure for the business mode and can then request an input of a user authentication information (FIG. 14A(b)).

Figure 14B:
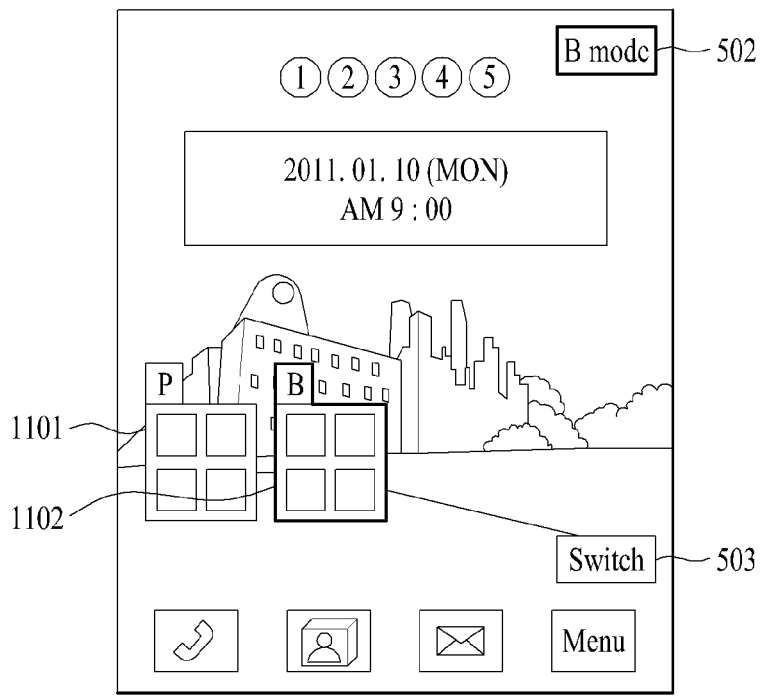
Figure 14B:
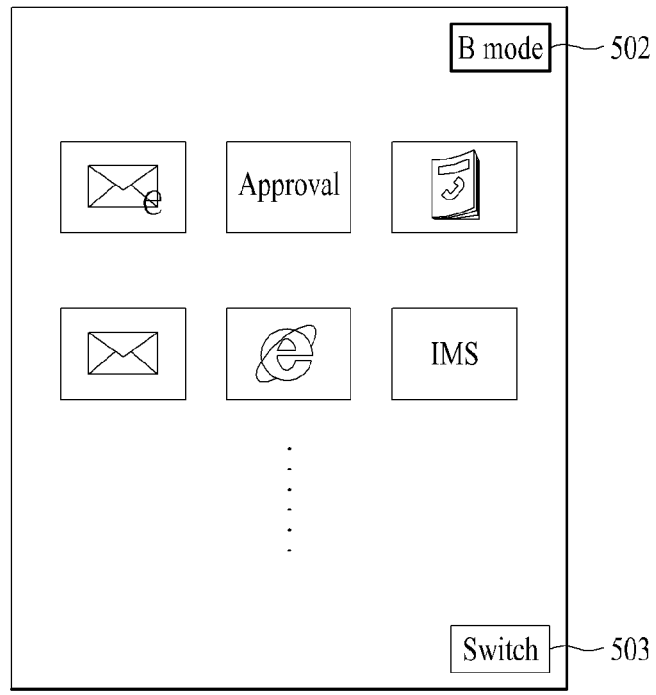

Referring to FIG. 14B, if the authentication procedure is validly performed in FIG. 14A(b), the mobile terminal switches a current mode to the business mode. Subsequently, the mobile terminal 100 displays a home screen (e.g., a group identifier display screen corresponding to each of the private mode and the business mode) of the business mode (FIG. 14B(a)) or can display application indicators respectively indicating applications executable in the business mode (FIG. 14B(b)).

Figure 14C:
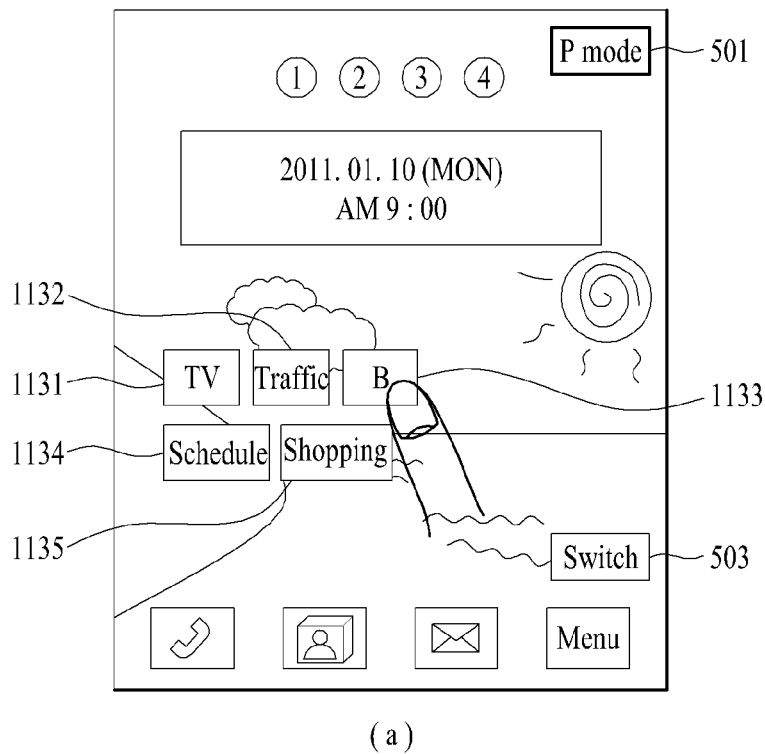
Figure 14C:
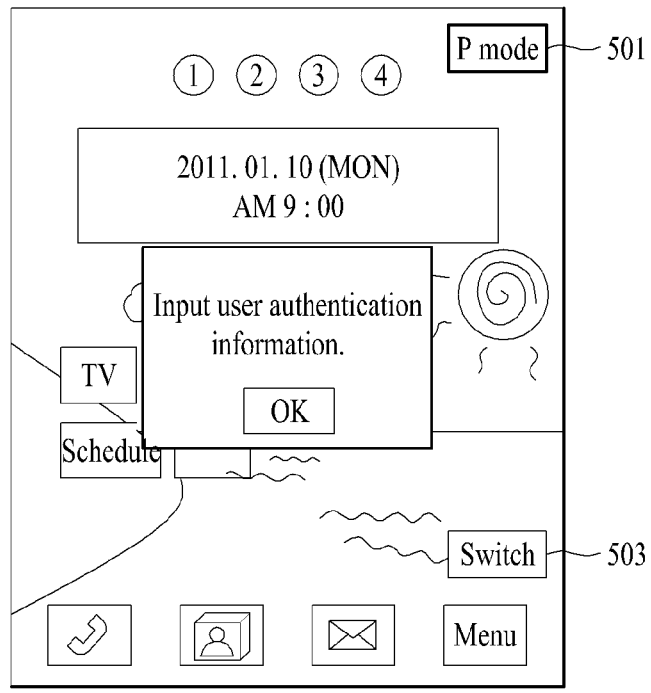

Referring to FIG. 14C, when the user selects a group identifier 1133 corresponding to a business mode in FIG. 11E(a) (FIG. 14C(a)), the mobile terminal 100 executes an authentication procedure for the business mode and can then request an input of user authentication information (FIG. 14C(b)).

Figure 14D:
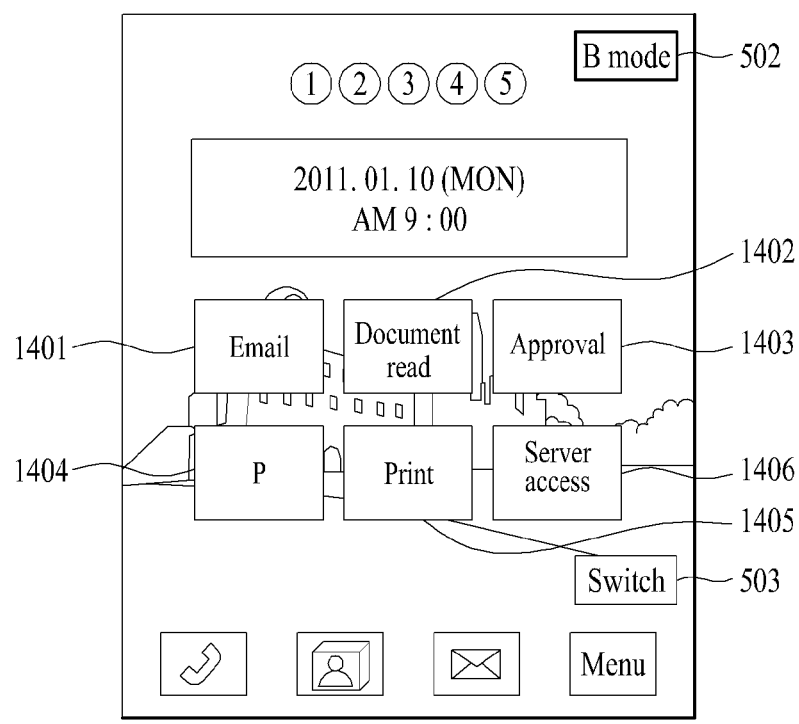

Referring to FIG. 14D, if the authentication procedure is validly performed in FIG. 14C(b), the mobile terminal 100 switches a current mode to the business mode and can then display a group identifier 1404 corresponding to the private mode (P mode), which is a switching target mode, in the same form of the application indicator together with application indicators 1401 to 1403, 1405 and 1406 of applications executable in the business mode.

Figure 15A:
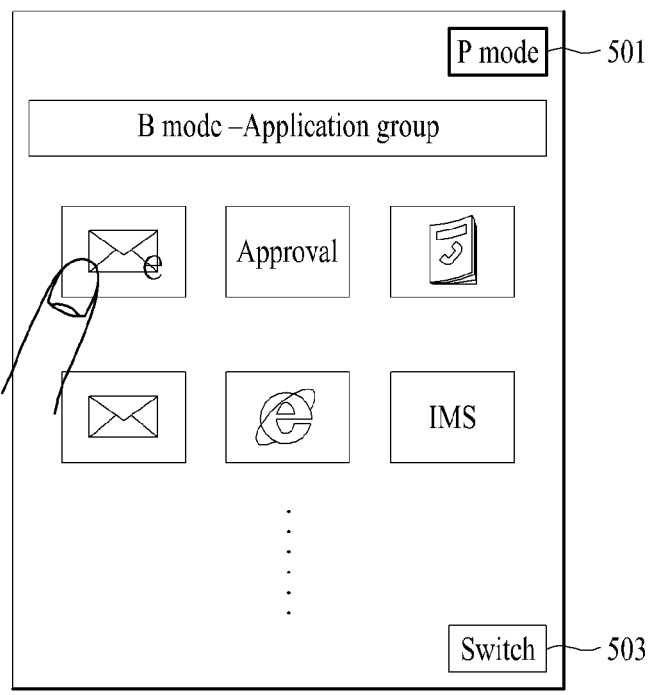
Figure 15A:
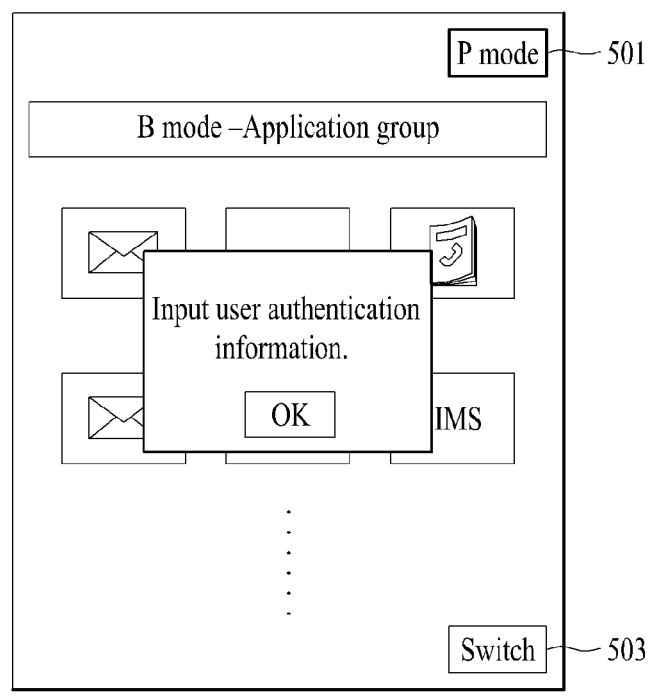

Referring to FIG. 15A, when receiving an input of a selection signal for a specific application indicator 1501 in FIG. 11D (i.e., in the state of displaying the application indicators indicating the applications executable in the business mode in the private mode activated state) (FIG. 15A(a)), the mobile terminal 100 executes the authentication procedure for the business mode can then request an input a user authentication information (FIG. 15A(b)).

Figure 15B:
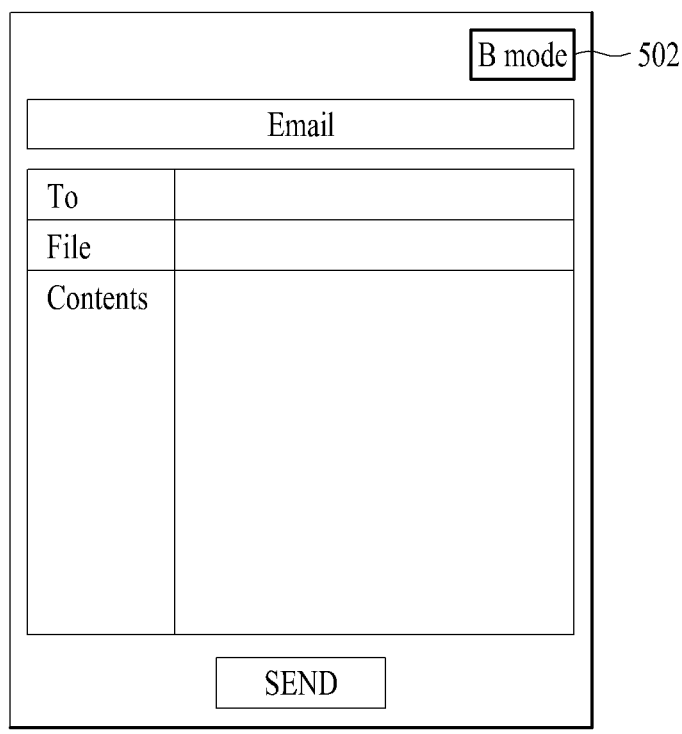

Referring to FIG. 15B, if the authentication procedure is validly performed in FIG. 15A(b), the mobile terminal 100 switches a current mode to the business mode and can run an email that is a specific application indicated by the specific application indicator 1501. The user authentication information input according to the authentication procedure execution is described in detail with reference to FIGS. 18A to 18G as follows.

In the following description, when receiving an input of a mode switching command signal from a user as a specific event for generating a signal for a mode switching, a corresponding mode switching process is explained with reference to FIGS. 16A to 17D. For clarity and convenience of the following description, assume that a first mode and a second mode are a private mode and a business mode, respectively.

Figure 16A:
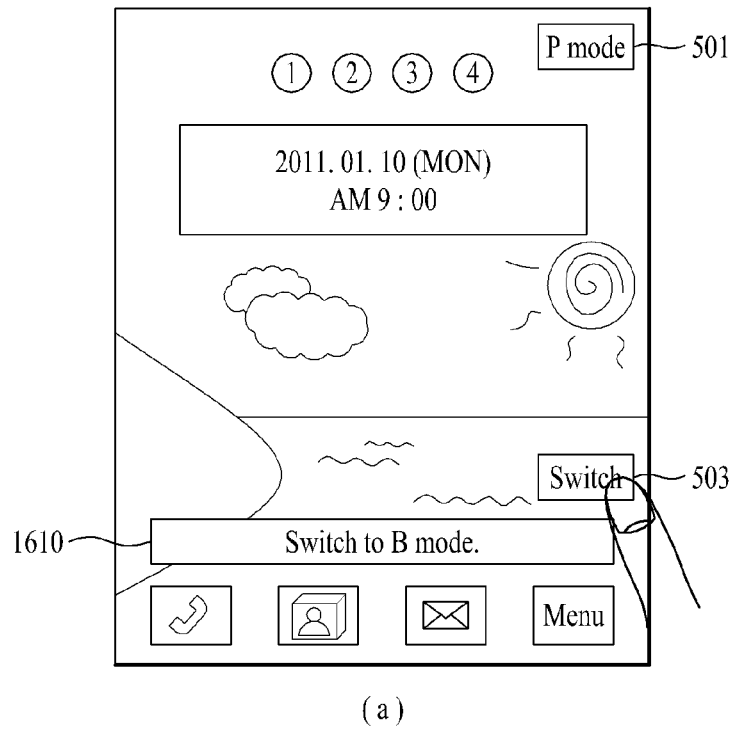
FIGS. 16A to 17D are diagrams of a mode switching process when receiving a mode switching command signal from a user according to the present invention.
Figure 16A:
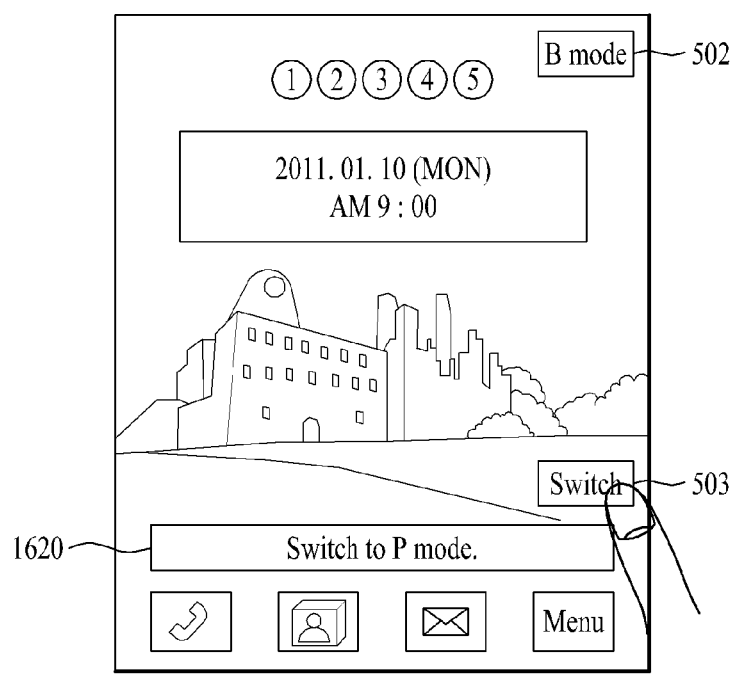

Referring to FIG. 16A, while a private mode is activated, if a user selects a switching zone 503, the mobile terminal 100 can receive an input of a mode switching command signal for a switching to a business mode (FIG. 16A(a)). On the contrary, while a business mode is activated, if a user selects the switching zone 503, the mobile terminal 100 can receive an input of a mode switching command signal for a switching to a private mode (FIG. 16A(b)).

Figure 16B:
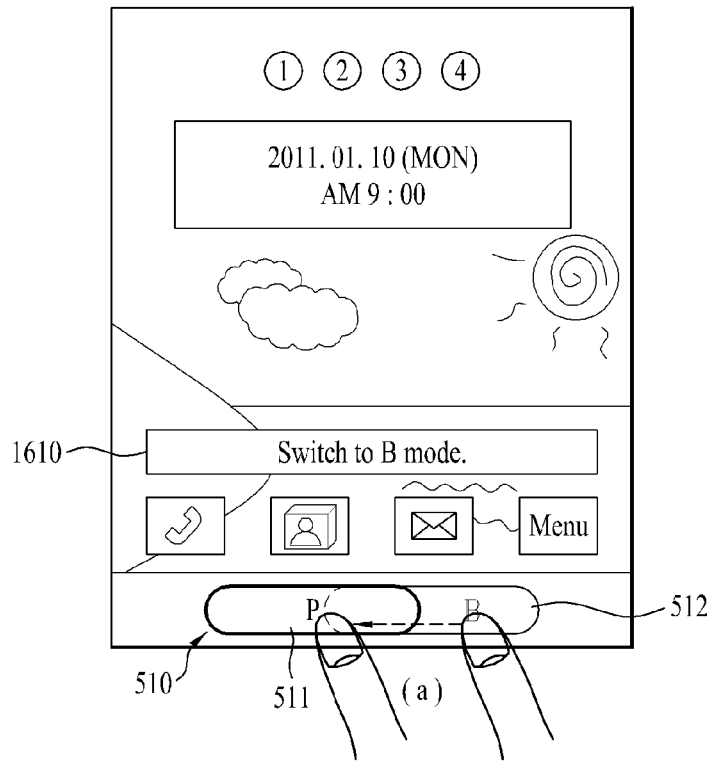
Figure 16B:
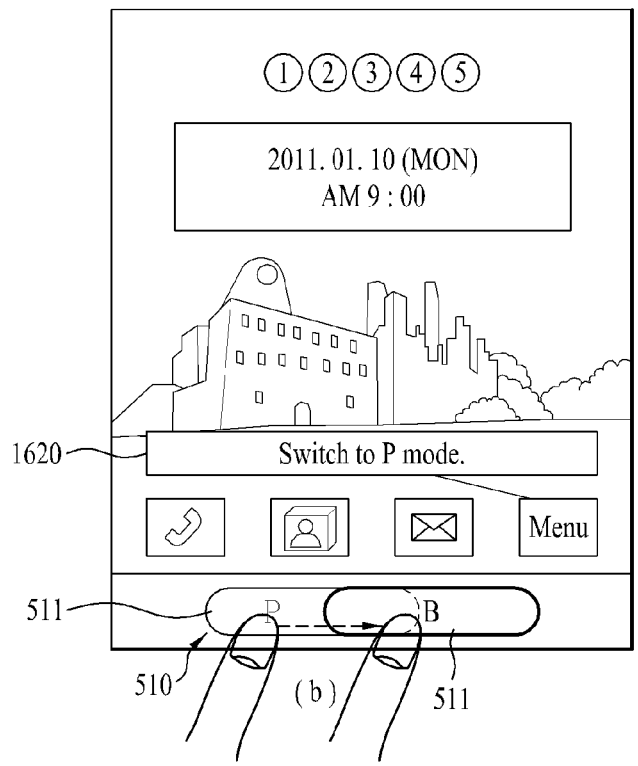

Referring to FIG. 16B, while a private mode is activated, if a touch & drag to a P zone 511 from a B zone 512 of a mode switching command key 510 is received, the mobile terminal 100 can receive a mode switching command signal for a switching to a business mode (FIG. 16B(a)). On the contrary, while a business mode is activated, if a touch & drag from a P zone 511 to a B zone 512 of a mode switching command key 510 is received, the mobile terminal 100 can receive a mode switching command signal for a switching to a private mode (FIG. 16B(b)).

In FIG. 16B(a), when receiving a touch action on the B zone 512, a mode switching command signal for a switching to the business mode can be input. In FIG. 16B(b), when receiving a touch action on the P zone 511, a mode switching command signal for a switching to the private mode can be input.

Figure 16C:
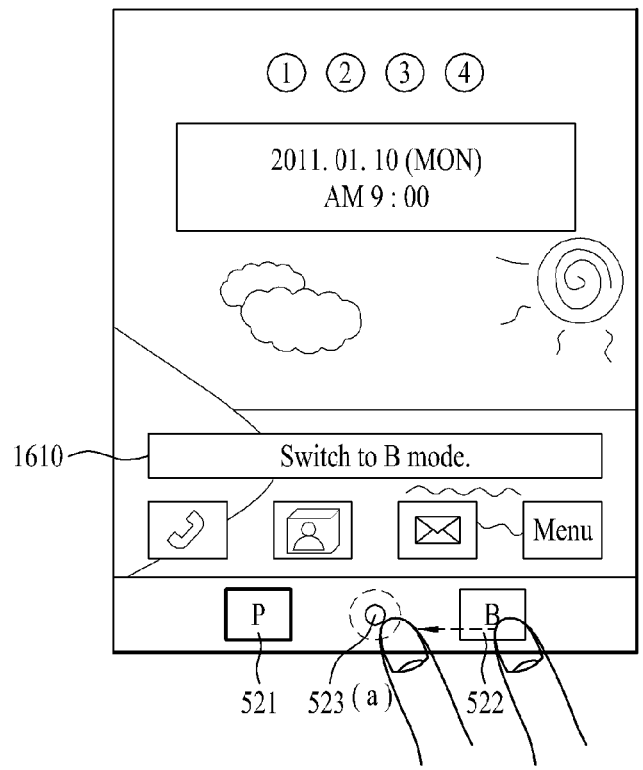
Figure 16C:
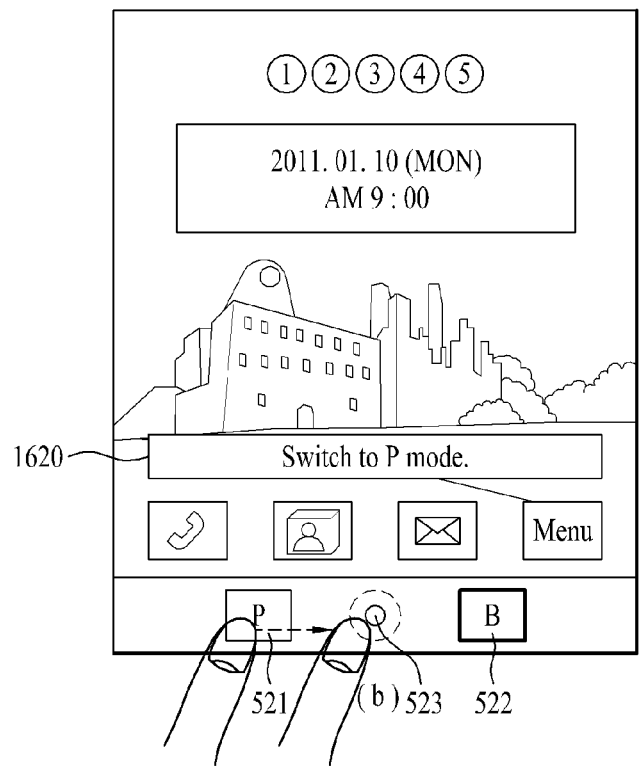

Referring to FIG. 16C, while a private mode is activated, if a touch & drag action from a business mode zone 522 to a switching command zone 523 is input, the mobile terminal 100 can receive an input of a mode switching command signal for a switching to a business mode (FIG. 16C(a)). On the contrary, while a business mode is activated, if a touch & drag action from a private mode zone 521 to a switching command zone 523 is input, the mobile terminal 100 can receive an input of a mode switching command signal for a switching to a private mode (FIG. 16C(b)).

In FIG. 16C(a), when receiving an input of a touch action on the business mode zone 522, the mobile terminal 100 can receive a mode switching command signal for a switching to the business mode. In FIG. 16C(b), when receiving an input of a touch action on the private mode zone 521, the mobile terminal 100 can receive a mode switching command signal for a switching to the private mode.

Figure 16D:
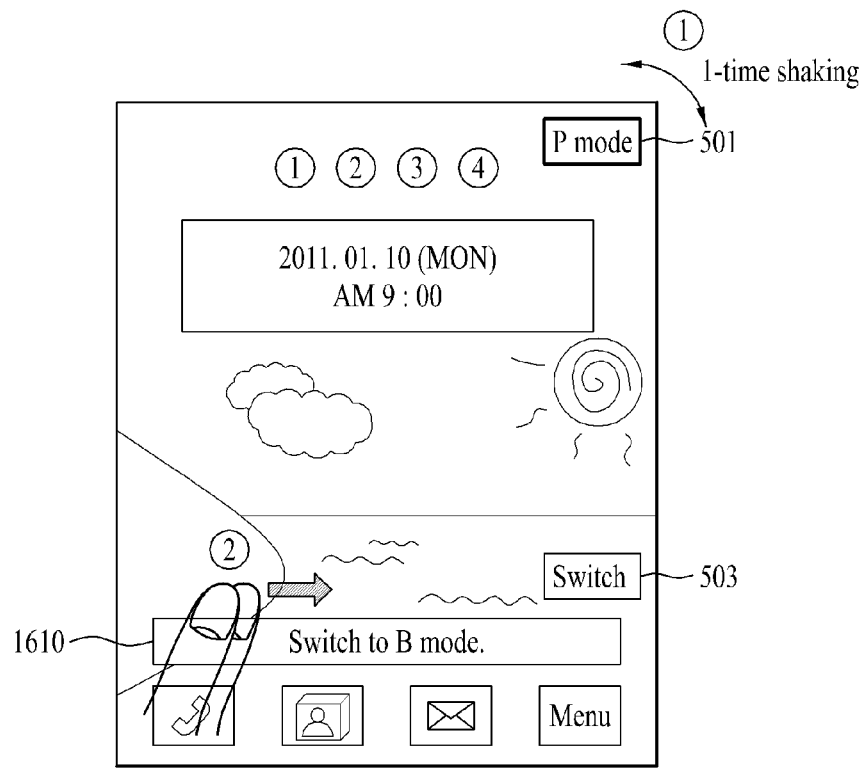
Figure 16D:
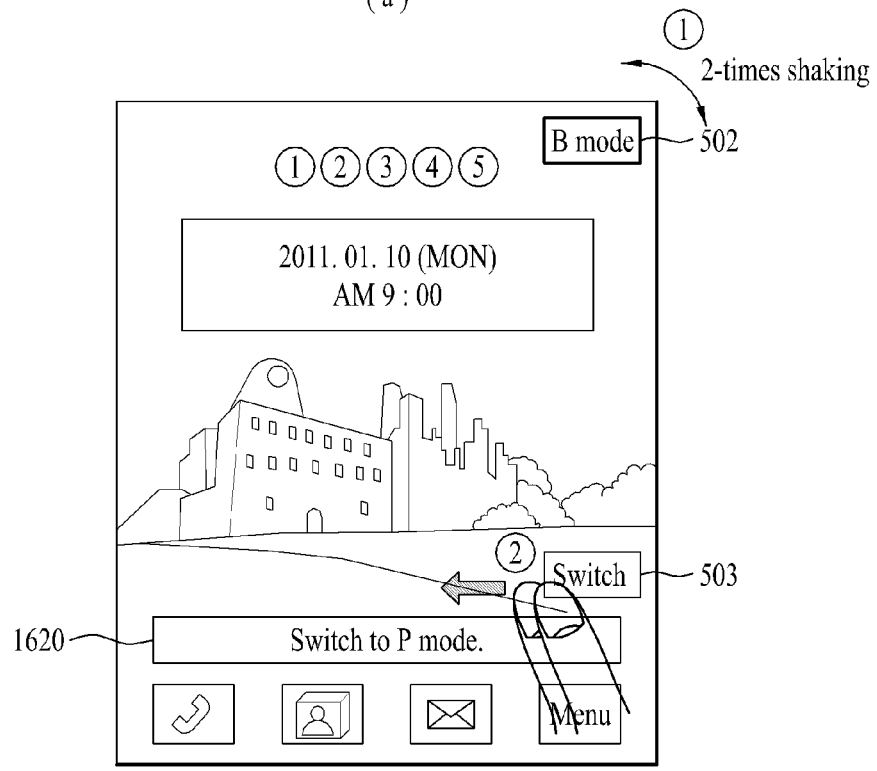

Referring to FIG. 16D, while a private mode is activated, when detecting a 1-time terminal shaking ① or receiving an input of a touch & drag action ② in a right direction using a multi-pointer, the mobile terminal 100 can receive an input of a mode switching command signal for a switching to a business mode (FIG. 16D (a)). When detecting a 2-times terminal shaking ① or receiving an input of a touch & drag action ② in a left direction using a multi-pointer, the mobile terminal 100 can receive an input of a mode switching command signal for a switching to the private mode (FIG. 16D (b)).

Moreover, in FIGS. 16A to 16D, the mobile terminal 100 can output a text 1610 or 1620 indicating the mode switching. Of course, in order to indicate the mode switching, a voice, an image, an icon, a vibration, a bell sound, a lamp and/or the like can be variously output.

Figure 16E:
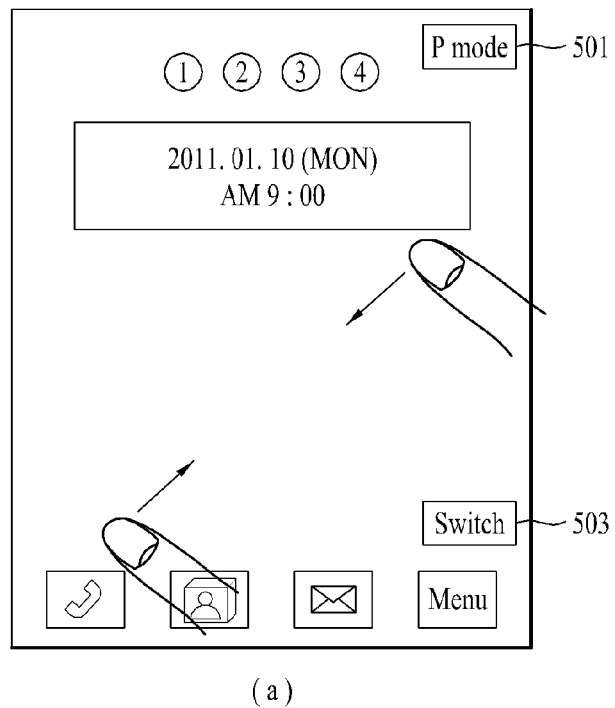
Figure 16E:
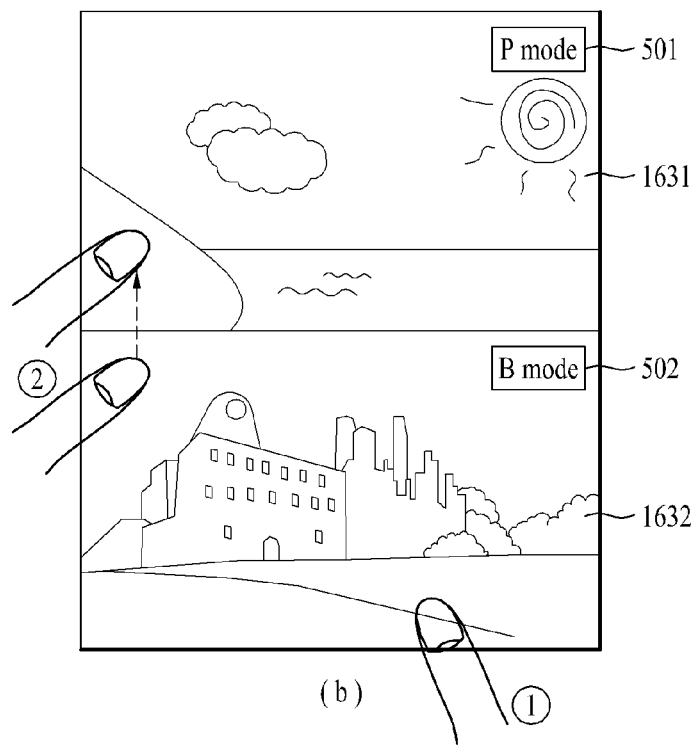

Referring to FIG. 16E, while a private mode (or a business mode) is activated, when receiving an input of a touch & drag action of a pinch-in type from a user (a), The mobile terminal 100 partitions the screen into a first region 1631 and a second region 1632 and then displays a home screen corresponding to the private mode and a home screen corresponding to the business mode on the first region 1631 and the second region 1632, respectively (b).

When receiving a touch action ① on a prescribed point of the second region 1632 or a touch & drag action ② from a prescribed point of the second region 1632 to a prescribed point of the first region 1631 in FIG. 16E (b), the mobile terminal 100 can receive an input of a mode switching command signal for a switching to the business mode.

Figure 17A:
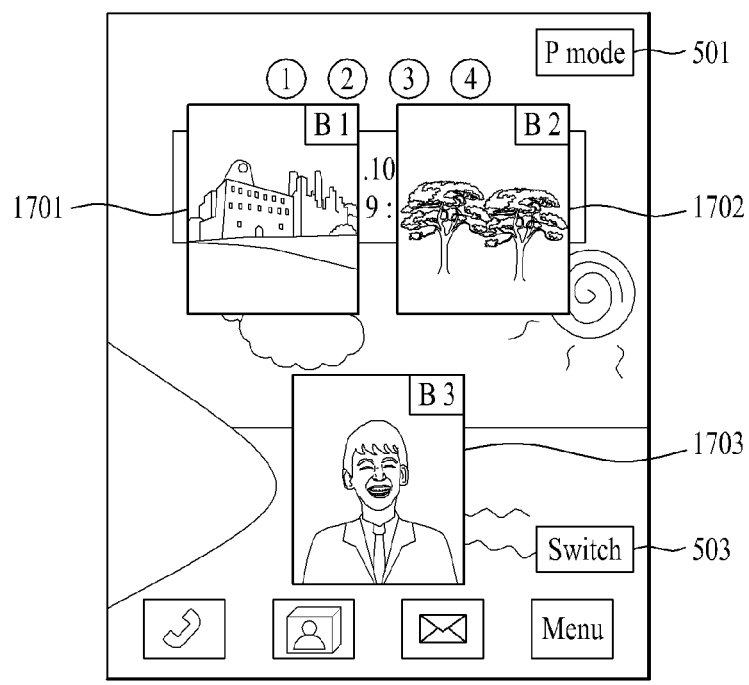
Figure 17A:
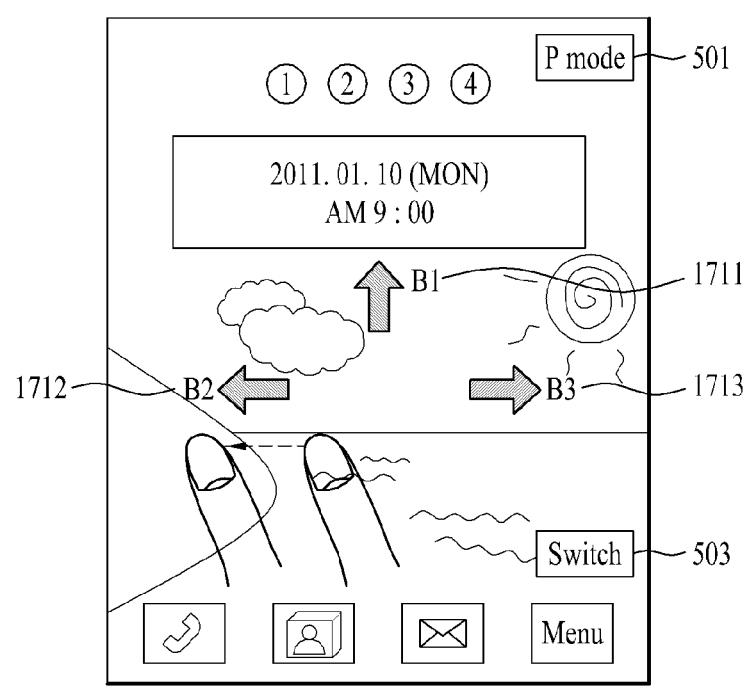

Referring to FIG. 17A, assuming that a plurality of business modes (e.g., first to third business modes) exist, when receiving an input of a user touch action on a switching zone 503 while a private mode is activated, the mobile terminal 100 displays first to third images 1701 to 1703 respectively corresponding to the first to third business modes (FIG. 17A(a)) or can display first to third drag directions 1711 to 1713 respectively corresponding to the first to third business modes (FIG. 17A(b)). For instance, the first to third images 1701 to 1703 can include a home screen image of the corresponding business mode, a background image and the like.

If the first image 1701 is selected in FIG. 17A(a), the mobile terminal 100 receives an input of a mode switching command signal for a switching to the first business mode. When receiving an input of a touch & drag action in the second drag direction 1712 in FIG. 17A(b), the mobile terminal 100 can receive an input of a mode switching command signal for a switching to the second business mode.

Figure 17B:
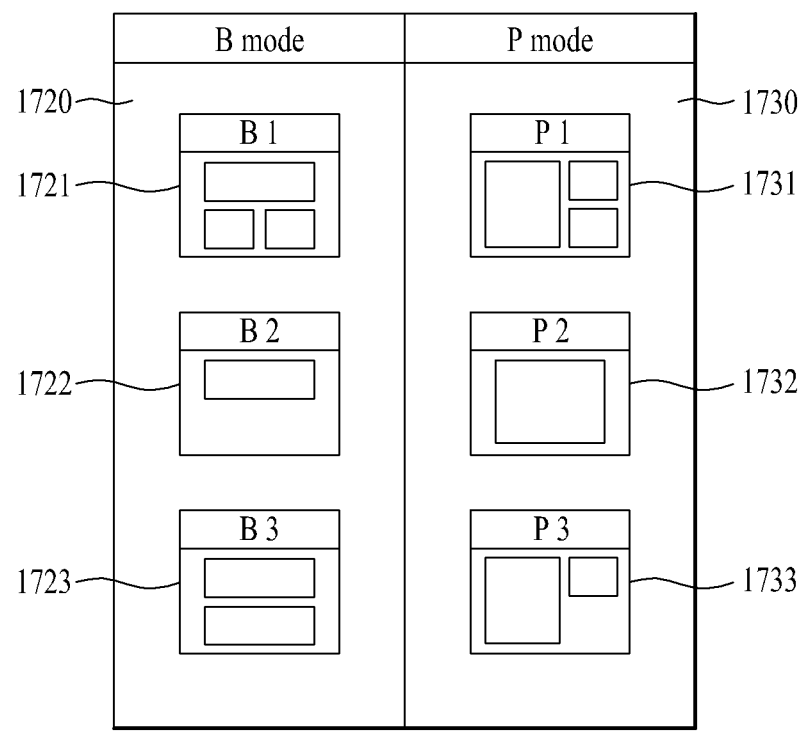

Referring to FIG. 17B, while the private mode (or the business mode) is activated, when receiving an input of a user touch action on the switching zone 503, the mobile terminal 100 can display the images 1721 to 1723 respectively corresponding to a plurality of the business modes and the images 1731 to 1733 respectively corresponding to a plurality of the private modes on the region 1720 and the region 1730, respectively.

If a user selects the image 1721 corresponding to the first business mode, the mobile terminal 100 can receive an input of a mode switching command signal for a switching to the first business mode.

Although the case of receiving the input of the mode switching command signal using the switching zone 503 is only described with reference to FIG. 17A and FIG. 17B, the corresponding description is applicable to a case of using a switching command key 510 or a mode zone 521 or 522.

Figure 17C:
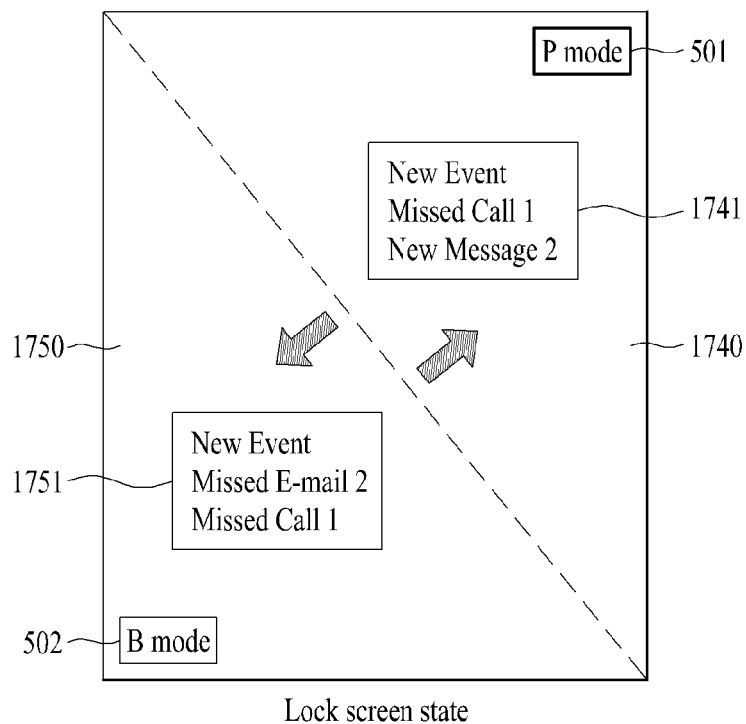

Referring to FIG. 17C, while a screen is locked (i.e., lock screen state), the mobile terminal 100 partitions the screen into a first zone 1740 and a second zone 1750 and can then display information on an event occurring in association with a private mode and information on an event occurring in association with a business mode on the first region 1740 and the second region 1750, respectively. In particular, the mobile terminal 100 can identifiably display a mode indicator 501 corresponding to a currently activated private mode.

When receiving an input of a touch & drag action to the second region 1750, the mobile terminal 100 can receive an input of a mode switching command signal for a switching to the business mode.

Figure 17D:
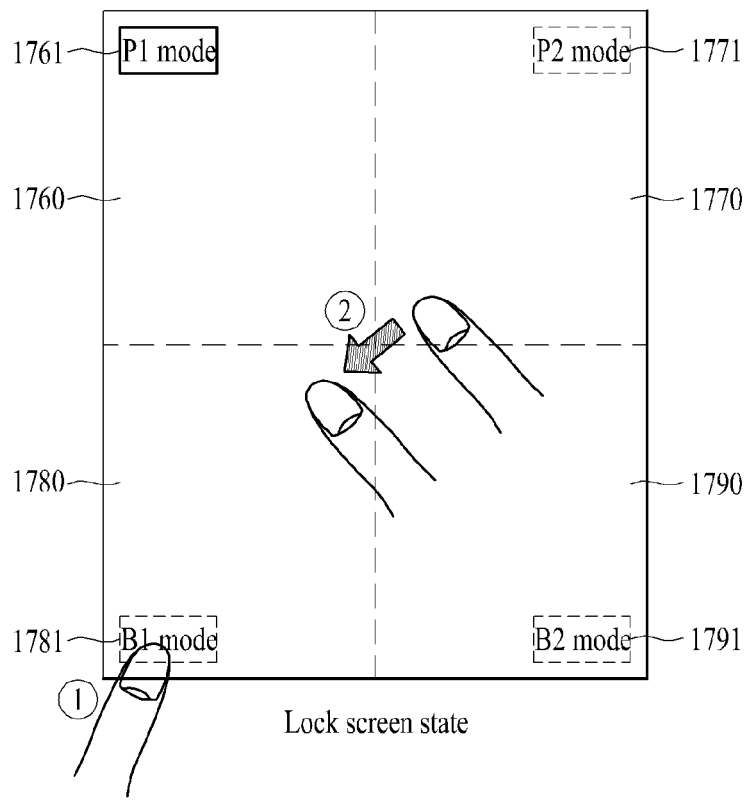

Referring to FIG. 17D, when configuring a plurality of private modes and a plurality of business modes, the mobile terminal 100 partitions the screen into regions 1760 to 1790 amounting to the number of total modes in the lock screen state and can then display the corresponding mode indicators 1761 to 1791 on the regions 1760 to 1790, respectively. In particular, the mobile terminal 100 can identifiably display the mode indicator 1761 corresponding to the first private mode currently activated. In addition, the mobile terminal 100 can further display information (e.g., event type, event count, occurrence hour, etc.) on an event occurring in association with the corresponding mode on each of the regions 1760 to 1790.

When receiving a user touch action on the mode indicator 1781 corresponding to the first business mode (①) or a touch & drag action to the zone 1780 corresponding to the first business mode (②), the mobile terminal 100 can receive an input of a mode switching command signal for a switching to the first business mode.

Therefore, when receiving the input of the mode switching command signal, as shown in FIGS. 16A to 17D, the mobile terminal 100 detects the signal for the mode switching and can then perform the mode switching operation of the switching to the mode corresponding to the input mode switching command signal.

Meanwhile, it can vary an input type of the mode switching command signal corresponding to each of the private mode and the business mode. If a plurality of private modes (or business modes) exists, an input type of a mode switching command signal can be varied per private mode. For instance, in order to perform the switching to the private mode, a 2-times terminal shaking, a touch & drag in a left direction, a forward terminal inclination or the like can be input. For another instance, in order to perform the switching to the business mode, a 1-time terminal shaking, a touch & drag in a right direction, a backward terminal inclination or the like can be input. For another instance, in order to perform the switching to the first private mode, a 1-time terminal shaking can be input. For another instance, in order to perform the switching to the second private mode, a 2-times terminal shaking can be input. For a further instance, in order to perform the switching to the third private mode, a 3-times terminal shaking can be input.

The above-described embodiments are just examples for inputting the mode switching command signal, by which a scheme of inputting the mode switching command signal is non-limited.

According to the present invention, when attempting to switch a currently activated mode to a different mode that requires an authentication procedure (e.g., a switching to a second mode from a first mode or a switching to a business mode from a private mode), the mobile terminal 100 can ask a user of an input of a user authentication information.

The mobile terminal 100 previously registers (or stores) a valid user authentication information with the memory 160 or the company server 300 and then determines whether the input user authentication information matches the previously-registered valid user authentication information. If the information match each other, the mobile terminal 100 can determine that the input user authentication information is valid. In doing so, the match determination can be performed by the mobile terminal 100 or the company server 300.

In the following description, a process for receiving an input of a user authentication information is explained with reference to FIGS. 18A to 18G. For clarity and convenience of the following description, assume that a first mode and a second mode are a private mode and a business mode, respectively. In addition, assume that an authentication procedure is required for entering the business mode.

Figure 18A:
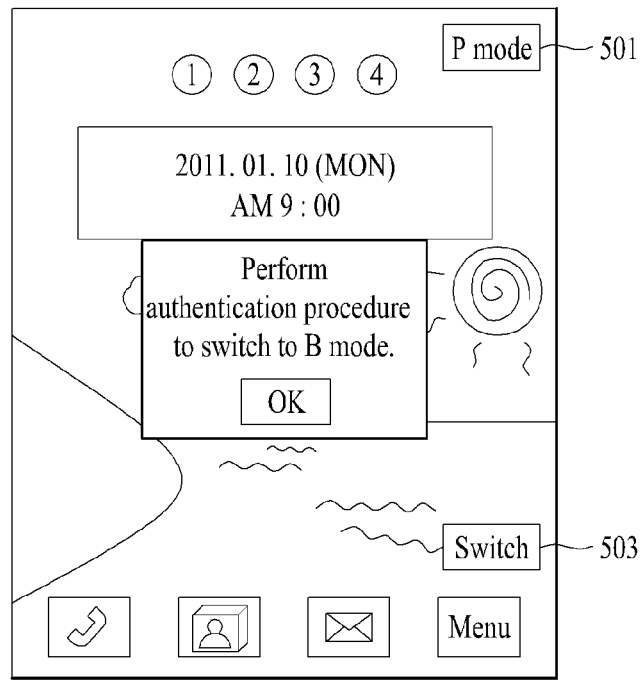
FIGS. 18A to 18G are diagrams of a process for receiving an input of a user authentication information according to the present invention.
Figure 18B:
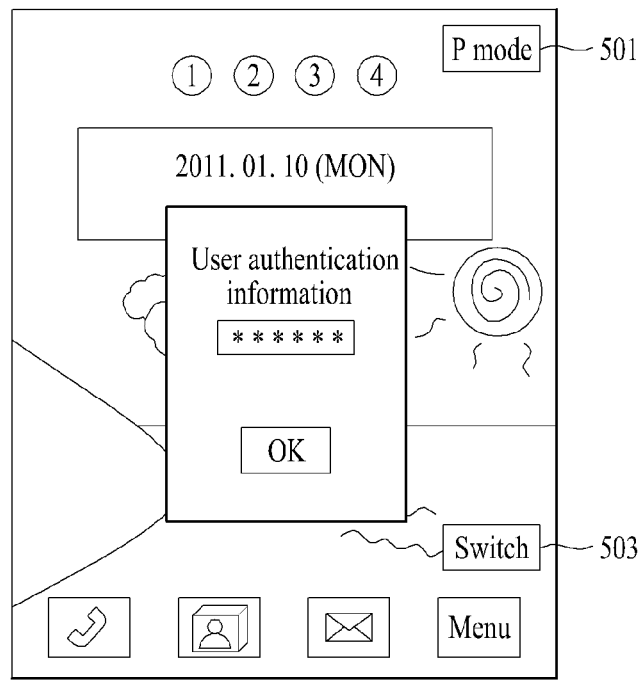
Figure 18C:
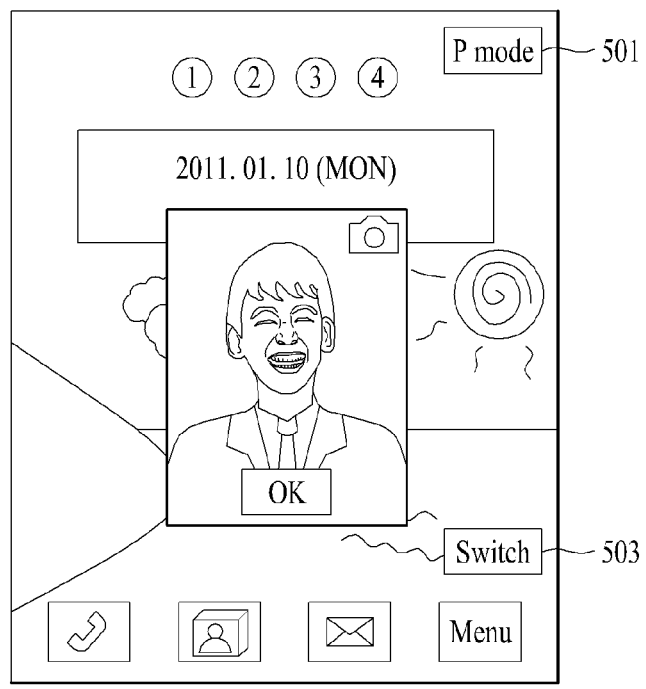
Figure 18D:
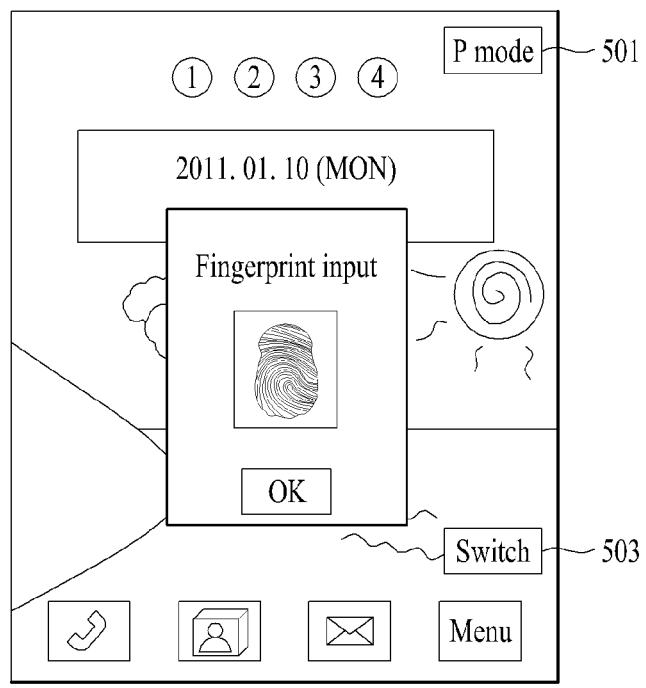
Figure 18E:
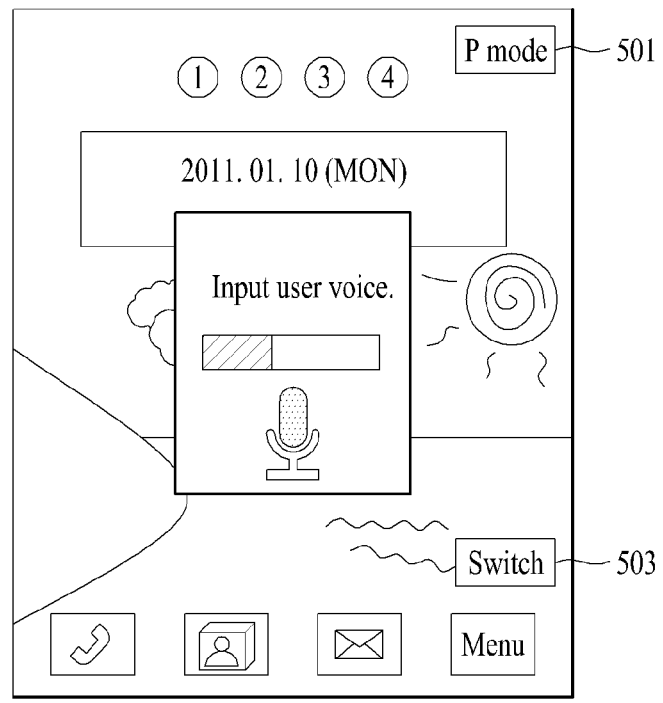
Figure 18F:
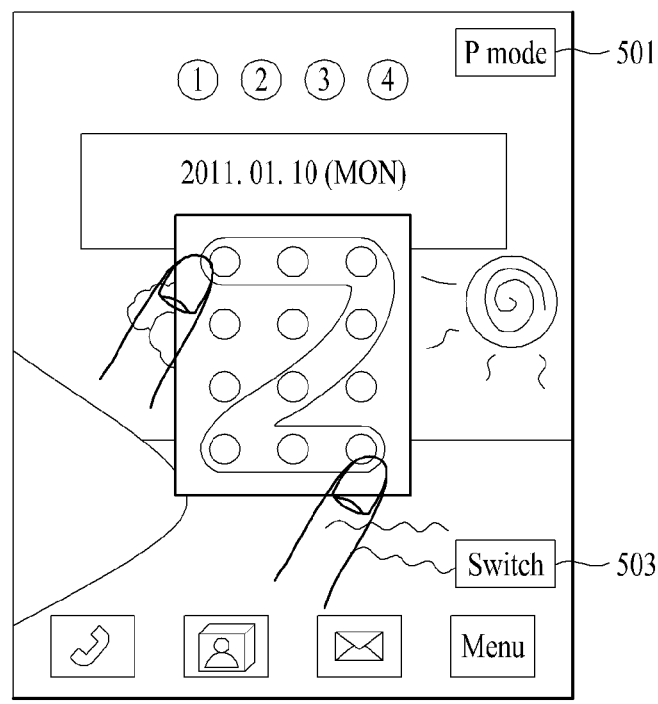

Referring to FIG. 18A, when the mobile terminal 100 requests an authentication procedure to enter a business mode, the mobile terminal 100 informs a user of the requested authentication procedure and can then request the user to input a user authentication information.

Figure 18G:
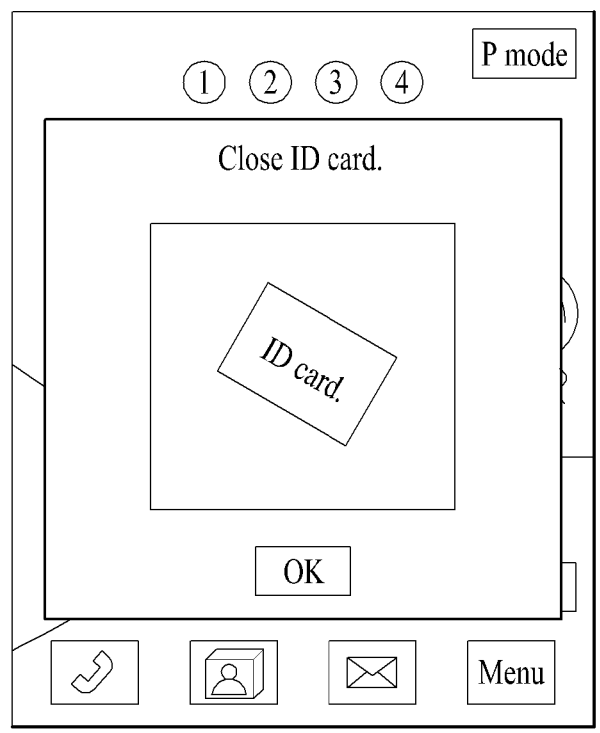

The mobile terminal 100 receives an input of a user authentication information configured with characters/symbols and the like from the user using a keypad (FIG. 18B), receives an input of a user face image as a user authentication information using the camera 121 (FIG. 18C), receives an input of a user fingerprint as a user authentication information (FIG. 18D), receives an input of a user voice as a user authentication information using the microphone 122 (FIG. 18E), receives an input of a predetermined touch pattern as a user authentication information (FIG. 18F), or can receive a user ID card information as a user authentication information (FIG. 18G). The above-enumerated user authentication information are just exemplary and no limitation is put on a form and configuration of the corresponding user authentication information.

Therefore, if the user authentication information input in one of FIGS. 18A to 18G is valid, the mobile terminal 100 can switch a current mode to the second mode.

Moreover, if a business related event (e.g., a call reception, an email reception, etc.) occurs in a private mode activate state, a separate authentication procedure (e.g., a company ID number input, a fingerprint input, etc.) performed in the company can be performed in addition to the above-described authentication procedure.

When there are several switching target modes, it is necessary to input different user authentication information. For instance, when a fingerprint input, a switched mode can be discriminated in accordance with a left thumb or a right thumb.

In the following description, when the mobile terminal 100 is located at a specific place as a specific event for generating a signal for a mode switching, a mode switching process is explained with reference to FIGS. 19A to 19D. For clarity and convenience of the following description, assume that a first mode and a second mode are a private mode (P mode) and a business mode (B mode), respectively.

FIGS. 19A to 19D are diagrams of a mode switching process when being located at a specific place according to the present invention.

Figure 19A:
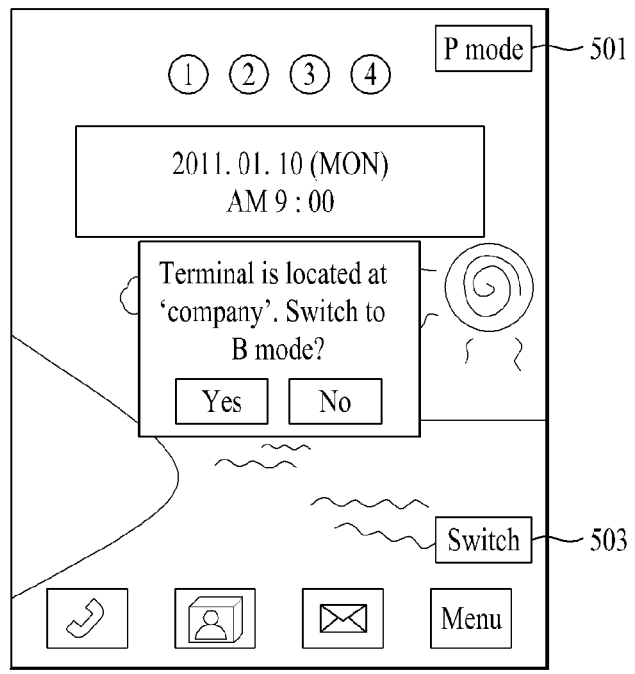
FIGS. 19A to 19D are diagrams of a mode switching process when being located at a specific place according to the present invention.
Figure 19A:
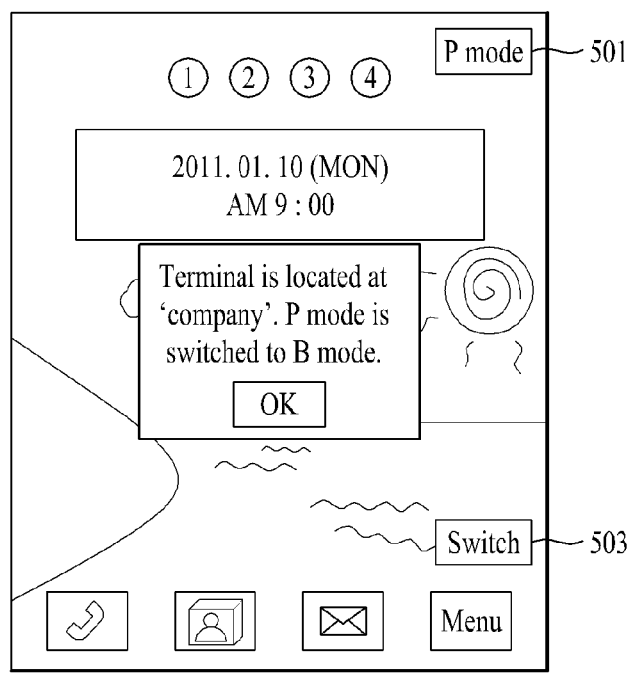

Referring to FIG. 19A, while a private mode is activated, if the mobile terminal 100 is located at a place (e.g., a company or office) corresponding to a business mode or within a predetermined radius centering on the corresponding place, the mobile terminal 100 enables a user to select whether to perform a switching to the business mode (FIG. 19A(a)). Alternatively, the mobile terminal 100 automatically switches the private mode to the business mode irrespective of a presence or non-presence of a user selection and can then output a switching indication information indicating the switching to the business mode (FIG. 19A(b)).

Figure 19B:
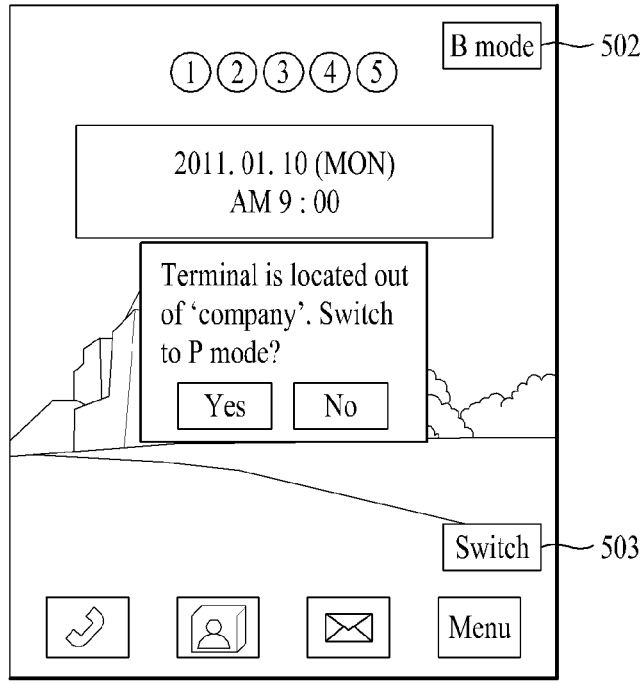
Figure 19B:
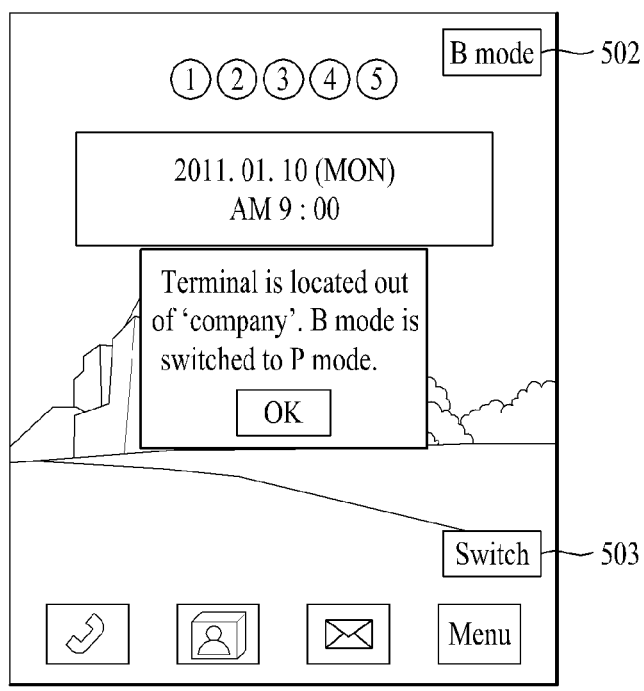

Referring to FIG. 19B, when getting out of the place corresponding to the business mode or the predetermined radius from the corresponding place (i.e., example of a case of terminating a terminal operation of generating the signal for the mode switching), the mobile terminal 100 switches the business mode to the private mode in accordance with a user selection (FIG. 19B(a)) or can automatically switch the business mode to the private mode irrespective of the user selection (FIG. 19B(b)).

Figure 19C:
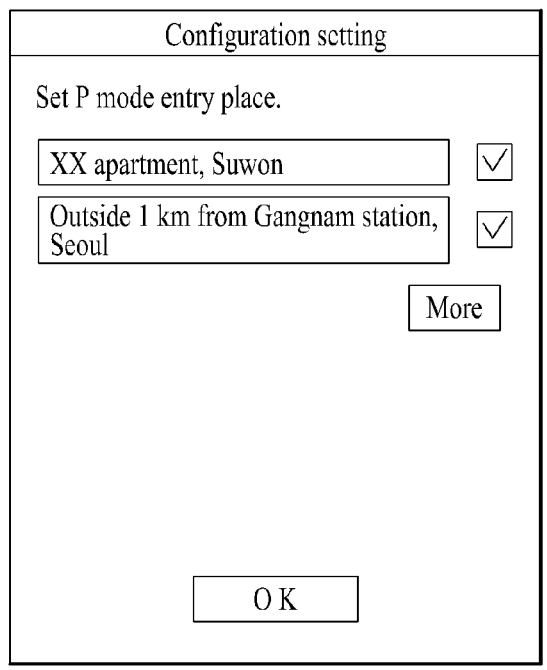
Figure 19C:
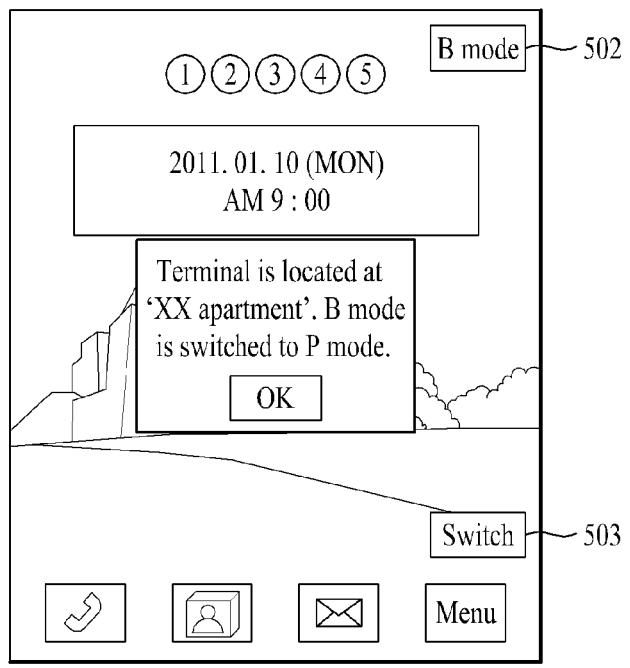

In particular, in the case shown in FIG. 19A(a) of FIG. 19A(b), the mobile terminal 100 can switch a current mode to the business mode or the private mode only if the user selects 'Yes (switch)', Referring to FIG. 19C, the mobile terminal 100 can set at least one place corresponding to the private mode in accordance with a user selection (FIG. 19C(a)). While the business mode is activated, if the mobile terminal 100 is located at the set place, the mobile terminal 100 can switch the business mode to the private mode (FIG. 19C(b)).

Figure 19D:
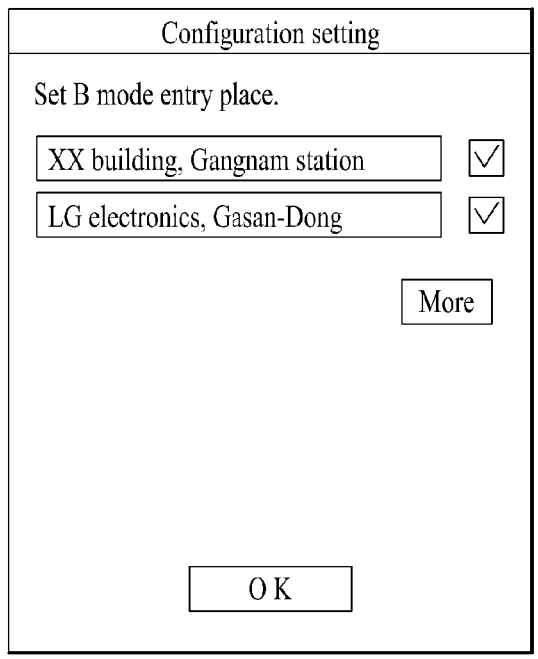
Figure 19D:
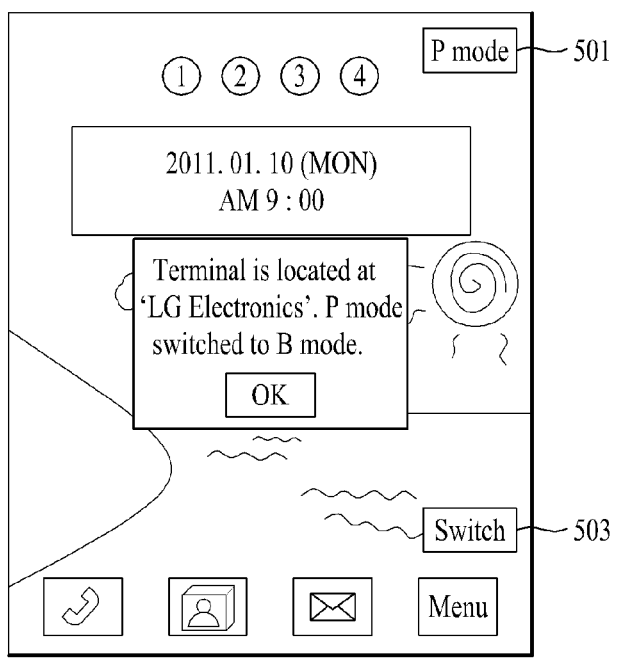

Referring to FIG. 19D, the mobile terminal 100 can set at least one place corresponding to the business mode in accordance with a user selection (FIG. 19D (a)). While the private mode is activated, if the mobile terminal 100 is located at the set place, the mobile terminal 100 can switch the private mode to the business mode (FIG. 19D (b)).

Meanwhile, the mobile terminal 100 analyzes a mode use pattern per place, determines an implementation time of the private/business mode per place for a predetermined period of time according to the analyzed pattern, and can then designate the private mode or the business mode. Therefore, when the mobile terminal 100 is located at a specific place, the mobile terminal 100 enters the mode designated to the specific place.

Alternatively, if another mode is being executed, the mobile terminal 100 can switch the currently executed mode to the mode designated to the specific place.

In the following description, when a current hour belongs to a specific time as a specific event of generating a signal for a mode switching, a mode switching process is explained with reference to FIGS. 20A to 20D. For clarity and convenience of the following description, assume that a first mode and a second mode are a private mode (P mode) and a business mode (B mode), respectively.

FIGS. 20A to 20D are diagrams of a mode switching process when belonging to a specific time according to the present invention.

Figure 20A:
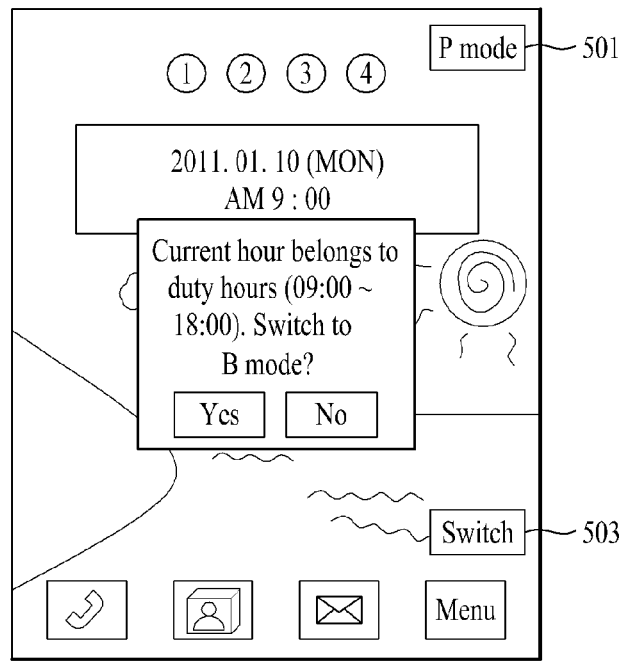
FIGS. 20A to 20D are diagrams of a mode switching process when belonging to a specific time according to the present invention.
Figure 20A:
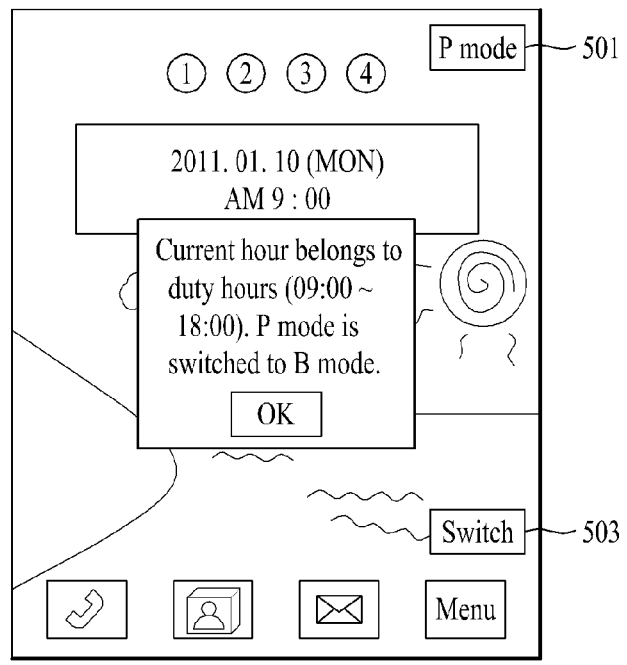

Referring to FIG. 20A, while a private mode is activated, if a current hour belongs to a time (e.g., duty time: AM 09:00 to PM 06:00) corresponding to a business mode, the mobile terminal 100 enables a user to select whether to perform a switching to the business mode (FIG. 20A(a)). Alternatively, the mobile terminal 100 automatically switches the private mode to the business mode irrespective of a presence or non-presence of a user selection and can then output a switching indication information indicating the switching to the business mode (FIG. 20A(b)).

Figure 20B:
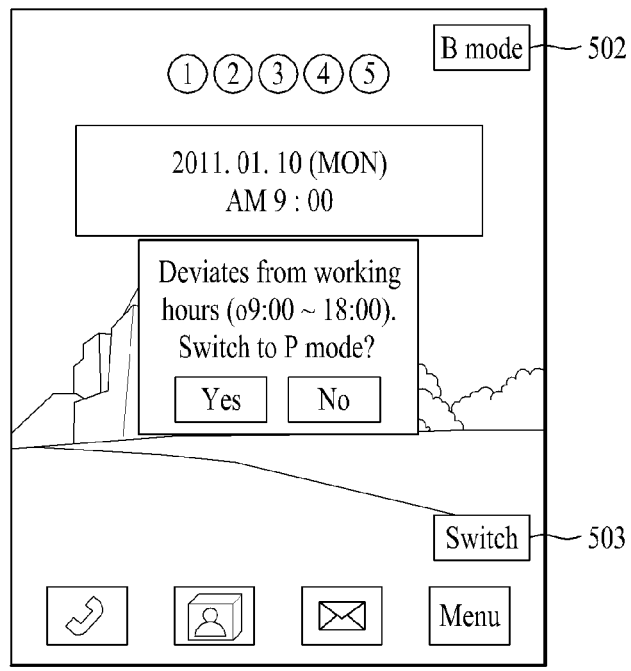
Figure 20B:
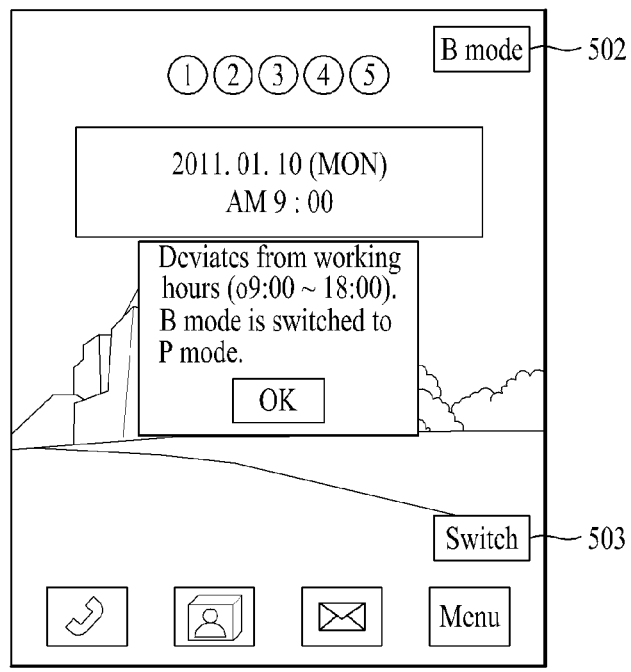

Referring to FIG. 20B, when the current hour deviates from the time corresponding to the business mode (i.e., example of terminating a terminal operation of generating the signal for the mode switching), the mobile terminal 100 switches the business mode to the private mode in accordance with a user selection (FIG. 20B(a)) or can automatically switch the business mode to the private mode irrespective of the user selection (FIG. 20B(b)).

Figure 20C:
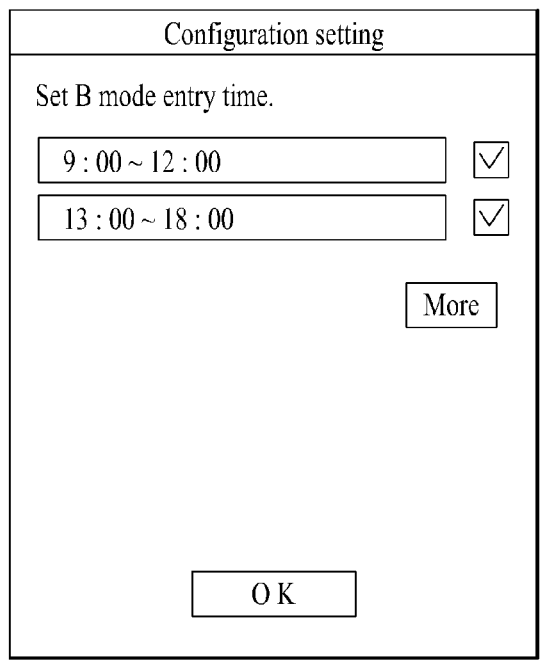
Figure 20C:
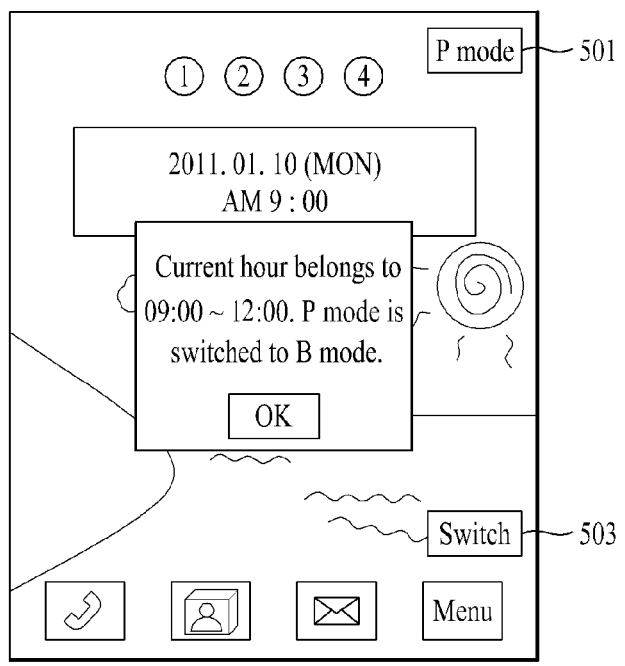

In particular, in the case shown in FIG. 20A(a) of FIG. 20A(b), the mobile terminal 100 can switch a current mode to the business mode or the private mode only if the user selects 'Yes (switch)', Referring to FIG. 20C, the mobile terminal 100 can set at least one time corresponding to the private mode in accordance with a user selection (FIG. 20C(a)). While the business mode is activated, if the current hour belongs to the set time, the mobile terminal 100 can switch the business mode to the private mode (FIG. 20C(b)).

Figure 20D:
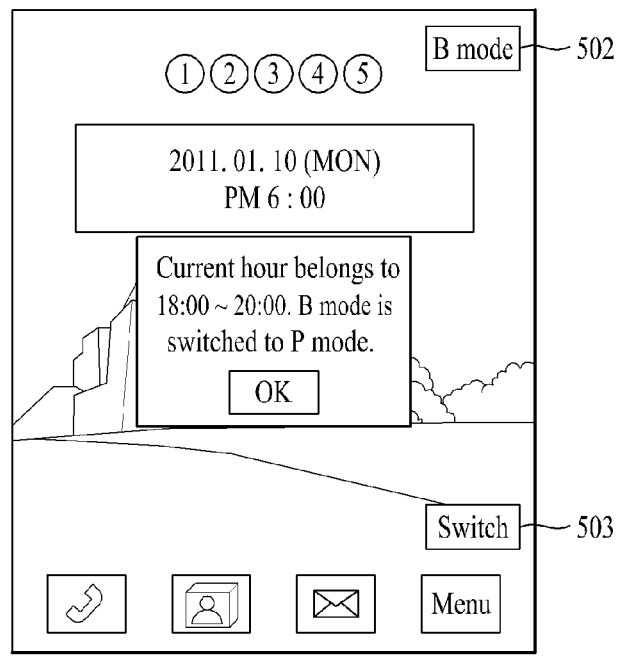

Referring to FIG. 20D, the mobile terminal 100 can set at least one time corresponding to the business mode in accordance with a user selection (FIG. 20D (a)). While the private mode is activated, if the current hour belongs to the set time, the mobile terminal 100 can switch the private mode to the business mode (FIG. 20D (b)).

Meanwhile, the mobile terminal 100 analyzes a mode use pattern per time zone, determines an implementation time zone of the private/business mode for a predetermined period of time according to the analyzed pattern, and can then designate the private mode or the business mode. Therefore, when a current hour belongs to a specific time zone, the mobile terminal 100 enters the mode designated to the specific time zone. Alternatively, if another mode is being executed, the mobile terminal 100 can switch the currently executed mode to the mode designated to the specific time zone.

Moreover, the mobile terminal 100 may not perform the mode switching using the specific place or time on such a non-working day as Saturday, Sunday, holiday and the like. Besides, the mobile terminal 100 can change a time zone corresponding to a specific mode to match a time zone of a currently located country or area.

In the following description, when a specific network is accessed as a specific event of generating a signal for a mode switching, a mode switching process is explained with reference to FIG. 21A and FIG. 21B. For clarity and convenience of the following description, assume that a first mode and a second mode are a private mode (P mode) and a business mode (B mode), respectively.

Figure 21A:
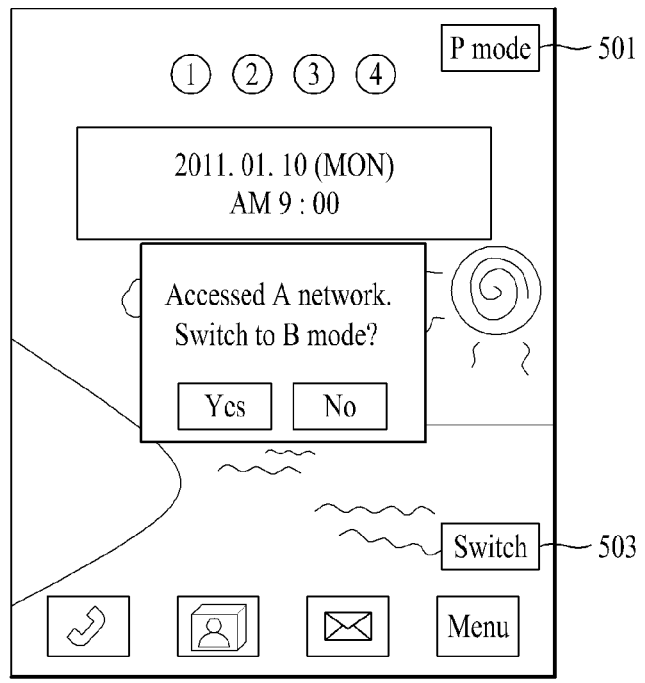
FIG. 21A and FIG. 21B are diagrams of a mode switching process when accessing a specific network according to the present invention.
Figure 21A:
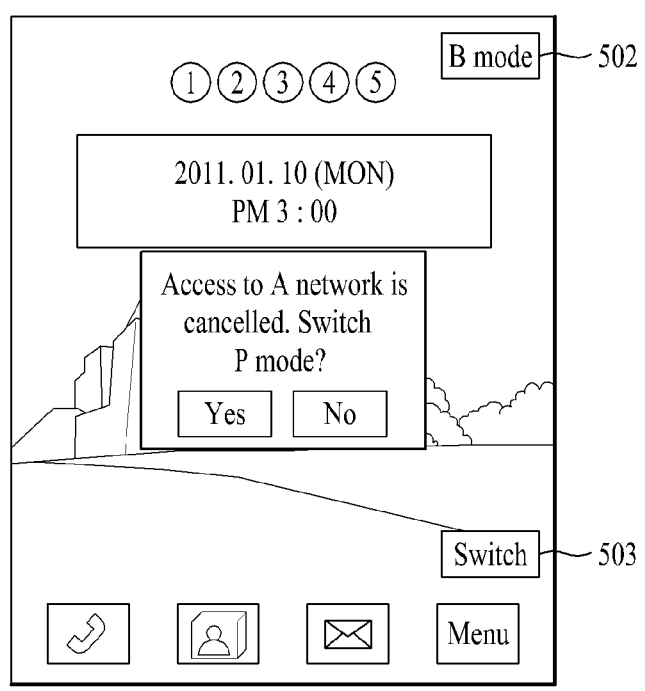
Figure 21B:
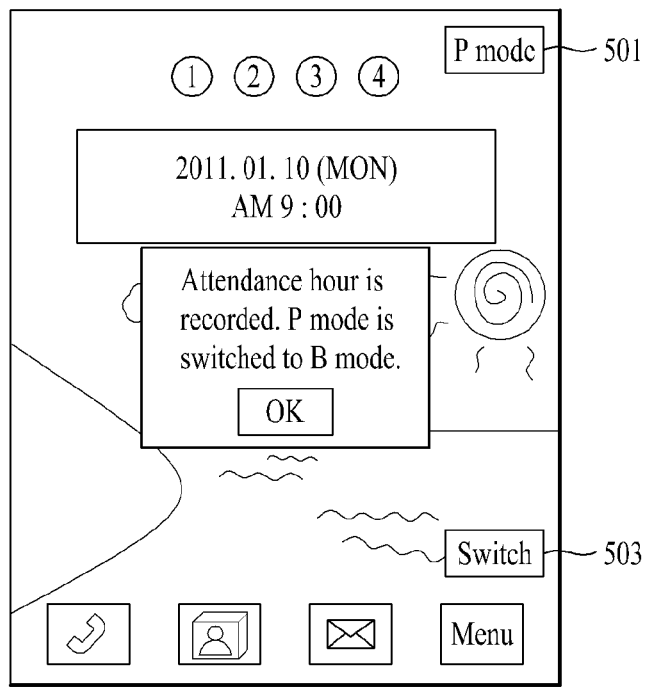
Figure 21B:
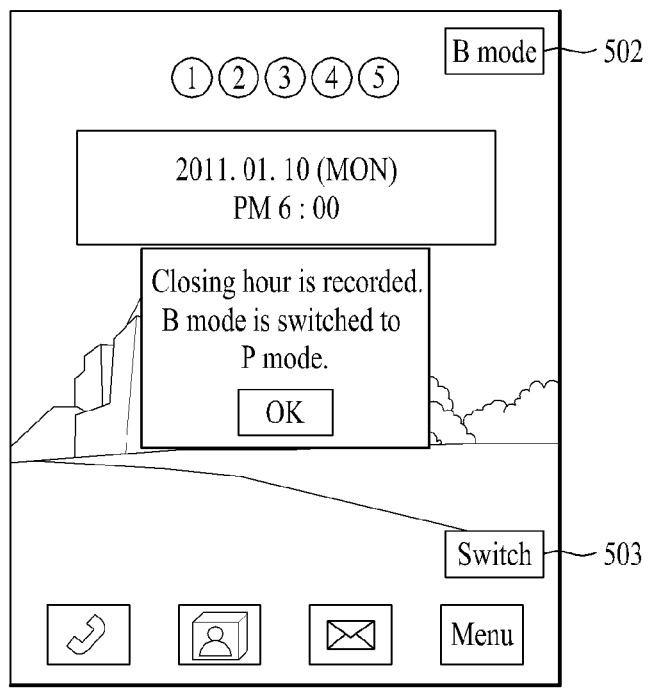

FIG. 21A and FIG. 21B are diagrams of a mode switching process when accessing a specific network according to the present invention.

Referring to FIG. 21A, while a private mode is activated, if the mobile terminal 100 accesses a network corresponding to a business mode, the mobile terminal 100 can switch the private mode to the business mode (FIG. 21A(a)). If the mobile terminal 100 is released from the access to the network corresponding to the business mode (i.e., example of terminating a terminal operation of generating the signal for the mode switching), the mobile terminal 100 can switch the business mode to the private mode automatically or in accordance with a user selection (FIG. 21A(b)).

The above description is applicable to when a network corresponding to a private mode is accessed in an activated state of a business mode. A network per business/private mode is designated in accordance with a user selection. Alternatively, an in-company network and a home network can be automatically designated as a network per business/private mode.

Referring to FIG. 21B, while the private mode is activate, if an hour of attending the office is recorded in an in-company attendance recoding server, the mobile terminal 100 can switch the private mode to the business mode in accordance with a user selection or automatically (FIG. 21B(a)). If an hour of leaving the office is recorded, the mobile terminal 100 can switch the business mode to the private mode in accordance with a user selection or automatically (FIG. 21B(b)).

In the following description, when a data is received from a specific counterpart terminal as a specific event of generating a signal for a mode switching, a mode switching process is explained with reference to FIGS. 22A to 23B. In the following description, when a data is transmitted to a specific counterpart terminal as a specific event of generating a signal for a mode switching, a mode switching process is explained with reference to FIGS. 24A to 25B. For clarity and convenience of the following description, assume that a first mode and a second mode are a private mode (P mode) and a business mode (B mode), respectively.

In this instance, the data can include such a data of any type receivable from the counterpart terminal as a message, an audio call, a video call, an email and the like.

In addition, the signal for the mode switching can include information on a specific application executable in a second mode to which a current mode will be switched. In particular, the information on the application can include a counterpart information corresponding to the counterpart terminal or a type of data transceived with the counterpart terminal.

For instance, the counterpart information can include one of an email address (specific application: email, etc.), a phonebook (specific application: message, audio call, video call, etc.), a user ID registered with IMS (specific application: instant messaging service, etc.) and the like. In addition, the data type can include one of an email, a message, an audio call, a video call, a conversation via IMS and the like.

Therefore, when the information on the specific application is included in the signal for the mode switching, the controller 180 can execute the specific application while switching the first mode to the second mode.

The counterpart terminal corresponding to the private mode or the business mode can include a terminal of which counterpart information (e.g., home phone number, mobile phone number, email address, etc.) is stored in the phonebook in association with the private mode or the business mode. Moreover, counterpart information on a counterpart different per private/business mode can be designated. In addition, a different counterpart information (e.g., a different email address, a different phone number, etc.) on a same counterpart can be designated per private/business mode.

FIGS. 22A to 23B are diagrams of a mode switching process when receiving data from a specific counterpart terminal according to the present invention. In addition, FIG. 24A to 25B are diagrams of a mode switching process when transmitting data to a specific counterpart terminal according to the present invention.

Figure 22A:
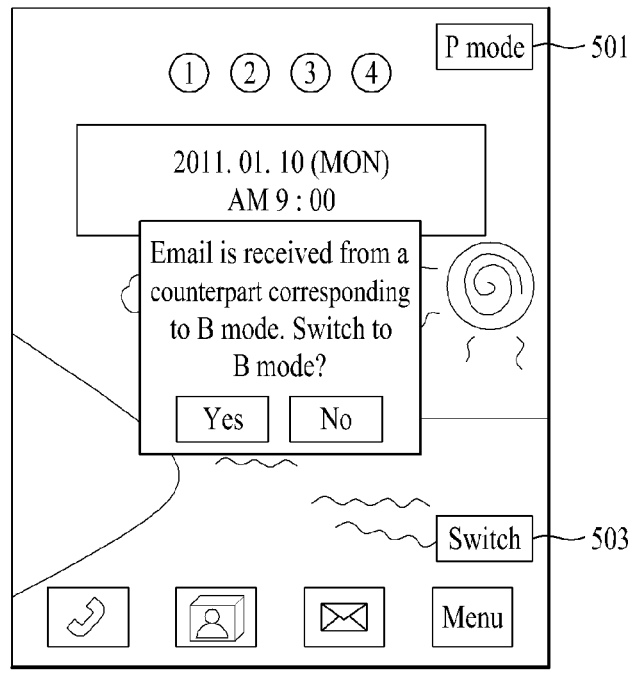
FIGS. 22A to 23C are diagrams of a mode switching process when receiving data from a specific counterpart terminal according to the present invention.
Figure 22A:
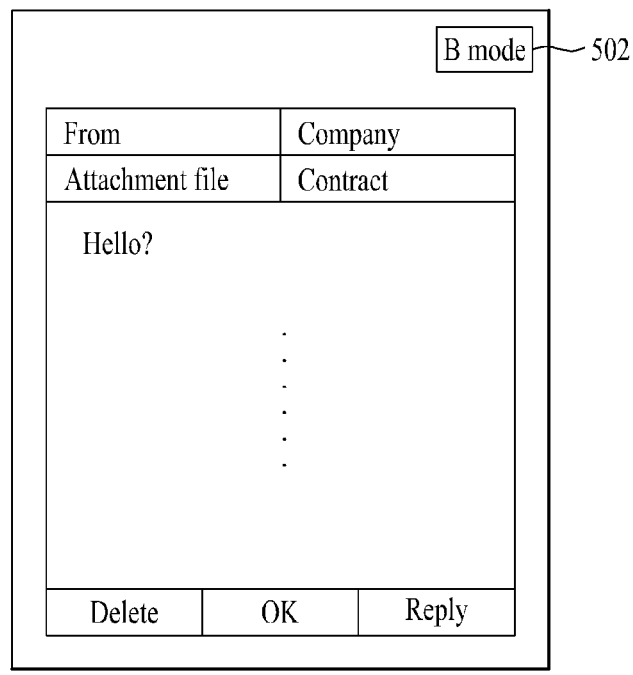
Figure 26A:
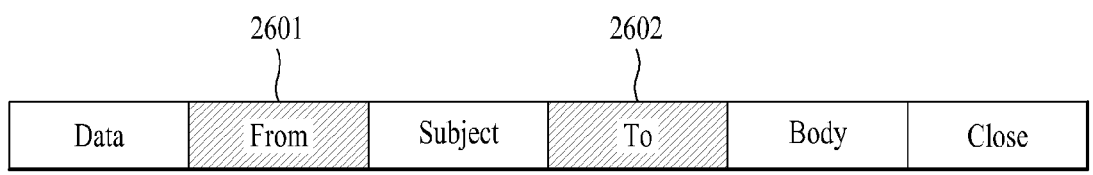
FIG. 26A and FIG. 26B are diagrams of a data structure including a data field for determining a specific counterpart terminal in FIGS. 22A to 25B.

Referring to FIG. 22A, while a private mode is activated, when receiving an email from a counterpart terminal corresponding to a business mode, the mobile terminal is ale to switch the private mode to the business mode automatically or in accordance with a user selection (FIG. 22A(a)). As the private mode is switched to the business mode, the mobile terminal 100 executes an email application to check the substance of the received email (FIG. 22A(b)). In this instance, the received email has the data structure shown in FIG. 26A and can include a field (From) 2601 indicating a transmitting side terminal information and a field (To) 2602 indicating a receiving side terminal information. Therefore, the mobile terminal 100 can check the counterpart terminal corresponding to the business mode using the counterpart terminal information included in the field (From) 2601.

Figure 22B:
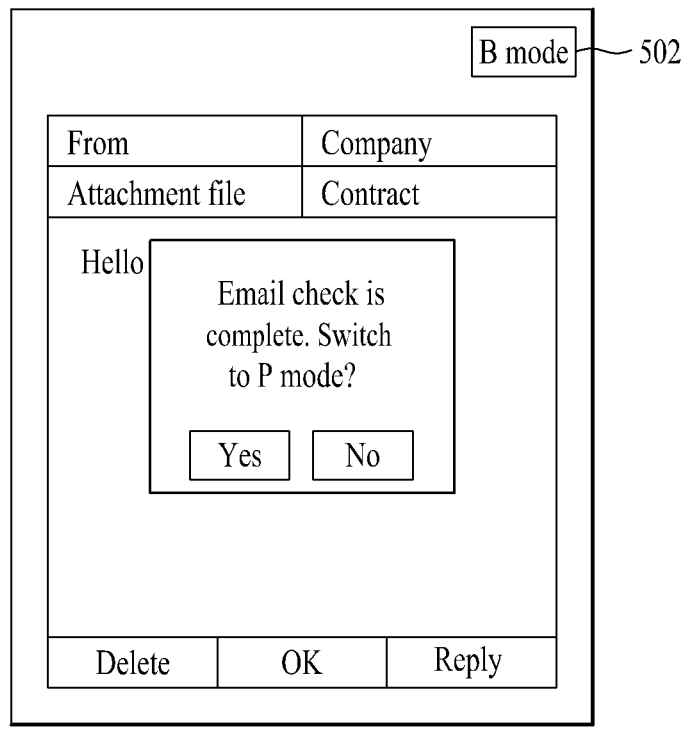

Referring to FIG. 22B, if the received email check is completed, the mobile terminal 100 can switch the business mode to the private mode in accordance with a user selection or automatically.

Figure 23A:
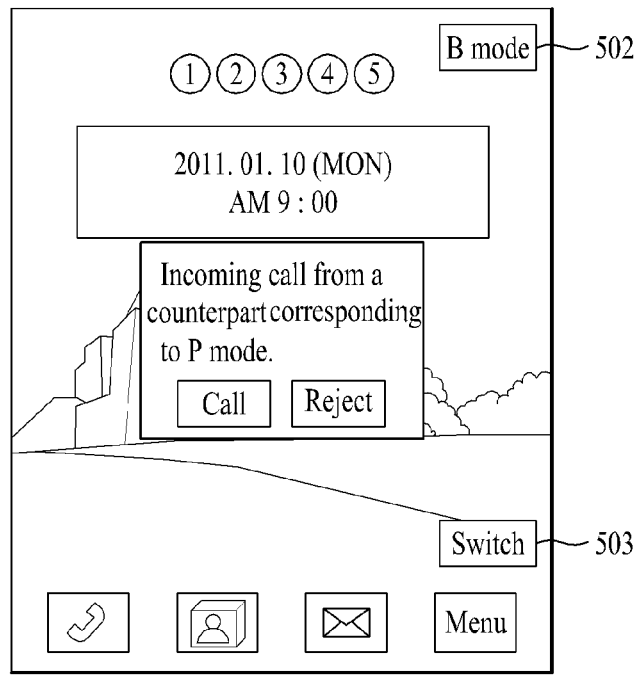
Figure 23A:
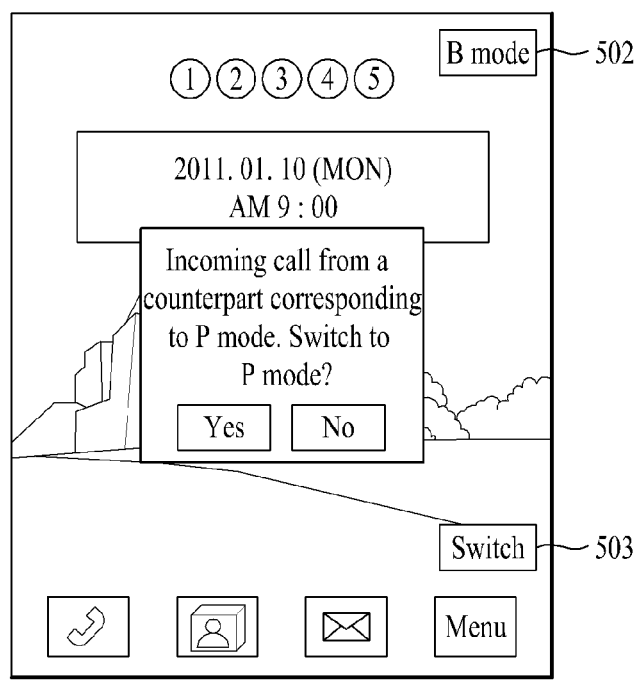

Referring to FIG. 23A, while a business mode is activated, when receiving an audio call from a counterpart terminal corresponding to a private mode, the mobile terminal 100 informs a user of the reception of the audio call and enables the user to select a 'call' or a 'reject' (FIG. 23A(a)) or enables the user to select whether to perform a switching to the private mode (FIG. 23A(b)).

Figure 23B:
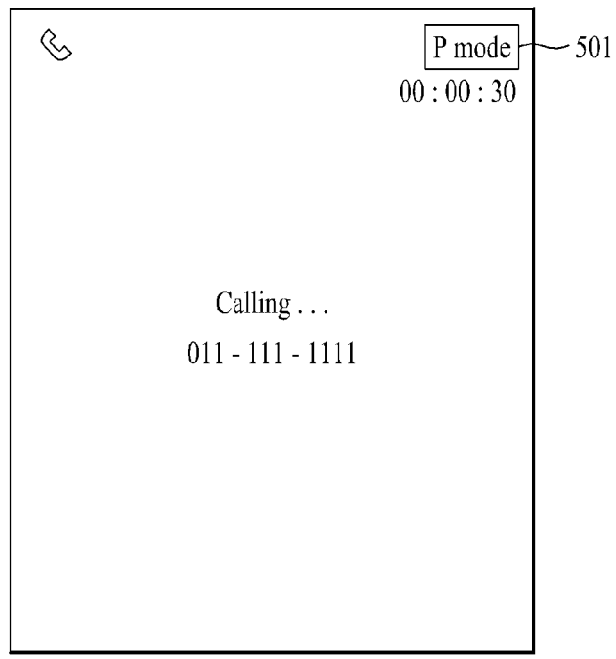

Referring to FIG. 23B, if the call is selected in FIG. 23A(a) or the 'Yes (switch)' is selected in FIG. 23A(b), the mobile terminal 100 switches the business mode to the private mode and can then connect the audio call received from the counterpart terminal by executing a call application.

Figure 23C:
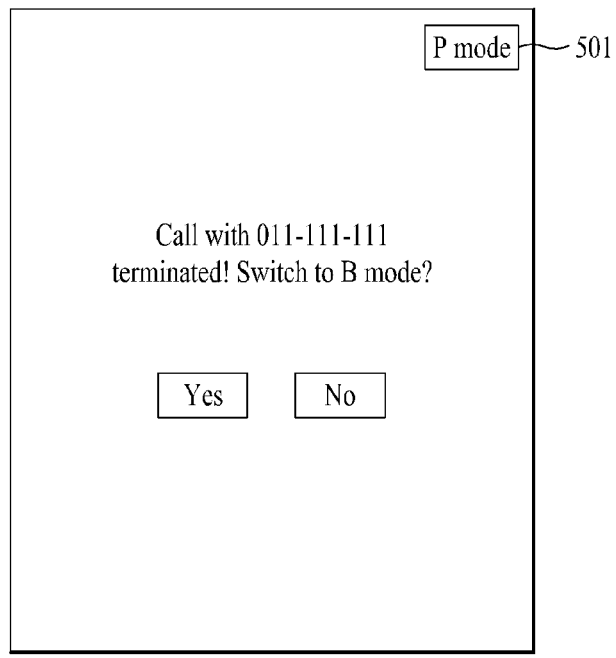

Referring to FIG. 23C, if the connected audio call is terminated, the mobile terminal 100 can switch the private mode to the business mode automatically or in accordance of a user selection.

Figure 24A:
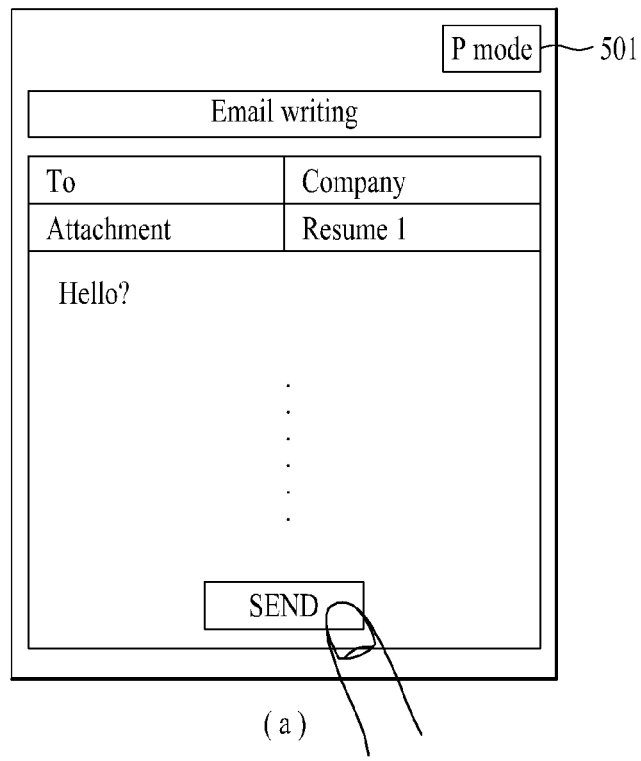
FIG. 24A to 25B are diagrams of a mode switching process when transmitting data to a specific counterpart terminal according to the present invention.
Figure 24A:
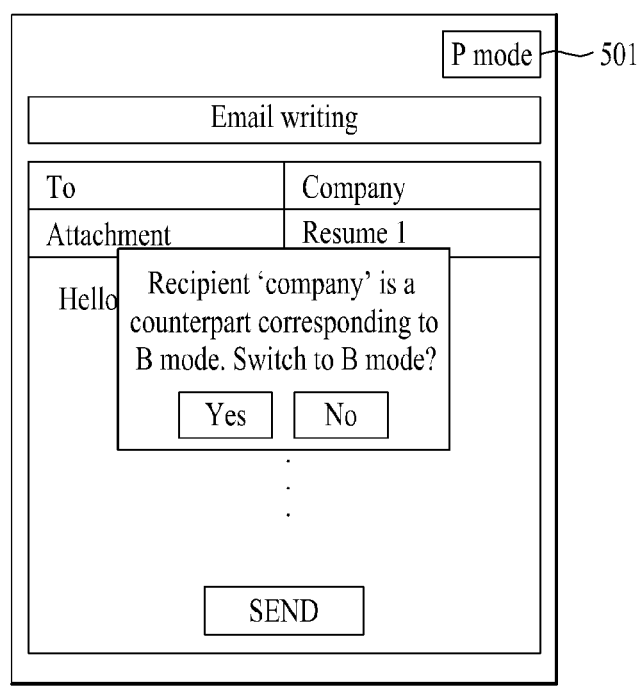

Referring to FIG. 24a, while a private mode is activated, when sending an email having a recipient set to a counterpart (e.g., a company) corresponding to a business mode (FIG. 24A(a)), the mobile terminal 100 switches the private mode to the business mode automatically or in accordance of a user selection and can then execute an email application in accordance with a feature corresponding to the business mode (FIG. 24A(b)). In doing so, using the counterpart information included in the field (To) 2602 shown in FIG. 26A, it can check whether a receiving counterpart of the sent email is the counterpart corresponding to the business mode.

Figure 24B:
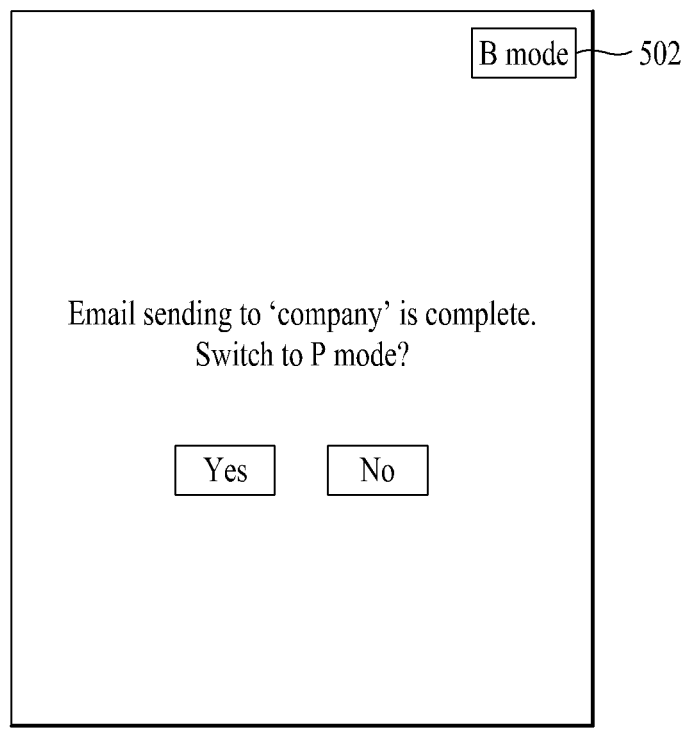

Referring to FIG. 24B, if the email sending is completed, the mobile terminal 100 can switch the business mode to the private mode.

Figure 25A:
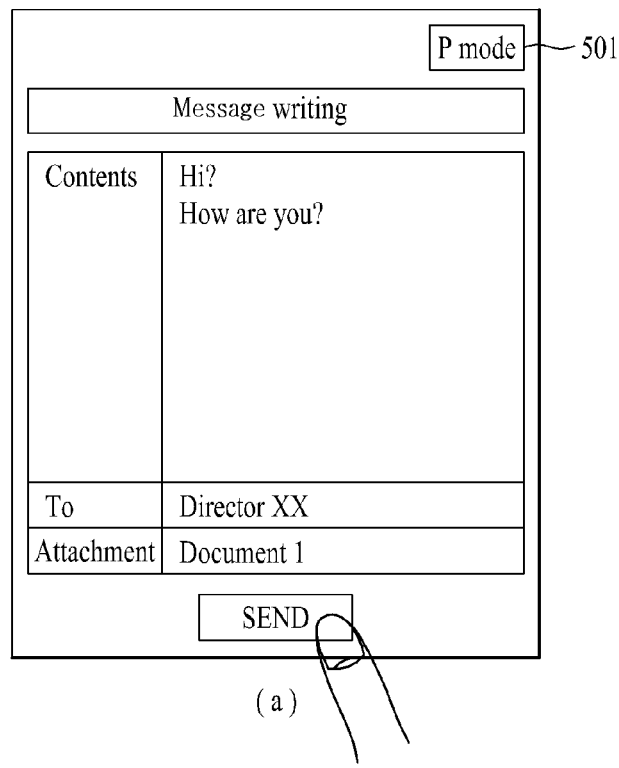
Figure 25A:
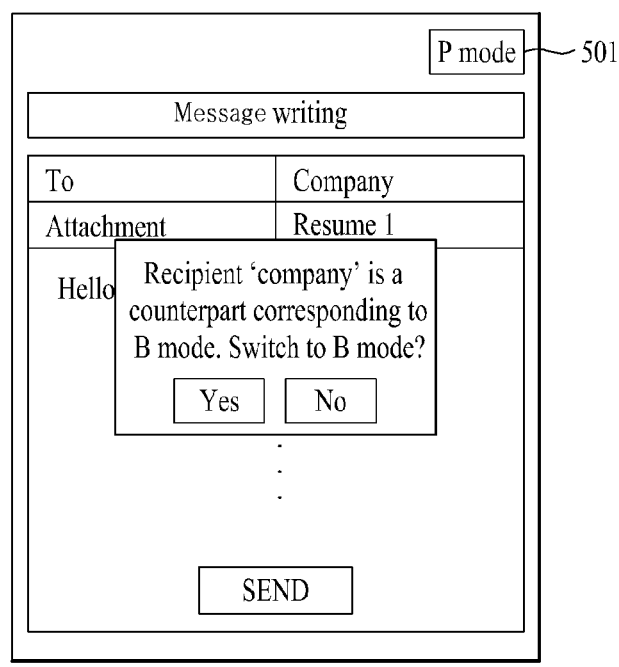
Figure 26B:
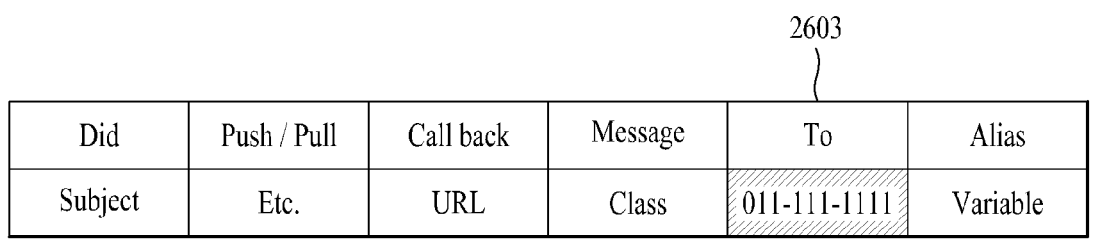

Referring to FIG. 25a, while a private mode is activated, when sending a message having a recipient information set to a counterpart information (e.g., director XX) corresponding to a business mode (FIG. 25A(a)), the mobile terminal 100 switches the private mode to the business mode automatically or in accordance of a user selection and can then execute a message application in accordance with a feature corresponding to the business mode (FIG. 25A(b)). In doing so, using the counterpart information included in the field (To) 2603 of the message data structure shown in FIG. 26B, it can check whether a receiving counterpart of the sent message is the counterpart information corresponding to the business mode.

Figure 25B:
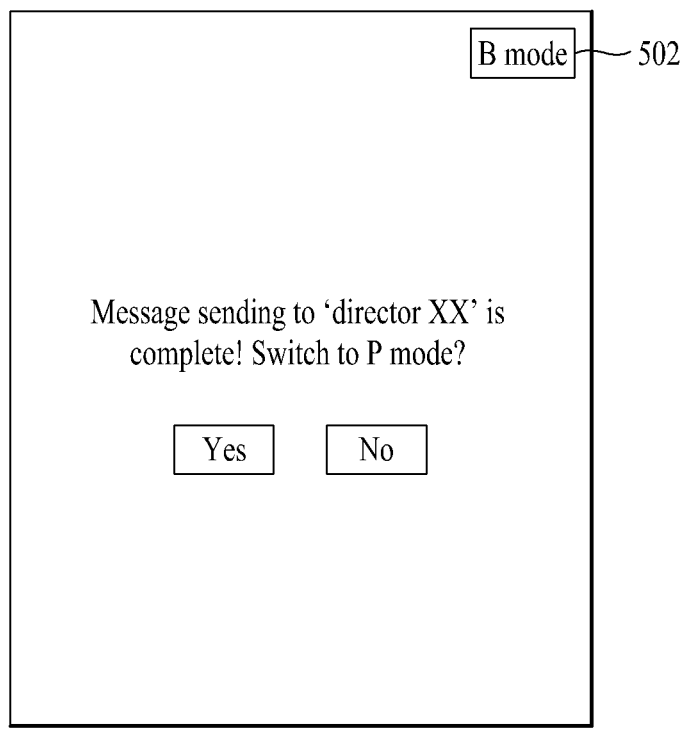

Referring to FIG. 25B, if the message sending is completed, the mobile terminal 100 can switch the business mode to the private mode.

Moreover, if an authentication procedure for entering a mode, to which a currently implemented mode will be switched, is requested in FIGS. 19A to 25B (e.g., if a conditional access is set on a mode to which a currently implemented mode will be switched, or if a security level higher than that of a currently implemented mode is set on a mode to which a currently implemented mode will be switched), the mobile terminal 100 receives an input of a user authentication information from a user. If the input user authentication information is valid, the mobile terminal 100 can switch a currently activated mode (e.g., the private mode) to another mode (e.g., the business mode).

Meanwhile, although the first mode is switched to the second mode in accordance with a detection of a signal for a mode switching, if a user input action does not exist for a predetermined period of time, the second mode can be switched to the first mode again.

In addition, the embodiments relating to the switching to the specific mode in accordance with the detection of the signal for the mode switching are applicable to the entry into the specific mode when the operating system booting mentioned in the foregoing description. For instance, if a current terminal location is a specific place corresponding to a specific mode or a current hour belongs to a specific time corresponding to a specific mode, the specific mode can be entered when an operating system booting.

Meanwhile, when first and second user information differing from each other are set for a first mode and a second mode, respectively, if the mobile terminal 100 detects a data transceiving through the second user information in an activated state of the first mode, the mobile terminal 100 can switch the first mode to the second mode n accordance with a user selection or under the control of the controller 180. For instance, the first and second user information can include phone numbers differing from each other (e.g., case of dual SIM).

In the following description, when switching a mode in the course of a specific application execution, a method of controlling an application execution is explained with reference to the accompanying drawings.

Figure 27:
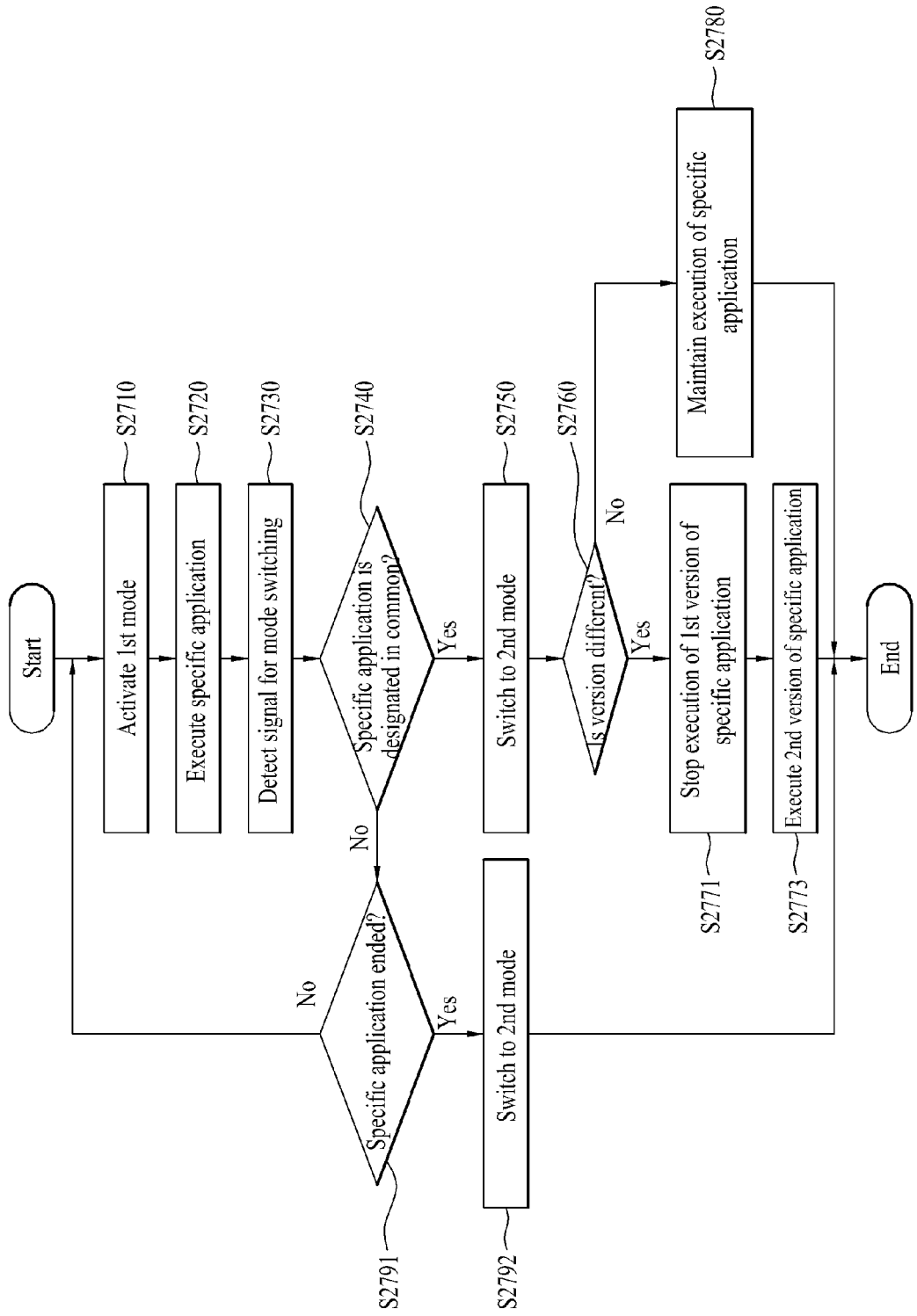
FIG. 27 is a second flowchart for a method of controlling a mode switching in a mobile terminal according to the present invention.

FIG. 27 is a second flowchart for a method of controlling a mode switching in a mobile terminal according to the present invention. For clarity and convenience of the following description, assume that a plurality of modes include a first mode and a second mode. In addition, assume that the first mode or the second mode is selectively activated despite that both of the first and second modes are currently implemented.

Referring to FIG. 27, the mobile terminal 100 implements a first mode and a second mode both under the control of the controller 180. While the first mode is activated (S2710, which is identical to S1110 shown in FIG. 11), the mobile terminal 100 executes a specific application (S2720).

In this instance, the executed specific application can include an application (i.e., a first dedicated application) executed in a manner of being dedicated to the first mode or an application (i.e., a common application) executed in common with the first mode and the second mode.

The mobile terminal 100 detects a signal for a mode switching in the course of executing the specific application under the control of the controller 180 (S2730, which is identical to S1120 shown in FIG. 11).

When detecting the signal for the mode switching, the mobile terminal 100 determines whether the executed specific application is the common application under the control of the controller 180 (S2740).

When determining that the specific application is the common application, as a result of the determining step S2740, the mobile terminal 100 switches the first mode to the second mode under the control of the controller 180 (S2750) and then determines whether the first mode and the second mode differ from each other in a version of the common application (S2760).

In this instance, if the version of the common application is different, it can mean that the first mode and the second mode differ from each other in a feature of the common application. Moreover, in order to switch a current mode to the second mode, an authentication procedure for the second mode may need to be performed.

As a result of the determining step S2760, if the first mode and the second mode differ from each other in the version (i.e., a first version in the first mode and a second version in the second mode) ('Yes' in the step S2760), the mobile terminal 100 stops executing the first version of the specific application (S2771) and executes the second version of the specific application (S2773, under the control of the controller 180.

In particular, the mobile terminal 100 stops the execution of the common application in accordance with the feature corresponding to the first mode and can execute the common application in accordance with the feature corresponding to the second mode.

On the contrary, as a result of the determining step S2760, if the first mode and the second mode do not differ from each other in the version ('No' in the step S2760), the mobile terminal 100 maintains the execution of the specific application, which is executed in the first mode, in the second mode as it is, under the control of the controller 180 (S2780).

In this instance, if the first mode and the second mode do not differ from each other in the version (i.e., the same version), it can mean that the common application is executed in each of the first mode and the second mode with the same feature.

Referring now to the step S2740, as a result of the determination, if the mobile terminal 100 determines that the specific application is not the common application (i.e., a case of the first dedicated application), the mobile terminal 100 determines whether to end the specific application, under the control of the controller 180 (S2791).

For instance, the specific application is entered in accordance with a user selection or can be automatically ended when a detection of a signal for a mode switching.

As a result of the determining step S2791, when determining that the specific application is ended, the mobile terminal 100 deactivates the first mode and activates the second mode, in a manner of entering the second mode under the control of the controller 180 (S2792). In this instance, an authentication procedure for the second mode may need to be performed in order for the switching to the second mode.

Besides, although an authentication procedure for switching a current mode to another mode is not explained in the description with reference to FIG. 27, the corresponding part of the former description with reference to FIG. 11 is applicable to the embodiment shown in FIG. 27.

In the following description, a mode switching process in the course of an execution of a common application is explained with reference to FIG. 28A and FIG. 29B.

Figure 28A:
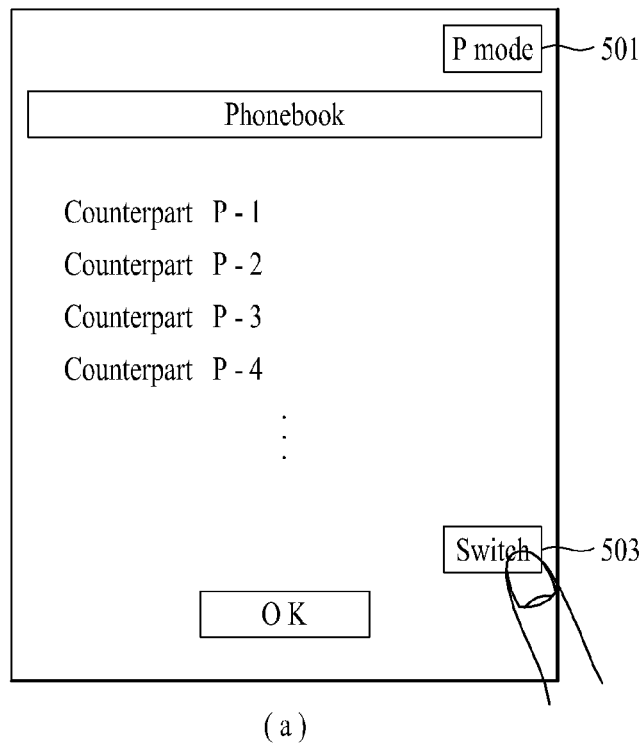
FIG. 28A and FIG. 28B are diagrams of a process for switching a mode in the course of executing a common application according to the present invention.
Figure 28A:
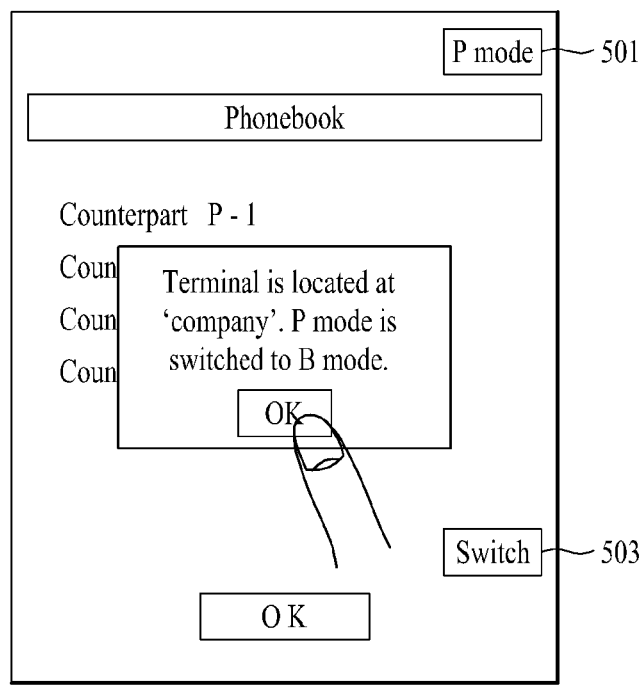
Figure 28B:
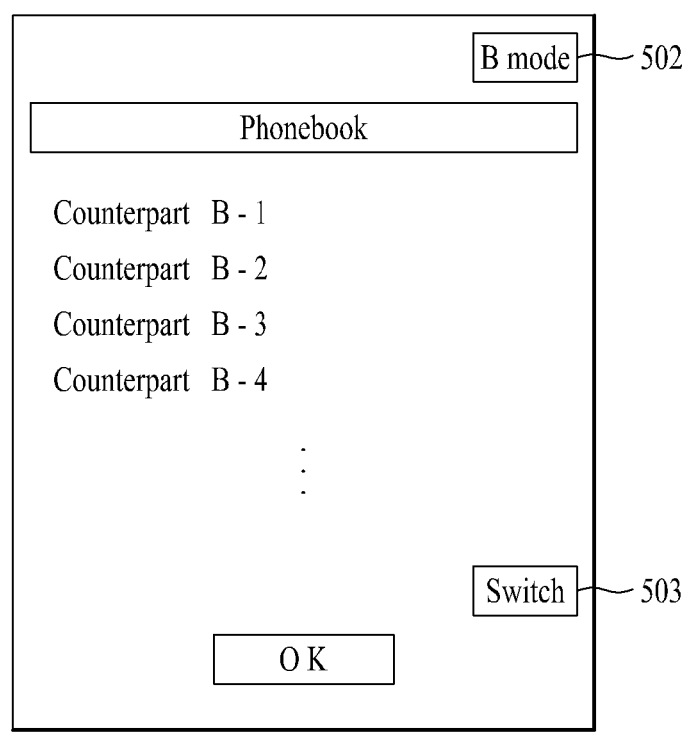

FIG. 28A and FIG. 28B are diagrams of a process for switching a mode in the course of executing a common application according to the present invention.

Referring to FIG. 28A and FIG. 28B, in the course of executing a phonebook in accordance with a feature corresponding to a private mode, if the mobile terminal 100 receives an input of a user touch action on a switching zone 503 (FIG. 28A(a)) or is located at a specific place corresponding to a business mode (e.g., example of a specific event for generating a signal for a mode switching) (FIG. 28A(b)), the mobile terminal 100 switches the private mode to the business mode and can then execute the phonebook in accordance with a feature corresponding to the business mode (FIG. 28B).

For instance, the phonebook in accordance with the feature corresponding to the private mode provides counterpart information corresponding to the private mode only. In addition, the phonebook in accordance with the feature corresponding to the business mode can provide counterpart information corresponding to the business mode or the private mode simultaneously or selectively.

In the following description, a mode switching process in the course of an execution of a dedicated application is explained with reference to FIGS. 29A to 29C.

Figure 29A:
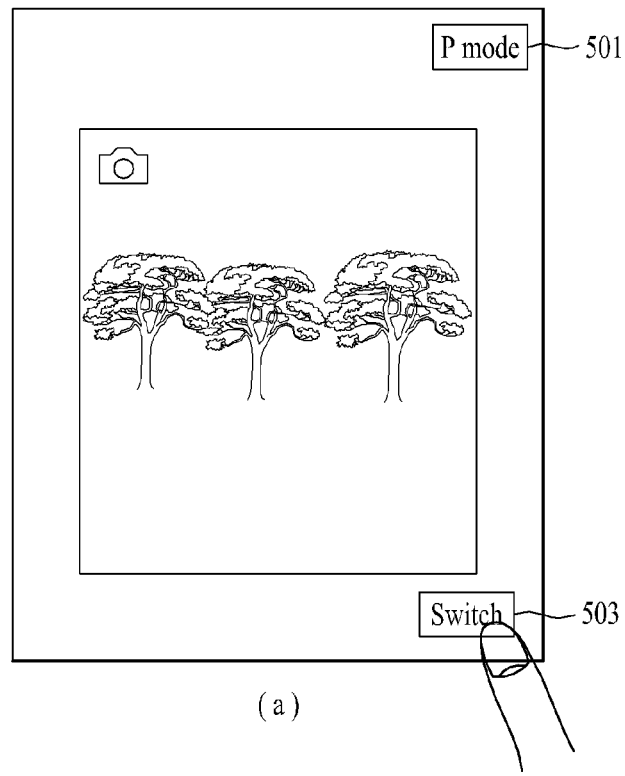
FIGS. 29A to 29C are diagrams of a process for switching a mode in the course of executing a dedicated application according to the present invention.
Figure 29A:
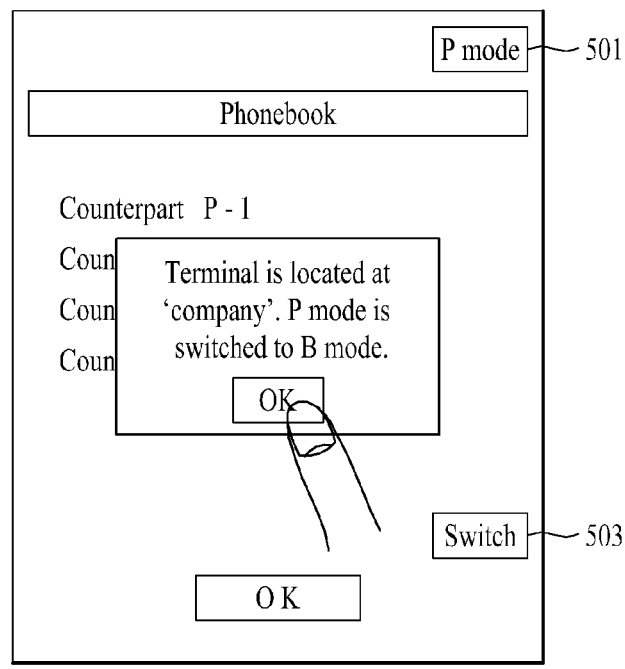
Figure 29B:
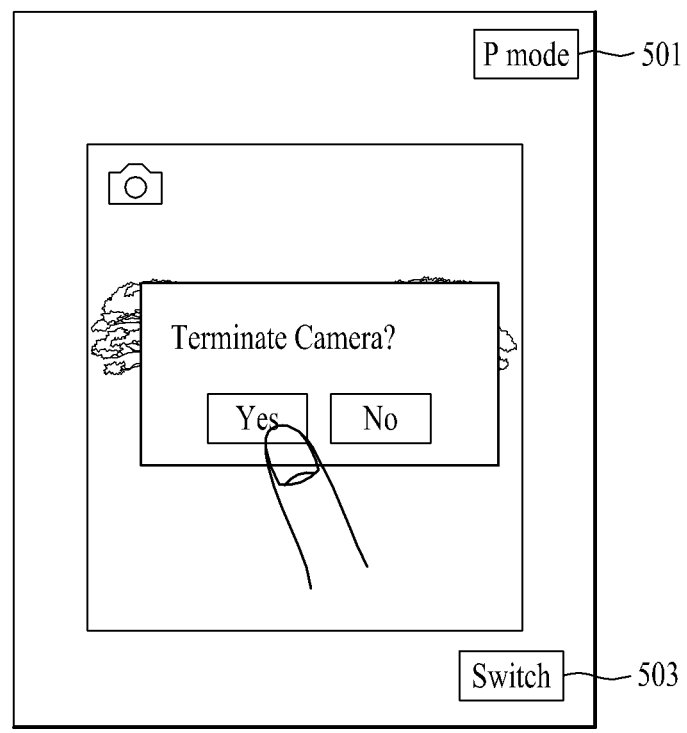
Figure 29C:
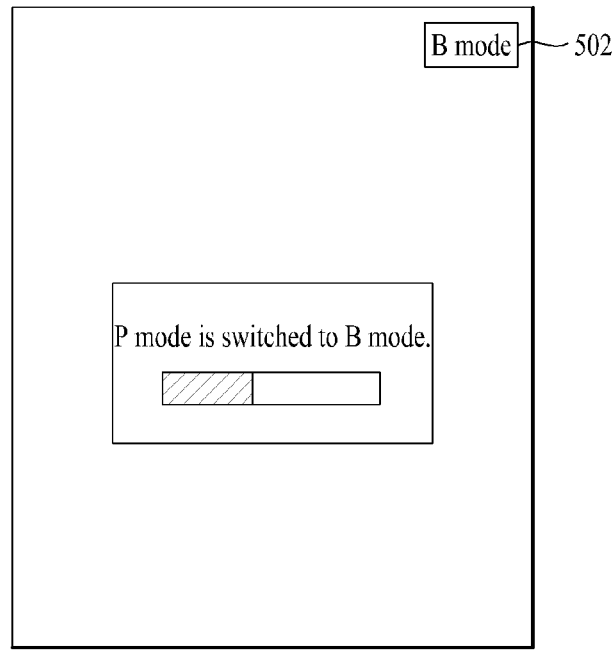
Figure 29C:
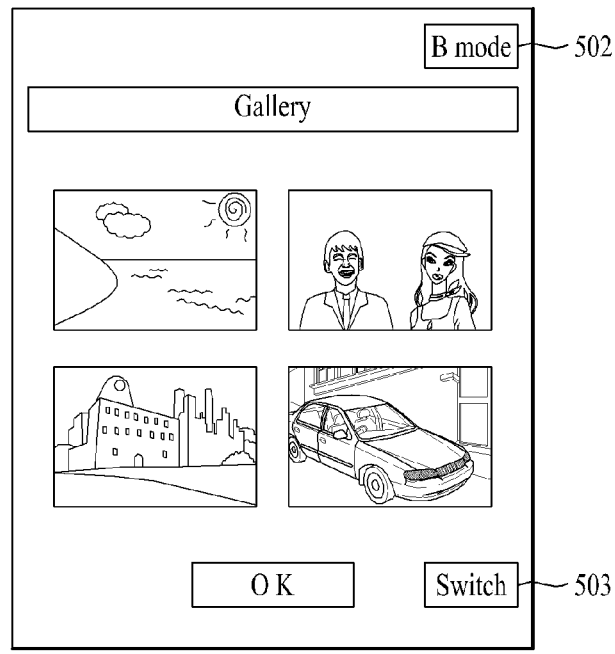

FIGS. 29A to 29C are diagrams of a process for switching a mode in the course of executing a dedicated application according to the present invention.

Referring to FIG. 29A and FIG. 29B, if the mobile terminal 100 receives an input of a user touch action on a switching zone 503 in the course of executing a camera executable in a private mode only (FIG. 29A(a)) or is located at a specific place corresponding to a business mode (FIG. 29A(b)), the mobile terminal 100 enables a user to select whether to end the camera (FIG. 29B).

If 'Yes (end)' is selected in FIG. 29B, the mobile terminal 100 switches the private mode to the business mode (FIG. 29C(a)). In addition, the mobile terminal 100 can execute an application similar to the ended camera if necessary (FIG. 29C(b)). For instance, the application similar to the camera can include one of a photo album, a gallery and the like.

Meanwhile, a plurality of modes mentioned in this disclosure can variously include such a mode type as a religion mode, a hobby mode, a school mode and the like as well as a private mode or a business mode. In addition, a plurality of modes can be set per type.

When an application executed per mode is determined in this disclosure, it can be designated in accordance with a user selection or can be automatically designated to a corresponding mode in consideration of property and type of the application. For instance, assuming that a mode field exists in a data structure of an application, the application can be designated to a corresponding mode defined in the mode field.

In each of a plurality of modes mentioned in this disclosure, a user interface associated with at least one of an audio based communication and a text based communication can be provided via the display unit 151 under the control of the controller 180. For instance, the audio based communication includes one of an audio call, an audio based chatting and the like. In addition, the text based communication can include one of a message service, a text based chatting and the like. Moreover, the user interface is displayed as a virtual key form on a touchscreen or can be provided as a button key form. Besides, the user interfaces provided in a plurality of the modes can differ from each other in at least one of position, shape, size and the like.

According to one embodiment of the present invention, the above-described mode switching controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising: a communication unit configured to communicate with at least one external terminal; a memory configured to store at least a first operating system configured to act in a first mode and a second operating system configured to act in a second mode, respectively; and a controller configured to execute the first operating system and to activate the first mode corresponding to the first operating system, to display a first information screen on a display unit corresponding to the activated first mode, to receive a switching signal indicating the first mode is to be switched to the second mode, to perform an authentication procedure for authenticating that the first mode can be switched to the second mode, to activate the second mode and deactivate the first mode when the authentication procedure is validly performed, and to display a second information screen on the display unit corresponding to the second mode and that is different from the first information screen, wherein each of the first information screen and the second information screen comprises at least a first group identifier indicating a first application group corresponding to the first mode or a second group identifier indicating a second application group corresponding to the second mode, wherein the first application group includes at least one application executable in the first mode, and the second application group includes at least one application executable in the second mode, wherein the controller is further configured to control the display unit to display a type identifier only in one group identifier corresponding to a currently activated mode among the first group identifier and the second group identifier, the type identifier indicating the type of the at least one application included in each of the first application group and the second application group, and wherein when the switching signal is received while executing a specific application executable only in the first mode, the controller is further configured to terminate the specific application and responsive to the termination, identify an alternative application similar to the terminated application and execute the alternative application in the second mode.

2. The mobile terminal of claim 1, wherein the controller is further configured to group applications included in the first and second application groups per an application type.

3. The mobile terminal of claim 2, wherein the controller is further configured to receive a selection signal indicating a selection of the first group identifier and to control the display unit to display applications included in the first application group.

4. The mobile terminal of claim 1, wherein when the first mode is activated, the controller is further configured to display the first group identifier as being activated and the second group identifier as being deactivated.

5. The mobile terminal of claim 4, wherein when the second group identifier or an application included within the second application group identified by the second group identifier is selected, the controller is further configured to perform the authentication procedure for authenticating that the first mode can be switched to the second mode, and to activate the second mode and deactivate the first mode when the authentication procedure is validly performed.

6. The mobile terminal of claim 1, wherein the controller is further configured to display a third group identifier that can be selected for switching the first mode to the second mode.

7. The mobile terminal of claim 1, wherein the authentication procedure includes one of 1) an input password, 2) face recognition, 3) fingerprint analysis, 4) voice recognition, 5) a predetermined touch pattern performed on the mobile terminal, and 6) user or company ID card analysis.

8. The mobile terminal of claim 1, wherein the controller is further configured to perform different authentication procedures for switching to the first and second modes.

9. A method of controlling a mobile terminal, the method comprising: allowing, via a communication unit of the mobile terminal, communication with at least one external terminal; storing, in a memory of the mobile terminal, at least a first operating system configured to act in a first mode and a second operating system configured to act in a second mode, respectively; executing, via a controller of the mobile terminal, the first operating system and activating the first mode corresponding to the first operating system; displaying, on a display unit of the mobile terminal, a first information screen on a display unit corresponding to the activated first mode; receiving, via the controller, a switching signal indicating the first mode is to be switched to the second mode; performing, via the controller, an authentication procedure for authenticating that the first mode can be switched to the second mode; activating, via the controller, the second mode and deactivating the first mode when the authentication procedure is validly performed; and displaying, on the display unit, a second information screen on the display unit corresponding to the second mode and that is different than the first information screen, wherein each of the first information screen and the second information screen comprises at least a first group identifier indicating a first application group corresponding to the first mode or a second group identifier indicating a second application group corresponding to the second mode, wherein the first application group includes at least one application executable in the first mode, and the second application group includes at least one application executable in the second mode, wherein the controller is further configured to control the display unit to display a type identifier only in one group identifier corresponding to a currently activated mode among the first group identifier and the second group identifier, the type identifier indicating the type of the at least one application included in each of the first application group and the second application group, and wherein when the switching signal is received while executing a specific application executable only in the first mode, the method further comprises: terminating, via the controller, the specific application; responsive to the termination, identifying an alternative application similar to the terminated application; and executing, via the controller, the alternative application in the second mode.

10. The method of claim 9, further comprising:
grouping, via the controller, applications included in the first and second application groups per an application type.

11. The method of claim 10, further comprising:
receiving a selection signal indicating a selection of the first group identifier; and
displaying, on the display unit, applications included in the first application group.

12. The method of claim 9, wherein when the first mode is activated, the method further comprises displaying the first group identifier as being activated and the second group identifier as being deactivated.

13. The method of claim 12, wherein when the second group identifier or an application included within the second application group identified by the second group identifier is selected, the method further comprises performing the authentication procedure for authenticating that the first mode can be switched to the second mode, and activating the second mode and deactivating the first mode when the authentication procedure is validly performed.

14. The method of claim 9, further comprising:
displaying a third group identifier that can be selected for switching the first mode to the second mode.

15. The method of claim 9, wherein the authentication procedure includes one of 1) an input password, 2) face recognition, 3) fingerprint analysis, 4) voice recognition, 5) a predetermined touch pattern performed on the mobile terminal, and 6) user or company ID card analysis.

16. The method of claim 9, further comprising:
performing different authentication procedures for switching to the first and second modes.

\* \* \* \* \*